(12) United States Patent
Gerson

(10) Patent No.: US 12,117,222 B2
(45) Date of Patent: Oct. 15, 2024

(54) LUBRICANT MANAGEMENT FOR AN HVACR SYSTEM

(71) Applicant: TRANE INTERNATIONAL INC., Davidson, NC (US)

(72) Inventor: Thibaut Gerson, Charmes (FR)

(73) Assignee: TRANE INTERNATIONAL INC., Davidson, NC (US)

( * ) Notice: Subject to any disclaimer, the term of this patent is extended or adjusted under 35 U.S.C. 154(b) by 543 days.

(21) Appl. No.: 17/334,295

(22) Filed: May 28, 2021

(65) Prior Publication Data

US 2021/0285693 A1    Sep. 16, 2021

Related U.S. Application Data

(63) Continuation of application No. PCT/US2019/063839, filed on Nov. 29, 2019.

(Continued)

(51) Int. Cl.
*F25B 9/00* (2006.01)
*F25B 1/047* (2006.01)
(Continued)

(52) U.S. Cl.
CPC .............. *F25B 9/002* (2013.01); *F25B 1/047* (2013.01); *F25B 31/004* (2013.01); *F25B 39/02* (2013.01);
(Continued)

(58) Field of Classification Search
CPC ........ F25B 9/002; F25B 31/004; F25B 40/06; F25B 49/02; F25B 2400/121; F25B 2500/16; F25B 2700/21151
(Continued)

(56) References Cited

U.S. PATENT DOCUMENTS 3,408,827 A    11/1968 Soumerai et al.
3,412,569 A    11/1968 Arledge
(Continued)

FOREIGN PATENT DOCUMENTS

CN    101749247 A    6/2010
CN    106796066 A    5/2017
(Continued)

OTHER PUBLICATIONS

Extended European Search Report, European Patent Application No. 19891500.1, Aug. 23, 2021 (7 pages).
(Continued)

*Primary Examiner* — Steve S Tanenbaum
(74) *Attorney, Agent, or Firm* — HSML P.C.

(57) ABSTRACT

Systems and methods for lubricant management of a compressor in an HVACR system are disclosed. A heat transfer circuit can utilize a working fluid to provide heating or cooling includes a compressor for compressing the working fluid and a heat source configured to increase a suction temperature of the working fluid entering the compressor. One or more lubricant rheological properties in a compressor system based on measurements taken at or near a bearing cavity of the compressor are determinable. A lubricant reservoir can be in thermal communication with a discharge flow path of the compressor. An internal heat exchanger can be disposed within a compressor for improving viscosity of the lubricant to be cycled back into the compressor. A heater can be located on a fluid line between a lubricant separator and a lubricant inlet. Condenser fans can be controlled.

11 Claims, 28 Drawing Sheets

Related U.S. Application Data

(60) Provisional application No. 62/773,918, filed on Nov. 30, 2018, provisional application No. 62/773,904, filed on Nov. 30, 2018.

(51) Int. Cl.
  *F25B 31/00* (2006.01)
  *F25B 39/02* (2006.01)
  *F25B 40/06* (2006.01)
  *F25B 43/02* (2006.01)
  *F25B 49/02* (2006.01)

(52) U.S. Cl.
  CPC .............. *F25B 40/06* (2013.01); *F25B 43/02* (2013.01); *F25B 49/02* (2013.01); *F25B 2339/0242* (2013.01); *F25B 2400/121* (2013.01); *F25B 2500/16* (2013.01); *F25B 2700/21151* (2013.01)

(58) Field of Classification Search
  USPC .......................................................... 62/498
  See application file for complete search history.

(56) References Cited

U.S. PATENT DOCUMENTS

| | | | |
|---|---|---|---|
| 3,481,151 A | 12/1969 | Seeley | |
| 3,681,896 A | 8/1972 | Velkoff | |
| 3,738,116 A | 6/1973 | Gazda | |
| 4,825,661 A | 5/1989 | Holtzapple et al. | |
| 4,977,752 A * | 12/1990 | Hanson | F25B 27/00 62/236 |
| 6,035,651 A | 3/2000 | Carey | |
| 6,182,467 B1 | 2/2001 | Zhong et al. | |
| 6,293,112 B1 | 9/2001 | Moeykens et al. | |
| 6,550,258 B1 | 4/2003 | Shoulders | |
| 6,644,068 B2 * | 11/2003 | Guckin | F25B 40/00 62/513 |
| 6,901,763 B2 | 6/2005 | Memory et al. | |
| 6,910,349 B2 | 6/2005 | Bodell, II et al. | |
| 7,833,298 B2 | 11/2010 | Larnholm et al. | |
| 8,640,491 B2 | 2/2014 | Shoulders | |
| 8,857,798 B1 | 10/2014 | Sparrow et al. | |
| 8,974,688 B2 | 3/2015 | Yana Motta et al. | |
| 9,234,685 B2 | 1/2016 | Koppineedi | |
| 9,377,227 B2 * | 6/2016 | Jung | F25D 23/067 |
| 9,541,311 B2 | 1/2017 | Hinde et al. | |
| 9,797,639 B2 | 10/2017 | Schmidt | |
| 9,810,458 B2 | 11/2017 | Hattori et al. | |
| 10,746,441 B2 | 8/2020 | Numata et al. | |
| 2008/0041096 A1 | 2/2008 | Sakashita et al. | |
| 2010/0132927 A1 | 6/2010 | Benetton et al. | |
| 2011/0023507 A1 | 2/2011 | Yana Motta et al. | |
| 2011/0146338 A1 * | 6/2011 | Kwon | B23K 31/02 428/576 |
| 2016/0102901 A1 | 4/2016 | Christensen et al. | |
| 2016/0107113 A1 | 4/2016 | Brown | |
| 2017/0138652 A1 | 5/2017 | Hattori et al. | |
| 2017/0234586 A1 | 8/2017 | Lv et al. | |
| 2017/0248352 A1 | 8/2017 | MacBain et al. | |
| 2017/0248354 A1 * | 8/2017 | Lord | F25B 39/00 |
| 2018/0117991 A1 | 5/2018 | Kim et al. | |
| 2018/0224168 A1 * | 8/2018 | Verma | F25B 1/053 |
| 2018/0298259 A1 | 10/2018 | Itano et al. | |
| 2019/0063801 A1 | 2/2019 | Miyoshi et al. | |
| 2019/0161660 A1 | 5/2019 | Yana Motta et al. | |

FOREIGN PATENT DOCUMENTS

| | | |
|---|---|---|
| CN | 108016235 A | 5/2018 |
| EP | 1083395 A1 | 3/2001 |
| GB | 560060 A | 3/1944 |
| GB | 2508614 A | 6/2014 |
| JP | 2006-283675 A | 10/2006 |
| KR | 20140091139 A | 7/2014 |
| WO | 2011/023192 A2 | 3/2011 |
| WO | 2016/057492 A1 | 4/2016 |
| WO | 2017/212058 A1 | 12/2017 |
| WO | 2020/113152 A2 | 6/2020 |

OTHER PUBLICATIONS

Office Action issued in U.S. Appl. No. 17/334,163, filed Sep. 27, 2023 (44 pages).

International Search Report and Written Opinion, International Patent Application No. PCT/US2019/063839, May 25, 2020 (15 pages).

Extended European Search Report, European Patent Application No. 19212539.1. Jan. 24, 2020.

Office Action, Chinese Patent Application No. 201980090993.7, Jul. 25, 2022, with [partial English translation (14 pages).

* cited by examiner

LUBRICANT MANAGEMENT FOR AN HVACR SYSTEM

FIELD

This disclosure relates generally to a heating, ventilation, air conditioning, and refrigeration (HVACR) system. More specifically, this disclosure relates to lubricant management for a compressor in an HVACR system.

BACKGROUND

A heating, ventilation, air conditioning, and refrigeration (HVACR) system generally includes a compressor. Compressors, such as, but not limited to, screw compressors and scroll compressors, utilize bearings to support a rotating shaft. The bearings generally include a lubricant system. If the bearings are not properly lubricated, the bearings, and ultimately the compressor, may fail prior to an expected lifetime of the bearing.

SUMMARY

This disclosure relates generally to a heating, ventilation, air conditioning, and refrigeration (HVACR) system. More specifically, this disclosure relates to lubricant management for a compressor in an HVACR system.

In an embodiment, a heat transfer circuit that utilizes a working fluid to provide heating or cooling includes a compressor for compressing the working fluid and a heat source configured to increase a suction temperature of the working fluid entering the compressor.

In an embodiment, one or more lubricant rheological properties in a compressor system based on measurements taken at or near a bearing cavity of the compressor are determinable. The measurements may include a viscometer reading, a refractive index, a bearing cavity pressure and a bearing cavity temperature, or a bearing cavity temperature and a suction pressure of the compressor.

In an embodiment, a lubricant reservoir is in thermal communication with a discharge flow path of the compressor.

In an embodiment, an internal heat exchanger is disposed within a compressor for improving viscosity of the lubricant to be cycled back into the compressor.

In an embodiment, compressor systems condition lubricant to allow operation of the compressor under an increased variety of operating conditions while maintaining bearing reliability. The compressor systems can include a heater located on a fluid line between a lubricant separator and a lubricant inlet.

In an embodiment, a method and system for controlling condenser fans in a heating, ventilation, and air conditioning (HVAC) system are provided.

BRIEF DESCRIPTION OF THE DRAWINGS

References are made to the accompanying drawings that form a part of this disclosure, and which illustrate embodiments in which the systems and methods described in this specification can be practiced.

DETAILED DESCRIPTION

Figure 1:
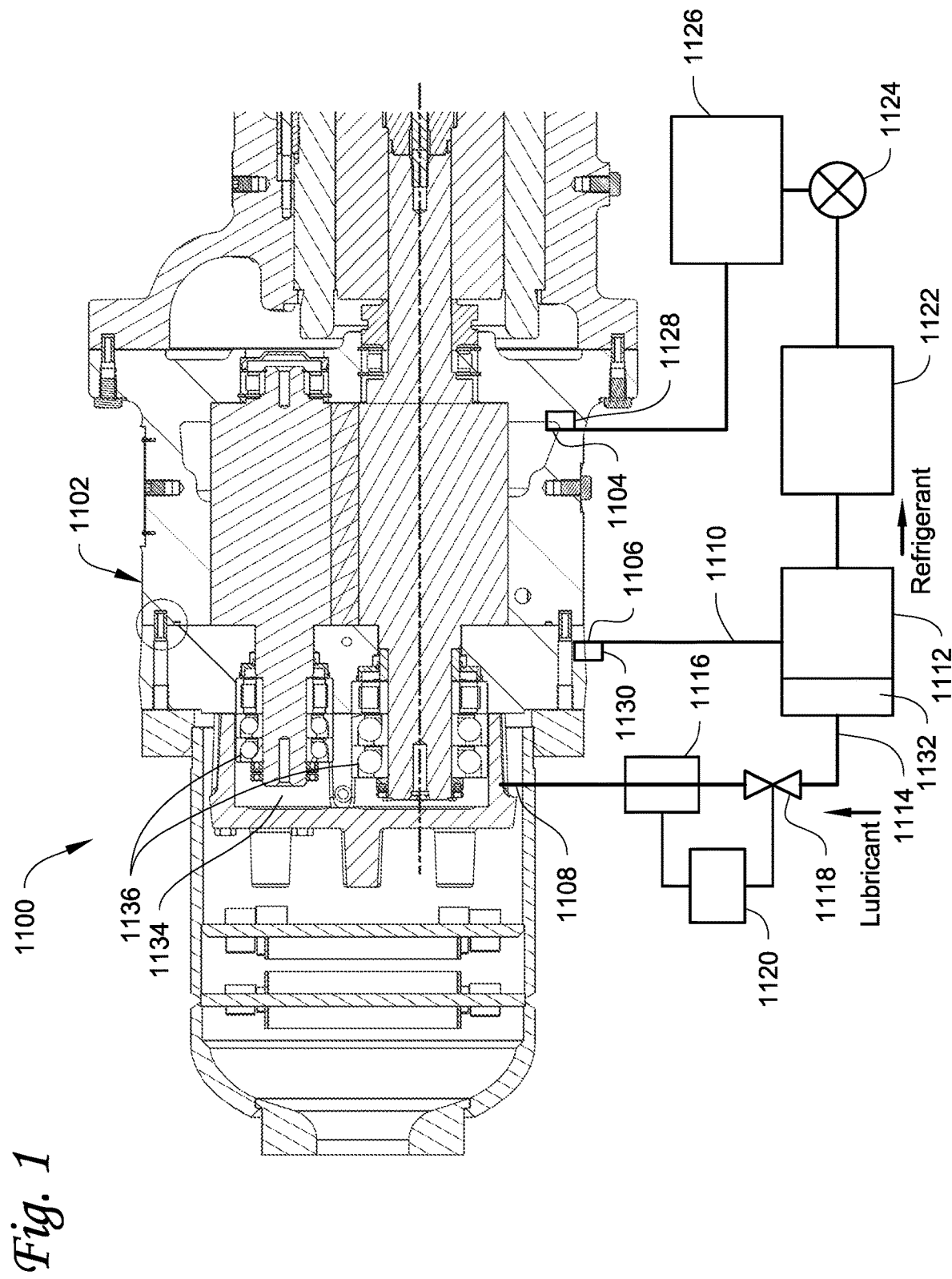
FIG. 1 shows a system diagram of a compressor system, according to an embodiment.

This disclosure relates generally to a heating, ventilation, air conditioning, and refrigeration (HVACR) system. More specifically, this disclosure relates to lubricant management for a compressor in an HVACR system.

Environmental impacts of HVACR refrigerants are a growing concern. For example, since 2011, the European Union has been phasing out refrigerants with a global warming potential (GWP) of more than, for example, 150 in some refrigeration systems. Environmentally-suitable HVACR refrigerants, with suitable properties such as density, vapor pressure, heat of vaporization, and suitable chemical properties, which satisfy the requirements regarding safety and environment impacts, such as the European Union standard discussed above, can be utilized for HVACR systems. The environmentally-suitable HVACR refrigerants are nonflammable or mildly flammable, non-ozone depleting, energy efficient, low in toxicity, compatible with materials of construction, and are chemically stable over the life of the equipment.

Current refrigerants, such as R134a or the like, may have relatively higher GWPs. For example, R134a has a GWP of 1,430. As a result, replacement refrigerants such as, but not limited to, R1234ze, R513A, and the like, are being implemented in HVACR systems.

In utilizing newer refrigerant compositions such as, but not limited to, R1234ze and R513A, various problems may arise as a result of the different properties of the refrigerant compared to prior refrigerants such as R134a. In general, refrigerants with lower GWPs such as R1234ze, R513A, and the like may be carried over into the lubricant. In some instances, the replacement refrigerants are relatively more likely to dissolve into the lubricant than the current refrigerants, resulting in a higher concentration of refrigerant within the lubricant (e.g., lubricant dilution).

As a result, portions of an operating map for a compressor of the HVACR system may suffer from higher lubricant dilution and limited bearing viscosity due to low discharge superheat. In some instances, the occurrence of higher lubricant dilution and limited bearing viscosity may be more significant when the variable speed compressor operates at relatively lower speeds. Higher lubricant dilution and limited bearing viscosity can result in, for example, a shortened lifetime for the bearings and ultimately compressor failures. In some instances, utilizing the R134A replacement refrigerants may require a replacement of the mechanical components (e.g., bearings or the like) in the compressor.

In other instances, controlling a variable speed compressor to maximize efficiency can also result in lubricant dilution problems, even when utilizing the current refrigerants such as R134a.

In general, lubricants utilized with R134a replacement refrigerants suffer the higher lubricant dilution problem. The lubricants can include any suitable lubricant which is miscible with the selected replacement refrigerant.

In general, higher lubricant dilution may occur when discharge superheat becomes relatively low. For example, higher lubricant dilution can occur when the discharge superheat is below at or about 8° C.

Figure 2:
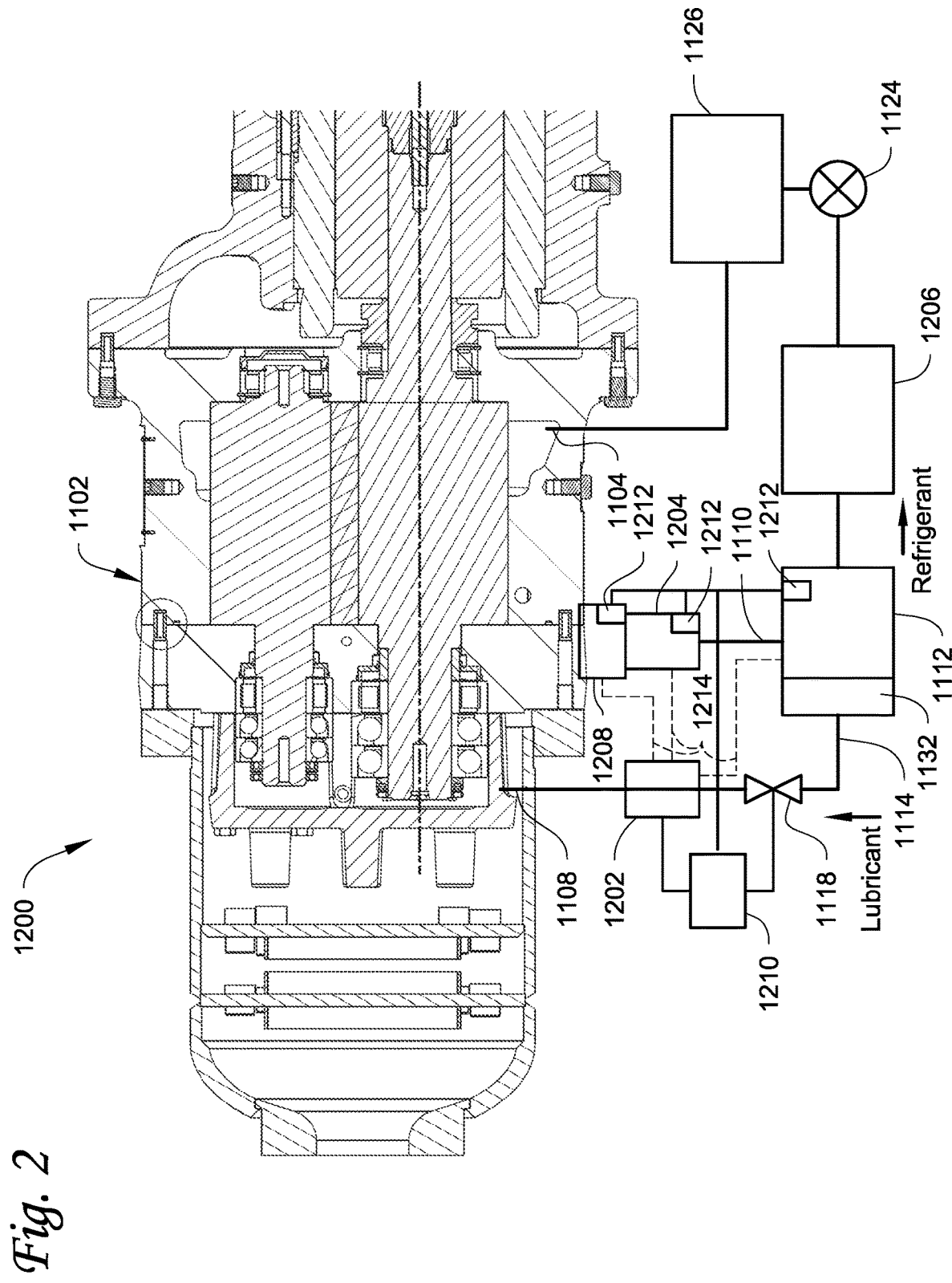
FIG. 2 shows a system diagram of a compressor system, according to an embodiment.
Figure 3:
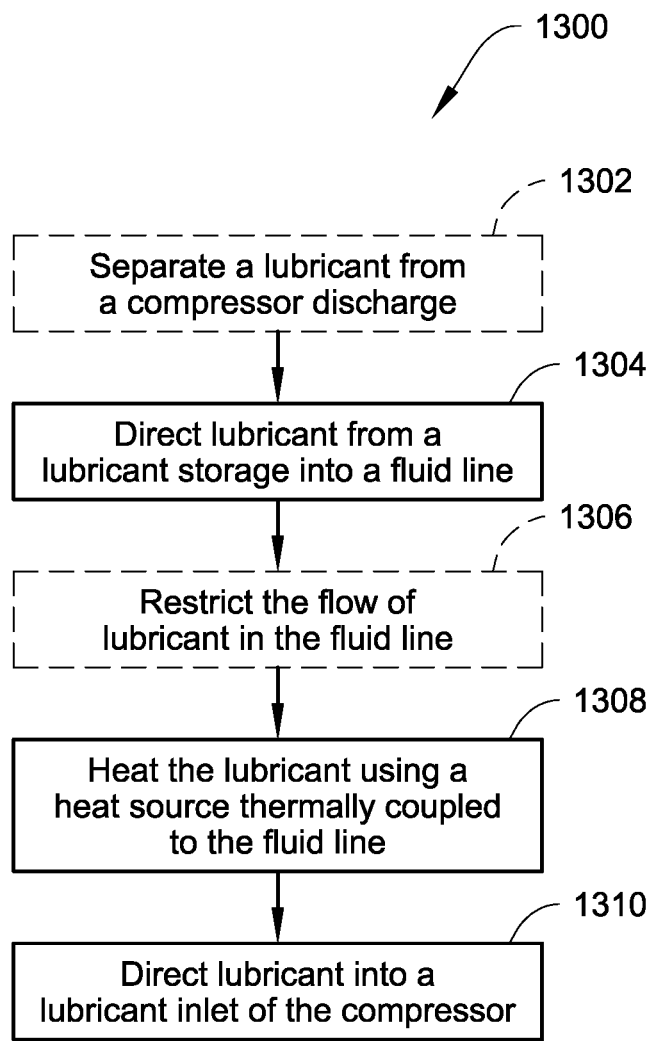
FIG. 3 shows a flow chart of a method, according to an embodiment.

Compressor System Having Isolated Heated Lubricant Flow (FIGS. 1-3)

This disclosure is directed to compressor systems where bearing lubricant flow is isolated and heated prior to being provided to the bearings, for example by a heater such as an electric heater or by heat exchange with heat scavenged from other compressor components.

Modern refrigerants may be more soluble in lubricants, and the dissolved refrigerant may compromise the effectiveness of the lubricant. Heat can be used to drive out the dissolved refrigerant from the lubricant, conditioning the lubricant. By conditioning lubricant for use at the compressor bearings, compressor systems according to embodiments increase the extent to which refrigerant can be separated from lubricant, and thus improve lubricant quality (e.g. the mass fraction of the refrigerant dissolved in the lubricant). The improved lubricant quality allows operation at combinations of speed and capacity that may not otherwise allow for sufficient lubrication of the bearings. Compressor systems according to embodiments thus can use a greater portion of the operating map defined by combinations of compressor speed and capacity, and are capable of delivering improved efficiency by utilizing more of the operating map of the compressor that ordinarily may not provide sufficient heat for effective separation of lubricant and refrigerant.

A compressor system embodiment includes a compressor having a suction port, a discharge port, and a lubricant inlet. The compressor system embodiment includes a lubricant storage. The compressor system embodiment includes a fluid line, wherein the fluid line allows fluid communication between the lubricant storage and the lubricant inlet. The compressor system embodiment also includes a heat supply, thermally coupled to the fluid line. The lubricant storage may be a lubricant sump, a lubricant tank, or the like. The lubricant sump may be part of a lubricant separator located downstream of the discharge port of the compressor.

In an embodiment, the heat supply is an electric heater thermally coupled to the fluid line.

In an embodiment, the heat supply is a heat scavenger. The heat scavenger is thermally coupled to the fluid line. In an embodiment, the heat scavenger is thermally coupled to a lubricant separator. In an embodiment, the compressor system further includes a discharge line connected to the discharge port of the compressor, and the heat scavenger is thermally coupled to the discharge line. In an embodiment, the compressor system further includes a discharge muffler connected to the discharge port of the compressor, and the heat scavenger is thermally coupled to the discharge muffler. In an embodiment, the compressor system further includes a condenser and the heat scavenger is thermally coupled to the condenser. In an embodiment, the compressor system further includes a discharge housing and the heat scavenger transfers heat from the discharge housing to the fluid line.

In an embodiment, the compressor system further includes a second heat supply. In an embodiment, the first heat supply is an electric heater and the second heat supply is a heat scavenger.

In an embodiment, the compressor system further includes a controller connected to the heat supply. In an embodiment, the compressor system further includes a flow control device that is connected to the controller. In an embodiment, the controller controls operation of the heat supply and the flow control device based on operational parameters of the compressor. In an embodiment, the operational parameters of the compressor are a saturated suction temperature of the compressor, a saturated discharge temperature of the compressor, and/or compressor speed. The operational parameters may reflect, for example, a temperature of the lubricant affecting, for example, the quantity of the refrigerant dissolved in the lubricant and/or the viscosity of the lubricant.

A method embodiment includes separating a lubricant from a discharge of the compressor, directing the lubricant into a fluid line, heating the lubricant using a heat source thermally coupled to the fluid line, and after heating the lubricant, directing the lubricant to a lubricant inlet of the compressor.

In an embodiment, the heat source includes a component that sources heat separate from the compressor, such as for example an electric heater. In an embodiment, the heat source includes a heat scavenger thermally coupled to the fluid line and also thermally coupled to the compressor system at a location separate from the fluid line.

In an embodiment, the method further includes restricting the flow of lubricant, and determining, using a processor, a lubricant volume and a lubricant temperature, where restricting the flow of the lubricant is controlled based on the determined lubricant volume and heating the lubricant is based on the determined lubricant temperature.

In an embodiment, the lubricant volume and the lubricant temperature are determined by the processor based on an operating map of the compressor.

FIG. 1 shows a system diagram of a compressor system 1100 according to an embodiment. Compressor system 1100 includes a compressor 1102. Compressor 1102 has suction port 1104, discharge port 1106, and lubricant inlet 1108. A discharge line 1110 is connected to discharge port 1106. Discharge line 1110 extends to lubricant separator 1112. A fluid line 1114 connects the lubricant separator 1112 to the lubricant inlet 1108 of compressor 1102. Lubricant separator 1112 is connected to lubricant storage 1132. Heater 1116 is thermally coupled to fluid line 1114. Fluid line 1114 may include a flow control device 1118. The heater 1116 and/or the flow control device 1118 may be connected to a controller 1120.

Compressor 1102 is a compressor connected to a refrigeration circuit. Compressor 1102 compresses a fluid received at suction port 1104, and expels the compressed fluid at discharge port 1106. The compressor 1102 may be, for example, a screw compressor, where compression chambers are formed and a fluid such as a refrigerant are compressed by the rotation of two rotors and the engagement of lobes on each of the rotors. Compressor 1102 may include one or more bearings receiving lubricant taken in at lubricant inlet 1108. The bearings may, for example, support and allow the rotation of components of the compressor such as the rotors of a screw compressor.

Compressor 1102 is part of a refrigeration circuit also including condenser 1122, an expansion device 1124, for example and expansion valve, and an evaporator 1126.

Compressor 1102 includes suction port 1104. Suction port 1104 is a port located on compressor 1102 where the fluid to be compressed enters the compressor. In an embodiment, one or more sensors 1128 may be located at the suction port 1104 to measure parameters including, for example, the temperature and the pressure of the fluid at the suction port 1104.

Compressor 1102 also includes discharge port 1106. Discharge port 1106 is where compressed fluid exits the compressor 1102. The fluid exiting discharge port 1106 includes both the fluid such as refrigerant and also lubricant from the bearings of compressor 1102. Fluid exits discharge port 1106 into discharge line 1110. The fluid at discharge port 1106 is at a higher temperature and pressure than the fluid entering compressor 1102 at suction port 1104. One or more sensors 1130 may be located at the discharge port 1106 to measure parameters including pressure and/or temperature of the fluid as it exits the compressor 1102. In an embodiment, sensors 1130 may be located within the compressor 1102 between suction port 1104 and discharge port 1106.

Compressor 1102 further includes lubricant inlet 1108. Lubricant inlet 1108 directs lubricant into a bearing cavity 1134 of compressor 1102, which contains one or more bearings 1136. The lubricant inlet may be, for example, a port on a bearing cover or a housing of the compressor 1102 extending into a bearing cavity 1134 receiving lubricant from the lubricant inlet 1108.

Discharge line 1110 is a fluid line extending from discharge port 1106 of compressor 1102. Discharge line 1110 conveys fluid from the discharge port of the compressor to the refrigeration circuit in which compressor 1102 is incorporated. The fluid discharged at discharge port 1106 and conveyed by discharge line 1110 includes a fluid such as a refrigerant used in the refrigeration circuit and further includes lubricant from the bearings and bearing cavity of the compressor 1102.

Lubricant separator 1112 is located along discharge line 1110. Lubricant separator 1112 separates lubricant from the flow of fluid discharged from the compressor, allowing the refrigerant to continue through a refrigeration circuit, for example, a condenser, an expansion device, for example an expansion valve, and an evaporator, while removing a significant portion of the lubricant from the flow discharged by the compressor. Lubricant separator 1112 may include, for example, a filter configured to allow passage of refrigerant while trapping lubricant in the discharge flow of the compressor. Lubricant separator may be located between discharge port 1106 of the compressor 1102 and the condenser 1122 of the refrigeration circuit of compressor system 1100.

Lubricant storage 1132 stores lubricant to be provided to compressor 1102. In an embodiment, lubricant storage 1132 is a sump connected to lubricant separator 1112. In an embodiment, lubricant storage 1132 is a lubricant tank or the like. In an embodiment, the lubricant trapped by lubricant separator 1112 collects, for example in a pool included in the lubricant storage 1132. In an embodiment, this pool is connected to fluid line 1114 via a port. In an embodiment, lubricant storage 1132 is integrated into lubricant separator 1112. In an embodiment, lubricant storage 1132 is separate from lubricant separator 1112.

Fluid line 1114 is a fluid line providing fluid communication between lubricant storage 132 and lubricant inlet 1108 of the compressor 1102. In the embodiment shown in FIG. 1, fluid line 1114 allows lubricant recovered at lubricant separator 1112 and stored in lubricant storage 1132 to be conveyed to the bearing cavities and/or bearings of compressor 1102.

Heater 1116 is located along fluid line 1114. Heater 1116 is thermally coupled to the fluid line 1114 such that heat produced by heater 1116 is transferred to fluid line 1114 and the contents of fluid line 1114. The heater 1116 may be thermally coupled to fluid line 1114 by, for example, surrounding the fluid line 1114, having a heating element wrapped around or embedded in the fluid line 1114, or the like. In an embodiment, heater 1116 is an electric heater. In an embodiment, heater 1116 is an electromagnetic induction heater.

Flow control device 1118 may be located along fluid line 1114 and configured to govern the flow of fluid through fluid line 1114. In an embodiment, flow control device 1118 may be, but is not limited to, a controllable valve. Flow control device 1118 may be used to limit the quantity of lubricant flowing through fluid line 1114. In an embodiment, flow control device 1118 is upstream where heater 1116 is thermally coupled to fluid line 1114, with respect to the direction of flow of lubricant from lubricant storage 1132 to lubricant inlet 1108. In an embodiment, flow control device 1118 allows lubricant to be heated to a higher temperature by heater 1116 by reducing the volume of flow that absorbs heat provided by heater 1116. In an embodiment, the flow control device 1118 is a pump.

Controller 1120 may be connected to heater 1116 and/or flow control device 1118. Controller 1120 may receive compressor operational information relevant to lubrication requirements and/or lubricant quality. The compressor operational information may include one or more of, for example, the speed the compressor 1102 is operated at, the capacity the compressor 1102 is operated at, a saturated suction temperature, saturated discharge temperature or the like. In an embodiment, the controller 1120 determines a lubricant volume and/or a lubricant quality target based on the compressor operational information. The determined lubricant volume may be used to control the flow control device 1118. The determined lubricant volume and/or the lubricant quality target may be used to determine an amount of heat to be added to the lubricant by heater 1116. In an embodiment, controller 1120 directs operation of heater 1116, for example, by setting the heater 1116 to supply a particular quantity of heat to fluid line 1114, operating the heater 1116 at a particular temperature or setting, or activating and deactivating the heater 1116.

FIG. 2 shows a system diagram of a compressor system 1200 according to an embodiment. Compressor system 1200 includes compressor 1102 having suction port 1104, discharge port 1106, and lubricant inlet 1108, discharge line 1110, lubricant separator 1112, lubricant storage 1132, fluid line 1114, and flow control device 1118 as shown in FIG. 1 and described above. The embodiment shown in FIG. 2 includes a heat scavenger 1202 that is thermally coupled to a section of the compressor system 1200 and to the fluid line 1114. In an embodiment, a discharge muffler 1204 is fluidly connected to the discharge port 1106 of the compressor 1102. In an embodiment, a condenser 1206 is located downstream of the compressor. Compressor 1102 and condenser 1206 are part of a refrigeration circuit also including expansion device 1124 and evaporator 1126. In an embodiment, the compressor 1102 has a discharge housing 1208 surrounding the discharge port 1106. In an embodiment, controller 1210 is connected to the flow control device 1118 and the heat scavenger 1202. In an embodiment, a temperature sensor 1212 is included in compressor system 1200. The temperature sensor 1212 may be connected to the controller 1210 and the heat scavenger 1202.

Heat scavenger 1202 thermally couples a portion of fluid line 1114 to at least one other part of the compressor system 1200. Heat scavenger 1202 thermally couples fluid line 1114 to another part of compressor system 1200. The other part of compressor system 1200 is a part that is typically at a higher temperature than the fluid line 1114, such that the thermal coupling transfers heat to the fluid line 1114 and heats lubricant traveling therein. The other part of the compressor system 1200 may be, for example, the discharge line 1110, discharge muffler 1204, condenser 1206, or discharge housing 1208. The heat scavenger 1202 may include, for example, a heat-absorbing element located on, in, or at the location on the compressor system 1200 where heat is to be collected. Heat scavenger 1202 may include one or more heat-conducting elements 1214 extending from the heat-absorbing element to the fluid line 1114. The one or more heat-conducting elements 1214 may provide the thermal coupling of the heat-absorbing element of heat scavenger 1202 to the fluid line 1114.

In an embodiment, both a heater 1116 as described above and shown in FIG. 1 and a heat scavenger 1202 as shown in FIG. 2 are included in a compressor system. In this embodiment, both the heater 1116 and the heat scavenger 1202 are thermally coupled to the fluid line 1114. In this embodiment, both the heater 1116 and the heat scavenger 1202 provide heat to the lubricant carried in fluid line 1114. In an embodiment, the heater 1116 is downstream of the heat scavenger 1202 with respect to a flow of lubricant through the fluid line 1114. In an embodiment, the heater 1116 and/or heat scavenger 1202 are downstream of flow control device 1118 with respect to a flow of lubricant through the fluid line 1114.

In an embodiment, the heat-absorbing element of heat scavenger 1202 is located on the surface of the discharge line 1110. In an embodiment, the heat-absorbing element of heat scavenger 1202 is located within the discharge line 1110 such that the flow of fluid discharged from compressor 1102 into discharge line 1110 passes over the heat-absorbing element.

In an embodiment, a discharge muffler 1204 is fluidly connected to the discharge port 1106 of the compressor 1102. The discharge muffler 1204 may be located between discharge port 1106 and discharge line 1110, or along discharge line 1110. The discharge muffler is a muffler configured to reduce pulsation and/or vibration resulting from the operation and discharge of the compressor. The discharge muffler receives compressed fluid from the compressor and acts to reduce pulsation and/or vibration resulting from the operation of compressor 1102. In an embodiment, the discharge muffler 1204 reduces pulsation and vibration by separating the discharge line 1110 from the rest of the refrigeration circuit by having a gap between a part of the discharge muffler 1204 directly mechanically connected to discharge line 1110 and the remainder of the refrigeration circuit. In an embodiment, the discharge muffler 1204 reduces pulsation and/or vibration by directing the discharged fluid through a series of baffles, or other such feature. In an embodiment, multiple such structures are used to reduce pulsation and/or vibration via their combined effects. In an embodiment, the discharge muffler 1204 is upstream of the lubricant separator 1112 with respect to the flow of fluid discharged from compressor 1102. By receiving fluid at or near where it is discharged from the compressor 1102, the discharge muffler 1204 receives the fluid of the refrigerant circuit in a heated, compressed state. During operation of the compressor 1102, the discharge muffler 1204, or fluid traveling through the discharge muffler 1204, is typically at a temperature that is higher than the temperature of fluid line 1114 or fluid located within fluid line 1114.

In an embodiment, the heat-absorbing element of heat scavenger 1202 is located on the surface of the discharge muffler 1204.

In an embodiment, the heat-absorbing element of heat scavenger 1202 is located within the discharge muffler 1204 such that the flow of fluid discharged from compressor 1102 into discharge muffler 1204 passes over the heat-absorbing element.

In an embodiment, a condenser 1206 is located downstream of the compressor 1102. Condenser 1206 is a component of the refrigeration circuit where the fluid compressed by compressor 1102 rejects heat. In an embodiment, the condenser 1206 is downstream of lubricant separator 1112 with respect to the flow of fluid discharged from compressor 1102. Condenser 1206 receives the refrigerant in a heated and compressed state, while fluid line 1114, downstream of the lubricant separator 1112 may be isolated from the heated refrigerant. Therefore, during operation of the compressor system 1200, the condenser 1206 may be at a temperature that is higher than the temperature of fluid line 1114 or fluid located within fluid line 1114. In an embodiment, the heat-absorbing element of heat scavenger 1202 is located on the surface of the condenser 1206. In an embodiment, the heat-absorbing element of heat scavenger 1202 is located within the condenser 1206 such that the flow of fluid within condenser 1206 passes over the heat-absorbing element.

In an embodiment, the compressor 1102 has a discharge housing 1208 surrounding the discharge port 1106. Discharge housing 1208 is a portion of the housing of compressor 1102 that is at or near the discharge port. The heat produced when operating the compressor and heat from the compressed fluid itself are absorbed by discharge housing 1208. When compressor 1102 is in operation, discharge housing 1208 is typically at a temperature higher than discharge line 1114 or fluid located inside discharge line 1114. In an embodiment, the heat-absorbing element of heat scavenger 1202 is located on the surface of the discharge housing 1208.

Controller 1210 is connected to flow control device 1118. In an embodiment, controller 1210 is connected to temperature sensor 1212 and is configured to receive temperature data from temperature sensor 1212. Controller 1210 is configured to control flow control device 1118 to determine an amount of lubricant to provide to the compressor 1102 based on, for example, the operating conditions of compressor 1102, such as the speed or capacity of the compressor, and the temperature data from temperature sensor 1212. In an embodiment, controller 1210 determines a temperature to achieve a lubricant quality target based on the operating conditions of compressor 1102. In an embodiment, the lubricant quality target is a temperature of the lubricant. In this embodiment, controller 1210 determines a volume of lubricant that can be heated to the determined temperature by the heat scavenger 1202, based on the temperature data. In an embodiment, controller 1210 directs flow control device 1118 to open or constrict to allow a flow of lubricant through fluid line 1114 that provides the determined volume of lubricant. In an embodiment where heat scavenger 1202 is thermally coupled to more than one part of compressor system 1200 aside from fluid line 1114, the controller may determine whether to isolate the heat scavenger 1202 from one or more of the parts of the compressor system 1200. Isolation of heat scavenger 1202 from other components of compressor system 1200 may be based on the flow allowed through flow control device 1118. Isolation of heat scavenger 1202 from other components of the compressor system 1200 may be based on the temperature of the parts of the compressor system 1200 aside from fluid line 1114, to ensure lubricant is at the desired temperature at lubricant inlet 1108. In an embodiment where there is both a heat scavenger 1202 and a heater 1116, the controller 1210 may determine a required quantity of lubricant flow. When the required volume of lubricant flow exceeds the volume of lubricant that can be heated to the determined temperature by the heat scavenger 1202 alone, as determined based on the temperature data, the controller 1210 directs operation of the heater 1116 to heat the lubricant to the determined temperature, while directing the flow control device to open or constrict such that the volume of flow through fluid line 1114 is at least the determined required quantity of lubricant. In an embodiment, the controller 1210 may determine the volume of flow through fluid line 1114 based on a speed at which the compressor system 1200 is being operated.

One or more temperature sensors 1212 obtain temperature data at the one or more parts of the compressor system that heat scavenger 1202 is thermally coupled to via the one or more heat-conducting elements 1214. Temperature sensor 1212 may be located, for example, on the heat scavenger 1202 or at any or all of the one or more parts of compressor system 1200, other than fluid line 1114, that it is thermally coupled to. Multiple temperature sensors according to 1212 may be included in embodiments of compressor system 1200. Examples of these other parts of the compressor system 1200 include the discharge line 1110, discharge muffler 1204, condenser 1206, or discharge housing 1208. Temperature sensor 1212 provides temperature data regarding the heat scavenger 1202 itself or the sources of heat recovered and transferred by the heat scavenger 1202 to the fluid line 1114. The temperature data from temperature sensor 1212 may be supplied to controller 1210. The temperature data supplied to controller 1210 may be used, for example, to estimate the amount of heat that the heat scavenger 202 can provide to fluid in the fluid line 1114. Temperature sensor 1212 may be, for example a thermistor, a thermocouple, a semiconductor-based temperature sensor or any other suitable temperature measurement apparatus capable of measuring temperatures within the range of typical temperatures of the part of the compressor system 1200 or the heat scavenger 1202, for example temperatures from at or about 0 to at or about 100° F. at suction and from at or about 60 to at or about 250° F. at discharge of the compressor system 1200.

FIG. 3 shows a flow chart of a method 1300 according to an embodiment. Method 1300 optionally includes separating a lubricant from a discharge of a compressor 1302. Method 1300 includes directing the lubricant from a lubricant storage into a fluid line 1304, restricting the flow of the lubricant in the fluid line using a flow control device 1306, heating the lubricant using a heat source thermally coupled to the fluid line 1308, and directing the lubricant to a lubricant inlet of the compressor after it has been heated 1310.

In an embodiment, lubricant is separated from a discharge of a compressor 1302. The compressor, such as compressor 1102, discharges compressed gas at a discharge port, such as discharge port 1106. The compressed gas further includes lubricant, such as lubricant from the bearings and bearing cavity of the compressor. The lubricant may be separated from the gas discharged by the compressor by, for example, a lubricant separator such as lubricant separator 1112. The lubricant may be stored following separation from the discharge of the compressor 1302, for example in a lubricant storage such as lubricant storage 1132.

The lubricant is directed from lubricant storage into a fluid line 1304. The lubricant storage, such as lubricant storage 1132, where the lubricant is stored prior to being provided to compressor 1302, may include an outlet directing the lubricant into the fluid line, such as fluid line 1114. The fluid line is a line providing fluid communication between and a lubricant inlet of the compressor, such as lubricant inlet 1108 of compressor 1102.

In an embodiment, the flow of the lubricant in the fluid line may optionally be restricted using a flow control device 1306. The flow control device may be flow control device 1118 as described above. The flow rate may be restricted based on, for example, an amount of lubricant required by the bearings of the compressor and/or the heating capacity of the heat source or heat sources that are used to heat the lubricant 1308. In an embodiment, the amount of flow may be restricted based on the heat available from the heat source, for example the heating capacity of an electric heater and/or the temperature of a compressor system element thermally coupled to a heat scavenger 1202.

The lubricant is heated using a heat source thermally coupled to the fluid line 1308. In an embodiment, the heat source is a heater such as heater 1116. In an embodiment, the heat source is a heat scavenger such as heat scavenger 1202 thermally coupled to another section of the compressor system. In an embodiment, the lubricant is heated by both a heater such as heater 1116 and a heat scavenger such as heat scavenger 1202.

The heating of the lubricant 1308 may be governed by a controller, such as controller 1120 or controller 1210. The heat added to the lubricant during heating of the lubricant 1308 or the final temperature of the lubricant at the end of heating 1308 may be determined by the controller based on, for example, the speed and/or discharge temperature of the compressor. In an embodiment, the amount of heat added to the lubricant may be varied based on the volume of the lubricant flow following the restriction at 1306. In an embodiment, the controller controls the temperature of the lubricant entering the lubricant inlet of the compressor by controlling the volume of lubricant that flows through flow control device 1118.

The lubricant is directed to a lubricant inlet of the compressor after it has been heated 1310. The lubricant may be conveyed by the fluid line, such as fluid line 1114, to a lubricant inlet such as lubricant inlet 1108, where it enters the compressor. In an embodiment, the lubricant inlet provides the lubricant to a bearing cavity of the compressor, where the lubricant lubricates one or more bearings supporting one or more rotating parts of the compressor, such as the rotors of a screw compressor.

Aspects:

Any of aspects 1-15 may be combined with any of aspects 16-20. It is understood that any of aspects 1-20 can be combined with any other aspects recited herein.

Aspect 1. A compressor system, comprising: a compressor having a suction port, a discharge port, and a lubricant inlet; a lubricant storage; a fluid line, wherein the fluid line allows fluid communication between the lubricant storage and the lubricant inlet; and a heat supply, thermally coupled to the fluid line.

Aspect 2. The compressor system according to aspect 1, wherein the heat supply is an electric heater.

Aspect 3. The compressor system according to aspect 1, wherein the heat supply is a heat scavenger.

Aspect 4. The compressor system according to aspect 3, wherein the heat scavenger is thermally coupled to a lubricant separator.

Aspect 5. The compressor system according to any of aspects 3-4, further comprising a discharge line connected to the discharge port of the compressor, and wherein the heat scavenger is thermally coupled to the discharge line.

Aspect 6. The compressor system according to any of aspects 3-5, further comprising a discharge muffler connected to the discharge port of the compressor, and wherein the heat scavenger is thermally coupled to the discharge muffler.

Aspect 7. The compressor system according to any of aspects 3-6, further comprising a condenser and wherein the heat scavenger is thermally coupled to the condenser.

Aspect 8. The compressor system according to any of aspects 3-7, wherein the compressor further comprises a discharge housing and the heat scavenger transfers heat from the discharge housing to the fluid line.

Aspect 9. The compressor system according to any of aspects 1-8, further comprising a second heat supply.

Aspect 10. The compressor system according to any of aspects 1-9 further comprising a lubricant separator located downstream of the discharge port of the compressor, and wherein the lubricant storage is a lubricant sump of the lubricant separator.

Aspect 11. The compressor system according to any of aspects 1-10, wherein the fluid line includes a flow control device.

Aspect 12. The compressor system according to any of aspects 1-11, further comprising a controller connected to the heat supply.

Aspect 13. The compressor system according to aspect 12, further comprising a flow control device, and wherein the controller is connected to the flow control device.

Aspect 14. The compressor system according to aspect 13, wherein the controller controls operation of the heat supply and the flow control device based on operational parameters of the compressor.

Aspect 15. The compressor system according to aspect 14, wherein the operational parameters of the compressor comprise one or more of a saturated suction temperature, a suction pressure, a suction temperature, a discharge temperature, a saturated discharge temperature, a discharge pressure, and a compressor speed.

Aspect 16. A method of operating a compressor system, comprising: directing a lubricant from a lubricant storage into a fluid line; heating the lubricant using a heat source thermally coupled to the fluid line; and after heating the lubricant, directing the lubricant to a lubricant inlet of a compressor.

Aspect 17. The method according to aspect 16, wherein the heat source includes an electric heater.

Aspect 18. The method according to any of aspects 16-17, wherein the heat source includes a heat scavenger thermally coupled to the compressor system at a location separate from the fluid line.

Aspect 19. The method according to any of aspects 16-18, further comprising: determining, using a processor, a lubricant volume and a lubricant temperature; and restricting the flow of the lubricant based on the determined lubricant volume, and wherein heating the lubricant is based on the determined lubricant temperature.

Aspect 20. The method according to aspect 19, wherein the lubricant volume and the lubricant temperature are determined by the processor based on an operating map of the compressor.

Compressor systems condition lubricant to allow the operation of the compressor under an increased variety of conditions while maintaining bearing reliability. The compressor systems include a heater located on a fluid line between a lubricant separator and a lubricant inlet. The heater may be an electric heater, or a heat scavenger transferring heat from other parts of the compressor system to the fluid in the fluid line. A flow control device may control the amount of lubricant passing through the fluid line, reducing a lubricant pressure and/or flow rate, increasing the effectiveness of adding heat to the lubricant.

Figure 4:
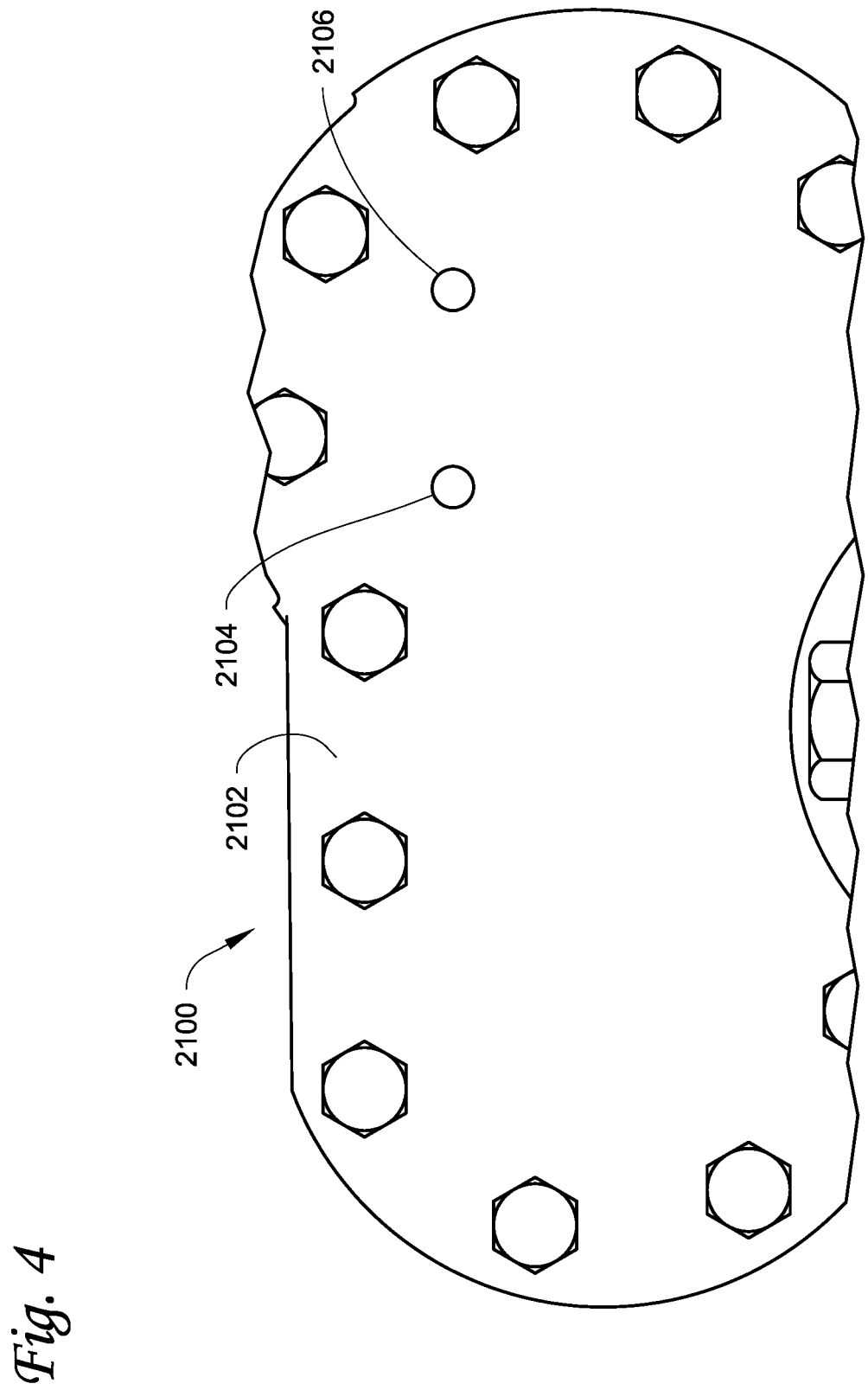
FIG. 4 is a front view of a bearing cover of a compressor according to an embodiment.
Figure 5:
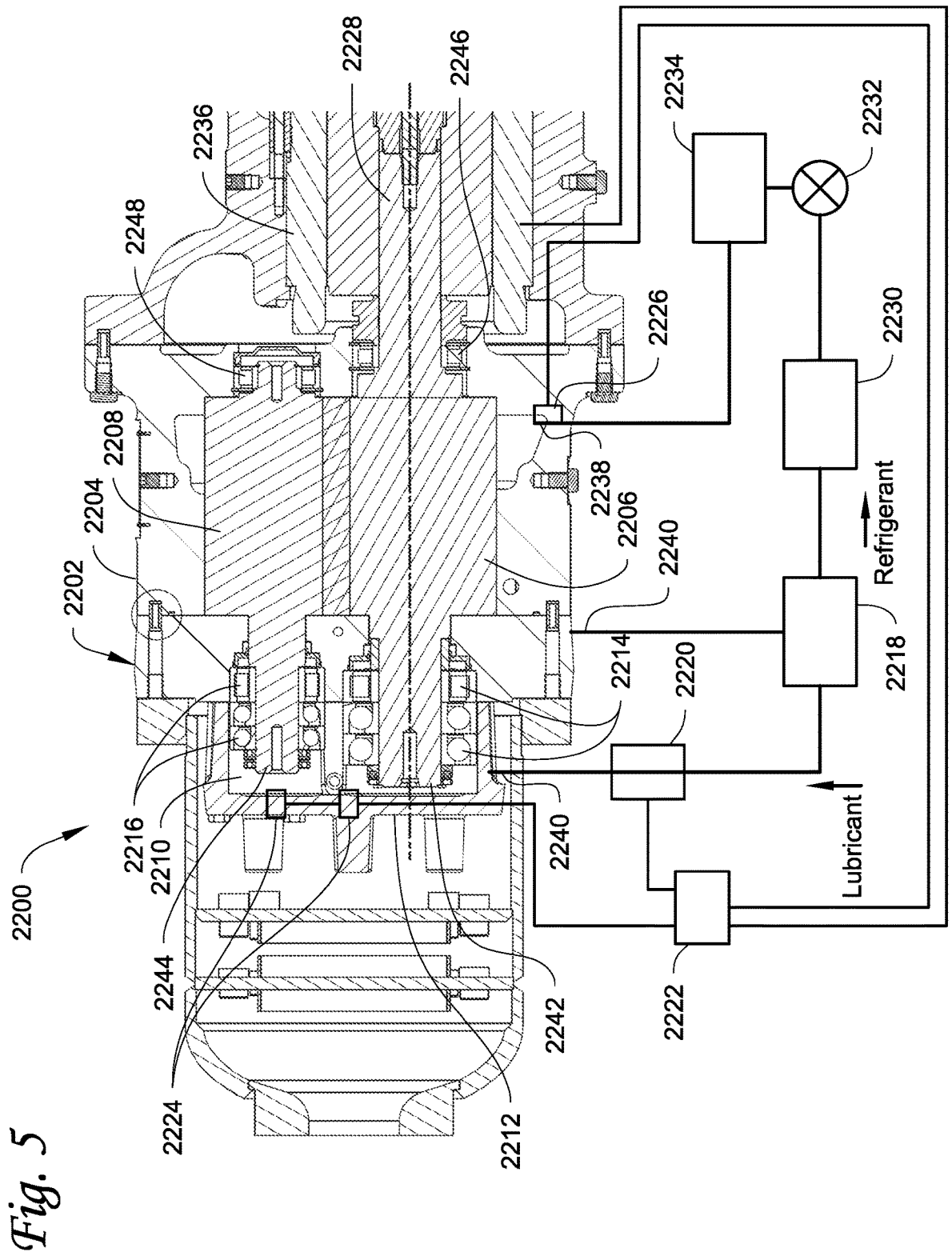
FIG. 5 is a section view of a compressor according to an embodiment.
Figure 6:
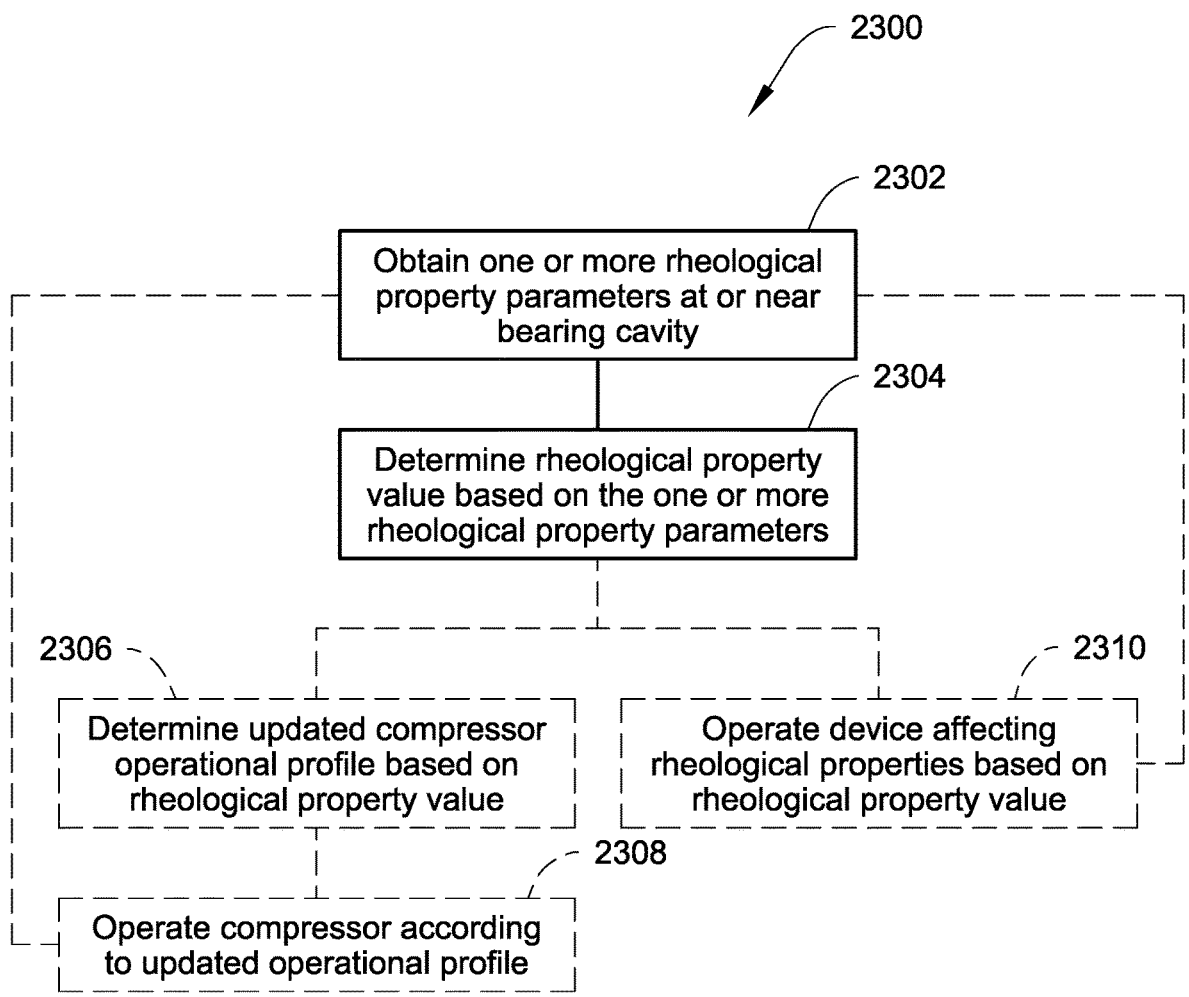
FIG. 6 is a flow chart of a method of operating a compressor according to an embodiment.

Compressor Bearing Protection Using Measured Or Estimated Rheological Properties To Control Chiller (FIGS. 4-6)

This disclosure is directed to methods and systems for the measurement of lubricant rheological properties in compressors used in chillers, particularly determining a direct measure of lubricant rheological properties based on measurements at or near the bearing cavity, and operation of compressors based on the determined lubricant rheological properties.

Proper lubrication of a bearing requires that the lubricant have sufficient rheological properties, including viscosity. The rheological properties may indicate whether a lubricant is properly lubricating the bearing. The rheological properties may be presented as a viscosity ratio such as kappa, the ratio of the applied viscosity to a rated viscosity, or lambda, a ratio of lubricant film thickness to surface asperity height in the bearing. When determining kappa values, for example, the rated viscosity may vary depending on operational parameters such as a speed of a compressor including the bearing. Currently, lubricant quality (i.e. a mass fraction of lubricant vs. dissolved refrigerant) is typically estimated using a discharge superheat (DSH) measurement of the difference between a saturation temperature and the temperature in the discharge line, and this estimated lubricant quality is in turn used in place of rheological properties when controlling a compressor. Target DSH measurements are used when controlling compressor operations to account for lubricant quality and device longevity and safety. The use of a direct measure of lubricant rheological properties such as a kappa value improves accuracy over approaches that instead use proxies or correlated values such as DSH and lubricant quality. Further, DSH measurements capture lubricant quality at the lubricant separator, but the lubricant is in use at the bearings, which may be at different conditions and thus the behavior of the lubricant may deviate from what can be predicted based on DSH. Measurement of lubricant rheological properties at or near the bearing cavity provide more accurate assessments of bearing lubrication and allow bearing lubrication to be properly assessed in systems including lubricant preparation or enrichment devices downstream from the lubricant separator with respect to the bearings. This allows a greater portion of the operating map for the compressor to be utilized, due to the improved understanding of bearing lubrication.

Using rheological properties expressed as a viscosity ratio such as a kappa value to assess lubrication at the bearing allows factors such as compressor speed, which affects the sufficiency of rheological properties, to be accounted for. This further improves the accuracy and precision of compressor operation in parts of the operating map typically associated with poor lubrication at partial loads, such as lower compressor speeds, or operations at lower ambient temperatures. Improving the extent to which the full operating map of a compressor is used allows improved efficiency to be realized in systems including the compressor, such as chillers. Improving the accuracy and precision of bearing lubrication assessments also provides the ability to use a broader variety of refrigerants, even ones that may have increased solubility in the lubricant used with the compressor and that thus may require more heat to be driven out of the lubricant.

A method embodiment for operating a compressor system including a lubricant separator includes measuring one or more parameters of a lubricant via one or more sensors within a bearing cavity of the compressor and using the one or more parameters to determine one or more lubricant rheological properties. In an embodiment, the one or more rheological properties include a kappa value of the lubricant. In an embodiment, the one or more parameters include a bearing cavity temperature and a bearing cavity pressure. In an embodiment, the one or more parameters include a bearing cavity temperature and a suction pressure, modified according to a transfer function. In an embodiment, the one or more parameters include a refractive index of the lubricant. In an embodiment, the one or more parameters include a viscometer reading for the lubricant.

In an embodiment, the speed of the compressor is adjusted based on the one or more lubricant rheological properties. In an embodiment, the capacity of the compressor is adjusted based on the one or more lubricant rheological properties. In an embodiment, a heater is in thermal communication with a flow path of the lubricant from the lubricant separator to the bearing cavity.

A compressor system embodiment includes a compressor including a suction port and a bearing cavity, one or more sensors inside the bearing cavity and configured to measure one or more parameters of a lubricant, a lubricant separator, and a controller configured to receive the one or more parameters of the lubricant and determine one or more lubricant rheological properties.

In an embodiment, in the compressor system, the one or more parameters include a temperature in the bearing cavity and a pressure inside the bearing cavity. In an embodiment, in the compressor system, the one or more parameters include a refractive index of the lubricant inside the bearing cavity. In an embodiment, in the compressor system, the one or more parameters include the temperature inside the bearing cavity, and a suction pressure measured by a sensor at the suction port, and the processor is configured to adjust the suction pressure according to a transfer function when determining the one or more lubricant rheological properties.

In an embodiment, the controller is configured to determine an adjusted speed of the compressor based on the one or more lubricant rheological properties and direct operation of the compressor at the adjusted speed.

In an embodiment, the controller is configured to determine an adjusted capacity for the compressor based on the one or more lubricant rheological properties, and direct operation of the compressor at the adjusted capacity.

In an embodiment, the compressor system further includes a lubricant heater in thermal communication with a flow path of the lubricant from the lubricant separator to the bearing cavity, and wherein the controller is configured to direct operation of the lubricant heater based on the one or more lubricant rheological properties.

The rheological properties of a lubricant are flow properties of the lubricant, including, for example, one or more of the viscosity of the lubricant, the viscosity-pressure relationship of the lubricant, and the like. One or more of the rheological properties may be determined as a function of one or more of a lubricant viscosity reading, a lubricant refractive index, temperature, and pressure. The temperature and pressure may be direct measurements at a location where rheological properties are to be determined, such as within a bearing cavity, or may be measurements taken at another location and transformed, for example via a transfer function. The rheological properties may define whether the bearing has sufficient lubrication to operate at sufficient levels of reliability or longevity.

The one or more rheological properties may be presented as a ratio, such as a viscosity ratio. The viscosity ratio may include the measured rheological properties and minimum thresholds or preferred values for rheological properties of lubricants at a particular bearing. In an embodiment, the viscosity ratio is a kappa value, a ratio of the applied viscosity of the lubricant over the rated viscosity for the bearing. The rated viscosity may be based on, for example, reliability and/or longevity data for a bearing. The rated viscosity may vary based on operational parameters at the bearing, such as a speed of rotation at the bearing.

In an embodiment, the rheological properties and rated viscosity with respect to obtaining the kappa value may be determined based on elasto-hydrodynamic lubrication (EHL) or hydrodynamic lubrication. Whether EHL or hydrodynamic lubrication methods are used may be determined based on the type of bearing, for example using EHL for lubricant used with roller bearings.

In an embodiment, the viscosity ratio may be a lambda value, a ratio of the oil film thickness compared to a surface asperity height in the lubricated bearing.

FIG. 4 is a front view of bearing cover 2102 of compressor 2100 according to an embodiment. In an embodiment, bearing cover 2102 includes temperature probe aperture 2104 and pressure probe aperture 2106.

Compressor 2100 may be, for example, a screw compressor. In an embodiment, compressor 2100 is a variable volume ratio compressor. Compressor 2100 includes a bearing cavity, which is enclosed at an end by bearing cover 2102. In an embodiment, compressor 2100 is a scroll compressor. In an embodiment, compressor 2100 is a centrifugal compressor.

Bearing cover 2102 is a cover located at an end of a bearing cavity of compressor 2100. Bearing cover 2102 encloses the bearing cavity, in which there are bearings allowing rotation of the rotors of the compressor.

Temperature probe aperture 2104 is an opening extending through bearing cover 2102 and allowing at least a portion of a temperature sensor to be located within the bearing cavity. The temperature sensor may be, for example, a thermistor, a thermocouple, a semiconductor-based temperature sensor or any other suitable temperature measurement apparatus capable of measuring the range of typical temperatures of the bearing cavity. The temperature sensor protruding through the temperature probe aperture 2104 into the bearing cavity allows a temperature within the bearing cavity to be measured directly.

In an embodiment, compressor 2100 may include two or more temperature probe apertures 2104. Each bearing included in the compressor may have different speeds of rotation and/or local temperatures, for example in a screw compressor, the female rotor may have a slower speed of rotation than the male rotor. Lubricant rheological property requirements and lubricant rheological properties may vary locally even for bearings all located within the bearing cavity of compressor 2100, for example due to differences in speed of rotation at each bearing. In an embodiment, one temperature probe aperture 2104 may be provided for each bearing included in the bearing cavity of compressor 2100. For example, temperature measurements may be taken at or near each of the male and female rotors of compressor 2100 when compressor 2100 is a crew compressor.

Pressure probe aperture 2106 is an opening extending through bearing cover 2102 and allowing at least a portion of a pressure sensor to be located within the bearing cavity. The portion of the pressure sensor may be a probe of the sensor, configured to receive pressure and produce an output representative of the pressure at or within the bearing cavity. The pressure sensor may, for example, include a force collector, and may be a piezoresistive, capacitive, electromagnetic, or other such sensor capable of measuring pressures within the ranges typically occurring within the bearing cavity. The pressure probe aperture 2106 allows the pressure sensor to directly measure the pressure within the bearing cavity.

FIG. 5 is a section view of a portion of a heating, ventilation, air conditioning and refrigeration (HVACR) system 2200 including compressor 2202. Compressor 2202 includes compressor housing 2204 and rotors 2206 and 2208, with rotors 2206 and 2208 disposed in a space within compressor housing 2204. Rotor 2206 and 2208 are supported at one end by bearings 2214, 2216 that are located in bearing cavity 2210. Compressor housing 2204, the rotors 2206, 2208 and bearing cover 2212 define bearing cavity 2210. Discharge from the compressor 2202 continues through the HVACR system 2200 to lubricant separator 2218, where lubricant is captured and recirculated to bearing cavity 2210. Lubricant heater 2220 may be located along the path carrying lubricant from the lubricant separator 2218 or a lubricant sump, tank, or reservoir to the bearing cavity 2210. HVACR system 2200 may include a controller 2222 and one or more lubricant condition sensors 2224.

HVACR system 2200 is a system including a compressor circuit for heating and/or cooling a fluid. HVACR system 2200 may be, for example, included in a water chiller, a heat recovery system, an ice manufacturing system, or the like. HVACR system 2200 includes a compressor circuit including compressor 2202, condenser 2230, expansion device (e.g. an expansion valve) 2232, and evaporator 2234.

In an embodiment, compressor 2202 is a screw compressor that compresses a refrigerant used in HVACR system 2200. Compressor 2202 includes bearings and allows mixing of lubricant for the bearings with the refrigerant it compresses. Compressor 2202 includes a suction port 2238 where the refrigerant enters the compressor 2202 and a discharge port 2240 where compressed refrigerant exits the compressor 2202.

Compressor housing 2204 has a suction port 2238 where gas enters and a discharge port 2240 where gas leaves the compressor housing. Compressor housing 2204 defines a space including cavities accommodating rotors 2206 and 2208. Compressor housing 2204 is configured to, in combination with grooves and lobes of the rotors 2206 and 2208, define compression chambers as the rotors 2206 and 2208 are rotated.

Rotors 2206, 2208 are located within the space defined by compressor housing 2204. Rotors 2206, 2208, may be disposed in respective cavities within compressor housing 2204. The rotors are rotated when operating compressor 2202, and lobes of the rotors 2206 and 2208, combined with the compressor housing, direct refrigerant from the suction port 2238 of the compressor 2202 and compress the refrigerant as it is moved towards the discharge port 2240 of compressor 2202. In an embodiment, rotors 2206 and 2208 have corresponding mated lobes configured to form compression chambers when the rotors 2206, 2208 are rotated. In an embodiment, rotor 2206 is a male rotor and rotor 2208 is a female rotor. In an embodiment, one of the rotors, such as rotor 2206, includes a shaft 2228 that is driven by a motor 2236 to rotate the rotors 2206 and 2208 when the compressor 2202 is in operation. Rotors 2206 and 2208 each have a first end opposite the end where shaft 2228 extends from rotor 2206. The first ends of each of rotors 2206 and 2208 are supported by bearings 2214, 2216.

Bearing cavity 2210 is a space defined by rotors 2206 and 2208, compressor housing 2204 and bearing cover 2212. The bearing cavity 2210 contains bearings 2214 and 2216. A lubricant may be located within the bearing cavity 2210, particularly at bearings 2214, 2216, to lubricate the bearings. The bearing cavity may receive the lubricant from, for example, a lubricant separator 2218. A fluid pathway from lubricant separator 2218 to bearing cavity 2210 may include or be in contact with, for example, a heater.

Bearing cover 2212 encloses an end of compressor housing 2204. Bearing cover 2212, along with compressor housing 2204 and rotors 2206 and 2208 defines bearing cavity 2210. Bearing cover 2212 may include one or more apertures, such as temperature probe aperture 2104 and pressure probe aperture 2106 described above and shown in FIG. 4, through which sensors may be introduced into bearing cavity 2210. In an embodiment, bearing cover 2212 includes a refractive index probe aperture. In an embodiment, bearing cover 2212 includes an aperture through which lubricant in bearing cavity can be introduced into a refractive index sensor.

Bearing 2214 supports an end 2242 of rotor 2206, and bearing 2216 supports an end 2244 of rotor 2208. Bearings 2214 and 2216 may be located at the ends of rotors 2206 and 2208 towards the discharge end of compressor 2202. Bearings 2214 and 2216 allow the respective rotors 2206, 2208 to rotate when the compressor 2202 is operated. Bearings 2214 and 2216 are lubricated by a lubricant present within bearing cavity 2210. Bearings 2214 and 2216 may be, for example, mechanical bearings such as ball bearings, roller bearings, or the like. Compressor 2202 may further include bearings 2246 and 2248 at the suction end of rotors 2206 and 2208, respectively. Bearings 2246 and 2248 may receive lubricant from a common source with bearings 2214 and 2216.

Lubricant separator 2218 is located downstream of the discharge port 2240 of compressor 2202. Lubricant separator 2218 removes lubricant from the flow of refrigerant discharged by compressor 2202 and returns the lubricant to bearing cavity 2210. Lubricant separator 2218 may include a lubricant sump. In an embodiment, lubricant separator 2218 includes a lubricant sump and lubricant heater 2220 thermally coupled to the lubricant sump.

Lubricant heater 2220 is located at the lubricant sump of lubricant separator 2218 or along the lubricant flow path between lubricant separator 2218 and the bearing cavity 2210. Lubricant heater 2220 may be, for example, an electric heater. Lubricant heater 2220 may be a system or waste heat collector thermally coupled to another part of the HVACR system 2200. Lubricant heater 2220 may be controlled based on the lubricant rheological properties within the bearing cavity 2210, for example via controller 2222. In an embodiment, lubricant heater 2220 is located at or within lubricant separator 2218.

In an embodiment, other lubricant conditioning devices may be between lubricant separator 2218 and bearing cavity 2212 in place of or in addition to lubricant heater 2220. The lubricant conditioning devices may include, for example, a filter, an expansion valve or an orifice configured to reduce a pressure of the lubricant, or the like.

In an embodiment, the HVACR system 2200 may include controller 2222. Controller 2222 is configured to receive data from one or more sensors 2224. Controller 2222 is configured to determine, based on at least one output of the one or more sensors 2224, one or more lubricant rheological properties. In an embodiment, controller 2222 is further configured to control operation of the compressor 2202 based on the one or more lubricant rheological properties.

The one or more sensors 2224 may be at least partially disposed within bearing cavity 2210. The one or more sensors 2224 may include a refractive index sensor, a viscometer, a temperature sensor, and/or a pressure sensor. Each of the one or more sensors may have at least a portion, such as a probe, protruding into bearing cavity 2210 through an aperture in bearing cover 2212. In an embodiment, the sensor is located entirely within bearing cavity 2210, and a connection to the controller 2222 extends through an aperture in the bearing cover 2212.

In an embodiment, the one or more lubricant rheological properties determined by controller 2222 include a viscosity ratio, for example a kappa value. The kappa value is the viscosity ratio of the applied viscosity of the lubricant over the rated viscosity for that lubricant. The kappa ratio may be reflective of the surface separation at a rolling contact such as the bearings 2214, 2216, 2246, and/or 2248. In an embodiment, the applied viscosity used to determine kappa is determined based on the bearing cavity temperature and pressure measured by sensors 2224. The bearing cavity temperature and pressure may be used, for example, to determine a lubricant/refrigerant mass fraction of the lubricant being provided to the bearing, which may then be used to determine the applied viscosity. The bearing cavity temperature and pressure may be used to determine the applied viscosity directly based on the known properties of the lubricant and the refrigerant. In an embodiment, the applied viscosity used to determine kappa is determined based a refractive index of the lubricant measured by sensors 2224. The refractive index may be used, for example, to determine the lubricant/refrigerant mass fraction, which may then be used to determine the applied viscosity. The pressure, viscosity, and temperature properties of the lubricant and also of the refrigerant may be used when determining the applied viscosity then used to determine Kappa. In an embodiment, the viscosity ratio is a function of parameters including, for example compressor speed, bearing cavity pressure, bearing cavity pressure, refrigerant properties, lubricant properties, lubricant quality (i.e. lubricant and refrigerant mass fractions) and bearing size. In an embodiment, the applied viscosity used to determine Kappa is determined directly using a viscometer, and the following function to determine Kappa:

$$Kappa = \frac{\text{Viscometer } cSt}{4500 * \left((RPM^{-0.5})*(\text{Bearing Mean Diameter}^{-0.5})\right)}$$

In an embodiment, a sensor 2226 may be located at the suction 2238 of compressor 2202. Sensor 2226 may be, for example a temperature sensor or a pressure sensor. Sensor 2226 may be connected to controller 2222. In an embodiment where sensor 2226 is a temperature sensor, the saturated suction temperature of compressor 2202 may be adjusted by controller 2222 according to a transfer function and the adjusted value used in determining the lubricant rheological properties. In an embodiment where sensor 2226 is a pressure sensor, suction pressure measured by sensor 2226 may be used by controller 2222 to determine a value for bearing cavity pressure to use when determining lubricant rheological properties.

FIG. 6 is a flow chart of a method 2300 of operating a chiller according to an embodiment. Lubrication rheological property parameters are obtained 2302. The lubrication rheological property parameters are used to determine one or more lubricant rheological properties 2304. In an embodiment, the one or more lubricant rheological properties are used to determine an updated compressor operational profile 2306. The compressor is then operated in accordance with the updated compressor operational profile 2308. In an embodiment, a device affecting lubricant rheological properties is operated based on the determined one or more lubricant rheological properties 2310.

One or more lubrication rheological property parameters are obtained 2302 at or near the bearing cavity, such as bearing cavity 2210 described above and shown in FIG. 5. In an embodiment, the one or more lubrication rheological property parameters are a pressure, measured by a pressure sensor located in the bearing cavity, and a temperature, measured by a temperature sensor located in the bearing cavity. In an embodiment, the one or more lubrication rheological property parameters include a refractive index of the lubricant. In this embodiment, the refractive index may be obtained by a sensor located within a bearing cavity, evaluating a sample of the lubricant within the bearing cavity. In an embodiment, the one or more lubrication rheological property parameters include a viscometer reading of the lubricant. The one or more lubrication rheological property parameters may be measured at locations outside the bearing cavity but proximate to the bearing cavity with respect to a flow of refrigerant through a compressor circuit. The locations outside the bearing cavity may include, for example, the suction port of the compressor, one or more points within the compressor but separate from the bearings, or between the discharge of the compressor and the lubricant separator. In an embodiment, the one or more lubrication rheological property parameters are a suction pressure measured at the suction port of the compressor and a bearing cavity temperature. In an embodiment, the lubrication rheological property parameters are a suction pressure of the compressor measured at the suction port of the compressor and a bearing cavity temperature. In an embodiment, a function using a saturated suction temperature, saturated discharge temperature, discharge temperature, and compressor speed may be used to determine a value corresponding to the bearing cavity temperature, which can be used to determine the lubricant rheological properties when combined with suction pressure.

The one or more lubrication rheological property parameters are used to determine one or more lubrication rheological properties 2304. A processor may be used to determine the lubrication rheological properties. In an embodiment, the lubrication rheological properties include viscosity ratio, for example a kappa value. The kappa value is the viscosity ratio of the lubricant, a ratio of the actual viscosity to the rated viscosity for the lubricant. The larger the kappa value is, the better the lubricant is performing. The kappa value of lubricant may need to exceed certain thresholds based on the operational state of the compressor, such as the speed at which the compressor is operating. The kappa value may be determined by a function using the one or more lubrication rheological property parameters. In an embodiment, the one or more rheological properties may be a lambda value, a ratio of oil film thickness to a surface asperity height of the bearing. In an embodiment, the lubrication rheological properties may be used to determine a compressor component life expectancy.

The one or more lubrication rheological properties may be used to determine an updated compressor operational profile 2306. The updated compressor operational profile may include one or more of a position of a valve, a minimum speed for the compressor, or the like. The updated compressor operational profile 2306 may be determined, for example, based on a lookup table of permissible compressor operation, such as capacity and/or speed at given values of lubricant rheological properties. In an embodiment, the updated compressor operational profile determined at 2306 may be a change to the minimum speed of the compressor. In an embodiment, the change to the minimum speed of the compressor may be periodic changes to minimum speed. In an embodiment, the minimum speed may be increased at or near a minimum threshold value for the lubrication rheological properties. In an embodiment, the one or more rheological properties may include a viscosity ratio that is a function of parameters including compressor speed, and that viscosity ratio function may be used to determine a speed included in the updated compressor operational profile. In an embodiment, the relationship between the lubrication rheological properties and speed used to determine the minimum speed may be the following formula:

$$Kappa = \frac{\text{Applied Viscosity}}{4500 * \left((RPM^{-0.5})*(\text{Bearing Mean Diameter}^{-0.5})\right)}$$

The compressor may then be operated according to the updated compressor operational profile 2308. Operating the compressor according to the updated compressor operational profile may include, for example, operating the compressor at a particular speed or capacity. In an embodiment, operating the compressor at a particular speed may be performed by controlling a variable speed drive (VSD) of the compressor. In an embodiment, operating the compressor at the particular capacity may be performed by controlling the position of an expansion device, such as an electronic expansion valve (EXV). In an embodiment, the oil return from an evaporator may be controlled based on the lubricant rheological properties. In an embodiment, the oil return from an evaporator may be reduced in amount when lubricant rheological properties indicate insufficient lubrication. In an embodiment, the timing of oil return from an evaporator may be accelerated when one or more lubricant rheological properties are above a threshold, and slowed when one or more lubricant rheological properties are at or near the threshold.

In an embodiment, operating the compressor according to the updated compressor operational profile may include regular sampling or continuous monitoring of the lubricant rheological properties, and when one or more lubricant rheological properties satisfy a threshold, a predetermined pressure differential may be used for the current load point of the compressor. The predetermined pressure differential may be a standard operating pressure for the compressor, based on an efficiency curve for that compressor.

In an embodiment, a device affecting lubricant rheological properties may be operated based on the determined lubricant rheological properties 2310. In an embodiment, the device affecting lubricant rheological properties is a heater, thermally coupled to at least part of the flow path of the lubricant from an oil separator to the bearing cavity. In an embodiment, the heater is an electric heater. In an embodiment, the heater is a system or waste heat collector thermally coupled to another part of the HVACR system. The operation of the device affecting lubricant rheological properties may be controlled based on, for example, whether one or more lubricant rheological properties satisfy a threshold value. In an embodiment, the device affecting lubricant quality is a controllable expansion valve or orifice, configured to reduce the pressure of the lubricant by a controlled amount. In an embodiment, the device affecting lubricant quality is a drive (e.g. variable speed drive) and/or a motor that may provide heat to gas in the compressor system.

Determining lubricant rheological properties at or near the bearing cavity, instead of using more remote or indirect measurements of lubrication, can allow more efficient use of lubricant enrichment devices such as heaters and can improve the amount of the operational map that can be used during compressor operations. This can allow improved efficiency for compressor operations, for example in variable volume ratio compressors, and under conditions where lubricant rheological properties may be insufficient, such as low ambient temperatures or at low compressor speeds.

Aspects:

Any of aspects 1-9 can be combined with any of aspects 10-18. It is understood that any of aspects 1-18 can be combined with any other aspects recited herein.

Aspect 1. A method for operating a compressor system including a lubricant separator, comprising: measuring one or more parameters of a lubricant via one or more sensors within a bearing cavity of the compressor; and determining one or more lubricant rheological properties based on the one or more parameters.

Aspect 2. The method according to aspect 1, wherein the one or more parameters include a bearing cavity temperature.

Aspect 3. The method according to aspect 2, wherein the one or more parameters further includes a bearing cavity pressure.

Aspect 4. The method according to aspect 2, further comprising measuring a suction pressure of the compressor, and wherein determining the one or more lubricant rheological properties is based on the one or more parameters and the suction pressure, and determining the one or more lubricant rheological properties comprises applying a predetermined transfer function to the suction pressure of the compressor.

Aspect 5. The method according to any of aspects 1-4, wherein the one or more parameters include a refractive index of the lubricant.

Aspect 6. The method according to any of aspects 1-5, wherein the one or more lubricant rheological properties include a kappa value of the lubricant.

Aspect 7. The method according to any of aspects 1-6, further comprising determining, via the controller, an adjusted speed of the compressor based on the one or more lubricant rheological properties; and operating the compressor at the adjusted speed.

Aspect 8. The method according to any of aspects 1-7, further comprising determining, using the controller, an adjusted capacity for the compressor based on the one or more lubricant rheological properties, and operating the compressor at the adjusted capacity.

Aspect 9. The method according to any of aspects 1-8, further comprising operating a heater based on the one or more lubricant rheological properties, wherein the heater is in thermal communication with a flow path of the lubricant from the lubricant separator to the bearing cavity.

Aspect 10. A compressor system, comprising: a compressor, including a suction port and a bearing cavity; one or more sensors located inside the bearing cavity and configured to measure one or more parameters of a lubricant; and a processor, configured to receive the one or more parameters of the lubricant from the one or more sensors and to determine one or more lubricant rheological properties.

Aspect 11. The compressor system according to aspect 10, wherein the one or more parameters include a temperature of the bearing cavity and a pressure within the bearing cavity.

Aspect 12. The compressor system according to any of aspects 10-11, wherein the one or more parameters include a refractive index of the lubricant inside the bearing cavity Aspect 13. The compressor system according to any of aspects 10-12, wherein the one or more lubricant rheological properties include a kappa value of the lubricant.

Aspect 14. The compressor system according to any of aspects 10-13, further comprising a sensor measuring a suction pressure of the compressor, and wherein the processor is configured to determine the one or more lubricant rheological properties based on a bearing cavity temperature and the suction pressure.

Aspect 15. The compressor system according to any of aspects 10-14, wherein the controller is configured to determine an adjusted speed of the compressor based on the one or more lubricant rheological properties and direct operation of the compressor at the adjusted speed.

Aspect 16. The compressor system according to any of aspects 10-15, wherein the controller is configured to determine an adjusted capacity for the compressor based on the one or more lubricant rheological properties, and direct operation of the compressor at the adjusted capacity.

Aspect 17. The compressor system according to any of aspects 10-16, further comprising a lubricant heater in thermal communication with a flow path of the lubricant from the lubricant separator to the bearing cavity, and wherein the controller is configured to direct operation of the lubricant heater based on the one or more lubricant rheological properties.

Aspect 18. The compressor system according to any of aspects 10-17, wherein the one or more sensors include a viscometer and the one or more parameters include a viscosity of the lubricant.

This disclosure is directed to determining one or more lubricant rheological properties in a compressor system based on measurements taken at or near a bearing cavity of the compressor. The measurements may include a viscometer reading, a refractive index, a bearing cavity pressure and a bearing cavity temperature, or a bearing cavity temperature and a suction pressure of the compressor. The one or more lubricant rheological properties may be used to adjust compressor operations including compressor capacity and/or compressor speed. The one or more lubricant rheological properties may be used to control one or more lubricant rheological property management devices such as a heater and/or an expansion valve.

Methods And Systems For Fan Control Based On Lubricant Characteristics (FIGS. 7-10)

At many operating conditions, a chiller may not be operating at full load. For chillers that have variable speed fan(s) and/or fans with a multiple number of fan stages or discrete steps, and that have variable speed or variable load compressor(s) and/or multiple fixed speed compressors that can be staged on/off, a fan speed based on chiller operating condition can be obtained via fan control in the HVAC systems to achieve target power consumption (e.g., power optimization) in the chiller at various unloaded conditions, i.e. conditions not at full load or conditions at partial load.

The HVACR system includes a heat transfer circuit to heat or cool a process fluid (e.g., air, water and/or glycol, or the like). A working fluid flows through the heat transfer circuit and is utilized to heat or cool the process fluid. In an embodiment, the working fluid includes one or more refrigerants. There has been recent movement (e.g., the Kigali Amendment to the Montreal Protocol, the Paris Agreement, United States' Significant New Alternatives Policy ("SNAP")) to limit the types of refrigerants utilized in HVACR systems as concern about environmental impact (e.g., ozone depletion, global warming impact) has increased. In particular, the movement has been to replace ozone depleting refrigerants (e.g., chlorofluorocarbons (CFCs), hydrochlorofluorocarbons (HCFCs), or the like) and high global warming potential refrigerants with refrigerants that have a lower environmental impact.

The replacement refrigerants are non-ozone depleting, flammable or non-flammable, energy efficient, compatible with the materials of the heat transfer circuit and its equipment, low in toxicity, and chemically stable over the life of the equipment of the heat transfer circuit. For example, previous refrigerants having relatively higher GWPs such as R134a or the like, are being replaced with refrigerants such as, but not limited to, R1234ze (e.g., R1234ze(E)), R513A, and the like.

The heat transfer circuit includes a compressor that compresses the working fluid. Lubricant is supplied to the compressor to provide lubrication for its moving parts. A lubricant may include one or more types of lubricants. For example, a lubricant be, but is not limited to, polyolester (POE) oils, or the like. The lubricant is discharged from the compressor with the working fluid. Thus, the working fluid discharged from the compressor contains lubricant. In some heat transfer circuits, the lubricant is also separated from the working fluid and the separated lubricant is circulated back to the compressor. In other heat transfer circuits, the lubricant is circulated with the working fluid and is then supplied through a suction inlet of the compressor as part of the working fluid. The working fluid may also include one or more additional components other than lubricant(s) and refrigerant(s). For example, an additional component may be, but is not limited to, impurities, refrigeration system additives, tracers, ultraviolet ("UV") dyes, and/or solubilizing agents.

Various issues may arise with the use of the newer/replacement refrigerants due to having different properties relative to previous refrigerants such as R134a. For example, newer refrigerants with lower GWPs such as R1234ze (e.g., R1234ze(E)), R513A, and the like are more soluble in the lubricant relative to previous refrigerants such as R134a due to their chemical structures. Accordingly, the lubricant provided back to the compressor contains a higher concentration of refrigerant. The higher concentration of refrigerant decreases the viscosity of the lubricant, which reduces the amount of lubrication ("lubricity") provided by the lubricant. In particular, when a compressor is operated at certain operating conditions, the lubricant provided to the bearings of the compressor may not provide adequate lubricity due to the concentration of refrigerant in the lubricant being too high. The compressor might be operated to avoid operation conditions where lubricity of the lubricant becomes an issue. However, this may result in being unable to use certain areas of the operating map of a compressor that may be efficient for a desired operation of the compressor (e.g., desired flow rate of working fluid discharged by a compressor, a desired pressure for the discharged working fluid, or the like).

Lubricant (e.g., oil and/or oil/refrigerant mixture) characteristics include, for example, lubricant quality (e.g. the mass fraction of the refrigerant dissolved in the lubricant), lubricant viscosity, and lubricant kappa value. Lubricant characteristics concern can be greater with more efficient compressor(s). As the compressor becomes more efficient, at a low ambient temperature with low compressor load, the discharge superheat can be relatively low. Low discharge superheat can result in less than sufficient lubricant characteristics such as lubricant quality. Lubricant characteristics such as lubricant quality can be a function of discharge superheat. The embodiments described herein can determine a less efficient chiller operation which makes the compressor work a little harder (less efficient) for the same load, increases the discharge superheat, and achieves target lubricant characteristics.

In an embodiment, a method of controlling condenser fans in an HVAC system is provided. The method includes obtaining, by a controller, a measurement of a measureable parameter of the HVAC system. The method also includes determining, by the controller, a differential pressure between a condenser and an evaporator based on the measurement and a predetermined threshold (e.g., a threshold for the discharge superheat). The method further includes outputting, by the controller, a fan speed suitable to achieve the differential pressure determined. Also the method includes controlling one or more condenser fans based on an output of the fan speed to obtain a fan capacity suitable to control the one or more condenser fans, such that power of the HVAC system is managed through a power consumed by a compressor and the one or more condenser fans. The measureable parameter is indicative of lubricant characteristics.

In an embodiment, an HVAC system is provided. The system includes a compressor, an evaporator fluidly connected to the compressor, a condenser fluidly connected to the compressor, and a controller. The condenser includes one or more condenser fans. The controller is operatively connected to a device to measure a measureable parameter of the HVAC system, is configured to obtain a measurement of the measureable parameter, and is operatively connected to the condenser including the one or more condenser fans. The controller is also configured to determine a differential pressure between the condenser and the evaporator based on the measurement and a predetermined threshold. The controller is further configured to determine a fan speed suitable to achieve the differential pressure determined. Also the controller is configured to operate the one or more condenser fans based on an output of the fan speed to obtain a fan capacity suitable to control the one or more condenser fans, such that the power of the HVAC system is managed through power consumed by the compressor and the one or more condenser fans. The measureable parameter is indicative of lubricant characteristics.

Other features and aspects will become apparent by consideration of the following detailed description and accompanying drawings.

This disclosure relates generally to fan control for HVAC systems. More specifically, the disclosure relates to methods and systems for controlling fan(s) to achieve a balance between compressor(s) and fan(s) for target lubricant characteristics for HVAC system(s). "Target" lubricant characteristics refer to, for example, a lubricity of the lubricant provided to the compressor where the compressor can operate at the full operating map with such lubricant having the lubricity. It will be appreciated that "target" lubricant characteristics can refer to one or more of the lubricant characteristics that exceeds the minimum requirement for operation. It will also be appreciated that "target" lubricant characteristics can refer to an optimal lubricant characteristic. It will also be appreciated that "target" efficiency of the chiller can refer to an optimal efficiency of the chiller. The "target" efficiency of the chiller can be achieved by, for example, determining a fan speed to minimize total power consumption at the chiller capacity by using the compressor load and the ambient temperature.

For chillers that have variable speed fan(s) and/or fans with a multiple number of fan stages or discrete steps, and that have variable speed or variable load compressor(s) and/or multiple fixed speed compressors that can be staged on/off, a fan speed based on chiller operating condition can be obtained via fan control in the HVAC systems to achieve target power consumption (e.g., power optimization) in the chiller at various unloaded conditions, i.e. conditions not at full load or conditions at partial load. U.S. Pat. No. 9,810,469, which is incorporated herein by reference in its entirety, describes a fan speed control system to determine a fan speed to minimize total power consumption at the chiller capacity, based on various operating conditions of compressor load and ambient air temperature.

In one embodiment, lubricant characteristics can be a function of discharge superheat. Lubricant characteristics concern(s) can be greater with more efficient compressor(s). As the compressor becomes more efficient, at a low ambient temperature with low or partial compressor load, the discharge superheat can be relatively low. Higher compressor efficiency can result in lower discharge superheat. Low discharge superheat can result in less than sufficient lubricant characteristics. The embodiments described herein can determine a less efficient chiller operation which makes the compressor work a little harder (less efficient) for the same load, increases the discharge superheat, and achieves target lubricant characteristics. High lubricant characteristics (such as target or better than target lubricant characteristics) can ensure a long lifecycle of the compressor. It will be appreciated that the chemistry of which type of refrigerant is used, and/or which type of lubricant is used can determine the sensitivity of the lubricant characteristics when the discharge superheat changes.

Figure 7:
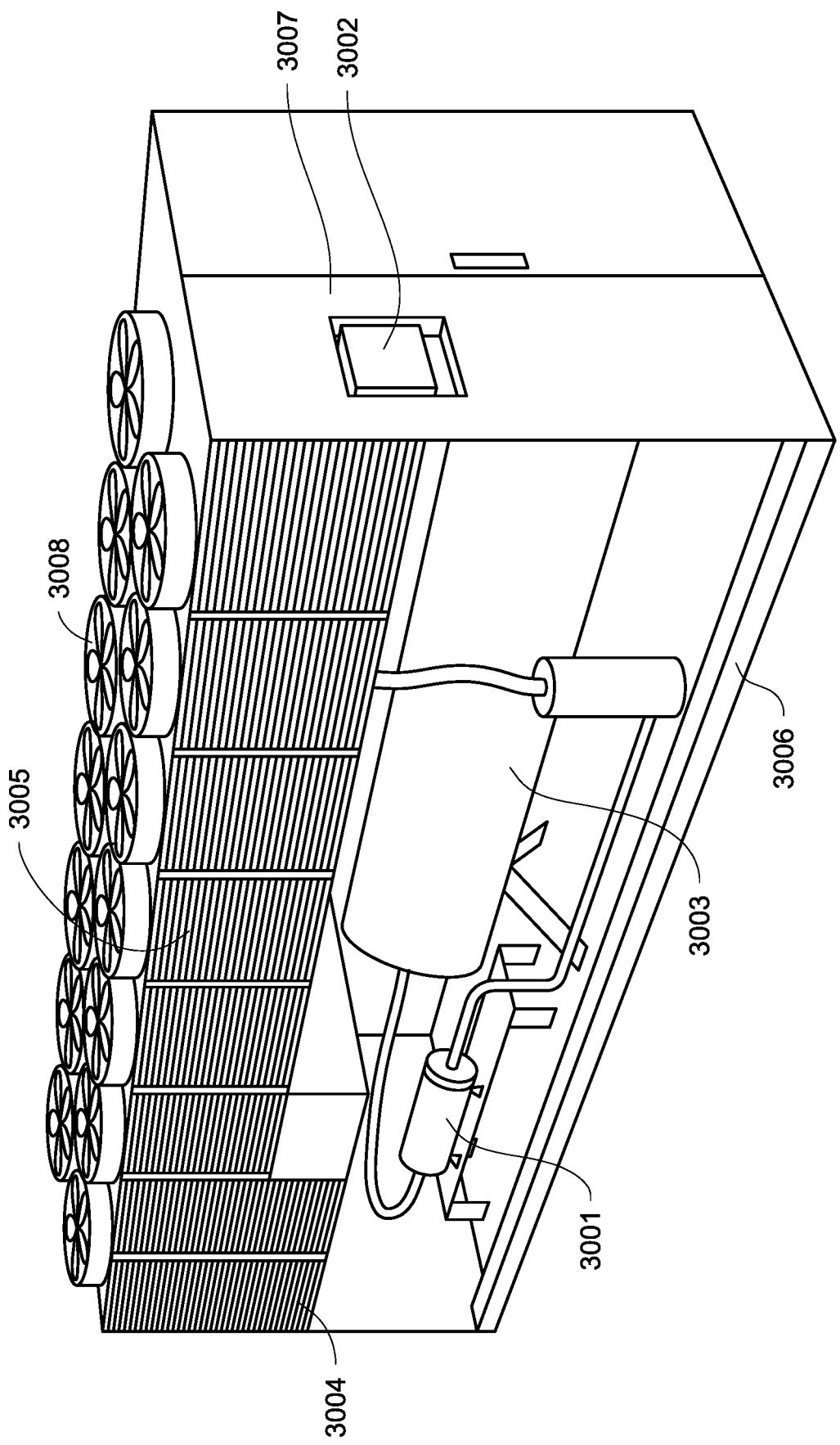
FIG. 7 is a schematic view of an HVAC system that can employ fan control, according to one embodiment.

FIG. 7 shows a schematic view of a chiller in an HVAC system to control fan(s). FIG. 7 shows one embodiment of a chiller (such as an air cooled chiller) that has a compressor 3001, an evaporator 3003, a condenser 3004 with air coil 3005 and fans 3008, and a control unit 3002 and panel 3007. It will be appreciated that the compressor 3001 can be a variable speed compressor or a variable load compressor and/or one of the multiple fixed speed compressors that can be staged on/off, and that the fans 3008 can be variable speed fan(s) and/or fan(s) with a multiple number of fan stages or discrete steps. The condenser 3004 and its air coil 3005 in the embodiment shown are one example of an air cooled condenser, however it will be appreciated that the specific condenser 3004/coil 3005 combination shown is merely exemplary. The chiller can be considered a single unit within the HVAC system and be supported by a frame 3006 for example. It will be appreciated that the specific configuration shown in FIG. 7 is merely exemplary, as other chiller designs, layouts, and specific configurations may be employed. For example, the chiller of FIG. 7 can be a chiller with "W" shaped coils; however, it will be appreciated that other coil types may be used, such as for example multiple "V" shaped coils or more than one circuit employing multiple compressors, evaporators, condensers. Generally, the methods and systems to control fan can be employed in any type of chiller with variable speed fan(s) and/or with fan(s) that have a multiple number of fan stages or discrete steps and variable speed (or variable load) compressor(s) and/or multiple fixed speed compressors that can be staged on/off.

Figure 8:
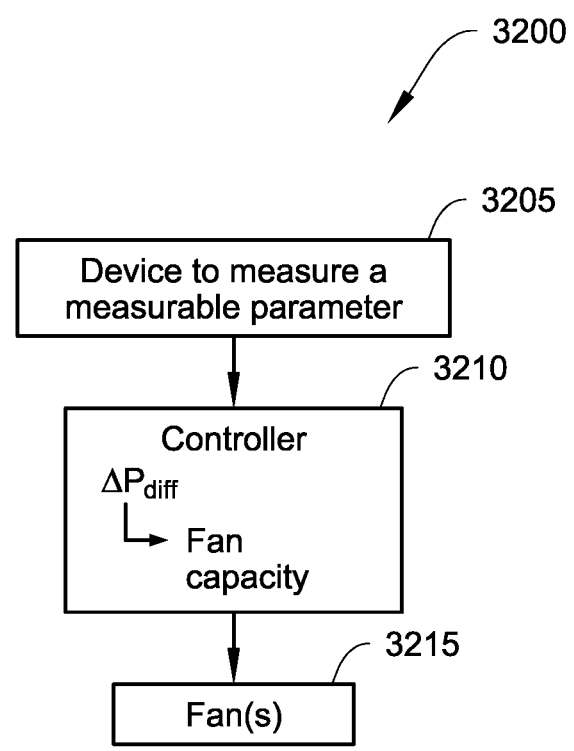
FIG. 8 illustrates a fan control system, according to one embodiment.

FIG. 8 illustrates fan control 3200 that can include devices to detect, obtain, or otherwise determine the inputs needed for a controller to determine the appropriate output to control fan(s). In one embodiment, a device 3205 is used to measure a measureable parameter (e.g., temperature, pressure) of an HVAC system. The device 3205 communicates the measurement to a controller 3210. The controller 3210 uses the measurement to obtain a superheat (e.g., the discharge superheat). The controller 3210 can control the fan(s) 3215 based on the obtained superheat and target lubricant characteristics (e.g., the predetermined lubricity of the lubricant where the compressor can operate at the full operating map with such lubricant, or predetermined discharge superheat because lubricant characteristics can be a function of discharge superheat). The device 3205 can periodically update the measurements taken as needed and/or desired, such as automatically, during/after an operation change or changing conditions of the chiller, and/or manually. It will be appreciated that the controller 3210 can use the most recent measurement data available unless otherwise specified.

The controller 3210 can be implemented into, for example, control unit 3002 and panel 3007 in FIG. 7. It will be appreciated that the control unit 3002, such as shown in the chiller of FIG. 7, generally can include a processor (not shown), a memory (not shown), and optionally a clock (not shown) and an input/output (I/O) interface (not shown), and the control unit 3002 can be configured to receive data as input from various components within an HVAC system, such as the components shown in FIG. 7 and FIG. 8, and can also send command signals as output to various components within the HVAC system.

In one embodiment, superheat can be defined as a difference between the actual temperature of the refrigerant vapor and the saturation temperature (boiling point) of the refrigerant at the same measuring location. In one embodiment, the saturation temperature (boiling point) of the refrigerant can be obtained by measuring a pressure (e.g., discharge pressure or suction pressure) of the refrigerant by using, for example, a pressure sensor, a gauge, and then converting the measured pressure to a temperature (saturation temperature). In an embodiment, the device 3205 can include a pressure sensor, a gauge, or the like to measure the pressure. The device 3205 can also include a temperature sensor to measure the actual temperature of the refrigerant vapor. In one embodiment, discharge superheat is the superheat obtained at the compressor discharge side (e.g., in the lubricant separator, or in the bearing cavity), which is the measured actual temperature of the refrigerant vapor minus the obtained saturation temperature (boiling point) of the refrigerant at the same measuring location at the compressor discharge side.

In one embodiment, lubricant characteristics can be a function of discharge superheat. Perceived low lubricant characteristics (such as less than sufficient lubricant quality) correspond to a low discharge superheat value. When the controller 3210 determines that the obtained discharge superheat drops below a predetermined value (which corresponds to the perceived low lubricant characteristics), the controller 3210 can determine a first differential pressure ($\Delta Pdiff$) between a condenser and an evaporator (or between a compressor suction side and a compressor discharge side) to achieve target lubricant characteristics.

In one embodiment, the controller 3210 can determine a second differential pressure ($\Delta Pdiff$) between a condenser and an evaporator (or between a compressor suction side and a compressor discharge side), based on a measured ambient air temperature and an obtained present load on the compressor, to achieve a target (e.g., optimal) efficiency of the chiller by, for example, balancing the power requirements of the compressor(s) and the fan(s).

It will be appreciated that the first differential pressure is to achieve target lubricant characteristics, and the second differential pressure is to achieve target efficiency of the chiller. Both the first differential pressure and the second differential pressure are used to determine corresponding fan speed (and/or compressor speed) to achieve the target lubricant characteristics or the target efficiency. It will also be appreciated that at a low or partial load (where efficiency is not as important), the compressor might not generate enough superheat to keep the target lubricant characteristics. In an embodiment, when the discharge superheat drops below a predetermined value (which corresponds to the perceived low lubricant characteristics), the controller 3210 can determine the first differential pressure to make the compressor work harder (corresponding to a slower fan speed) than when the compressor works under the second differential pressure, so that the superheat (and lubricant characteristics) increases (giving up efficiency). When the discharge superheat is at or above the predetermined value (indicative of target lubricant characteristics), the controller 3210 can determine the second differential pressure to make the compressor work more efficiently (corresponding to a faster fan speed) than when the compressor works under the first differential pressure, to achieve the target efficiency (in such case, the superheat (and lubricant characteristics such as lubricant quality) can decrease).

The ambient air temperature can be measured by, for example, a temperature sensor (not shown). The temperature sensor can communicate the ambient temperature measurement to the controller 3210. The present load on the compressor can be determined based on a compressor's running speed, which in some examples may be expressed as a percentage of rated speed for a particular compressor frame size, e.g. relative to the compressor full speed configured limit. A device (not shown) can measure and communicate for example, the percentage of rated speed of the compressor to the controller 3210. It will be appreciated that, depending on the method of unloading of the compressor, mechanical unloader position sensor(s) may be considered to obtain the compressor load, e.g. compressor speed. In other embodiments, compressor load, e.g. compressor speed, could also be estimated indirectly such as for example by a change in evaporator water temperature obtained by the controller through use of for example temperature sensor(s).

In operation, the controller 3210 can determine the second differential pressure between a condenser and an evaporator, based on a measured ambient air temperature and an obtained present load on the compressor, to achieve target efficiency of the chiller. If the controller 3210 determines that an obtained discharge superheat drops below a predetermined value, the controller 3210 can determine a first differential pressure between the condenser and the evaporator to achieve target lubricant characteristics. It will be appreciated that the first differential pressure can be set to a value greater than the second differential pressure. With a larger differential pressure, the chiller is less efficient—the compressor works harder (less efficient) for the same load, the discharge superheat is thus increased, and target lubricant characteristics can be achieved. When the differential pressure is larger, typically the compressor speed is higher (for variable speed compressors), and the fan speed is lower for the same load. In another embodiment, for a larger differential pressure when a variable load compressor is used, an unloader can be used to change (e.g., increase) the load of the compressor; and the fan speed can be decreased.

If the controller 3210 determines that an obtained discharge superheat is no less than the predetermined value, the controller 3210 can determine and/or set the first differential pressure to be the same as the second differential pressure. In such a case, both the target lubricant characteristics and the target efficiency of the chiller can be achieved.

It will be appreciated that the controller 3210 can use lubricant viscosity and/or lubricant kappa value instead of (or in addition to) discharge superheat, to determine the first differential pressure.

In one embodiment, the discharge superheat (and/or lubricant viscosity and/or lubricant kappa value) can be an integral of the discharge superheat (and/or lubricant viscosity and/or lubricant kappa value) over a predetermined period of time to track how far the discharge superheat (and/or lubricant viscosity and/or lubricant kappa value) is below the predetermined value over time. If the integral exceeds a certain value, the controller 3210 can set the first differential pressure to a value greater than the second differential pressure, to achieve target lubricant characteristics. If the integral decreases to or below the certain value, the controller 3210 can set the first differential pressure to be the same as the second differential pressure to also achieve efficiency of the chiller.

It will be appreciated that the target differential pressure (e.g., the first differential pressure or the second differential pressure) can be added to the suction pressure from the compressor to obtain a target discharge pressure of the compressor. As the fans may change speed to reach a target discharge pressure of the compressor, the unit capacity, e.g. of the chiller, can also change to a new compressor speed. The new compressor speed can then in turn change the output target differential pressure across the compressor. The chilled water temperature control then drives the chiller to the appropriate chiller capacity.

In one embodiment, the fan control can determine the fan speed to achieve target lubricant characteristics by using the discharge superheat to obtain the output target differential pressure (the first differential pressure). The fan control can also determine the fan speed to minimize total power consumption at that unit capacity by using the compressor load and the ambient temperature to obtain the output target differential pressure (the second differential pressure).

The output target differential pressure (the first or second differential pressure) in turn can be used to determine the appropriate fan capacity, e.g. based on the resulting fan speed that can (1) meet the target lubricant characteristics (when the first differential pressure is used), or (2) minimize total power consumption at that unit capacity, for example the relative power consumed by the compressor and by the fans (when the second differential pressure is used).

It will be appreciated that compressor speed in rpm can be commanded by the controller, e.g. 3210, in response to, for example, the chiller water temperature control loop of a water chiller. In the methods and systems described herein, differential pressure can be the controller output parameter, and discharge superheat (for the first differential pressure) can be the input parameter used to obtain the output parameter. In the methods and systems described herein, differential pressure can be the controller output parameter, and compressor load and/or ambient temperature (for the second differential pressure) can be the input parameter used to obtain the output parameter.

It will be appreciated that the use of target differential pressure is just one example of a control parameter obtained from the input parameter, and is not meant to be limiting. It will be appreciated that the input parameter(s) could be used to output fan speed directly, rather than using them to first obtain the target differential pressure.

In some embodiments, the controller 3210 may employ a high pressure avoidance control to control fan capacity in multi-stages such as for example, when the condensing temperature approaches the condenser pressure limit, fan capacity can be added in discrete fixed speed fan stages in systems using variable speed fan(s) and/or fan(s) with a multiple number of fan stages or discrete steps.

Figure 9:
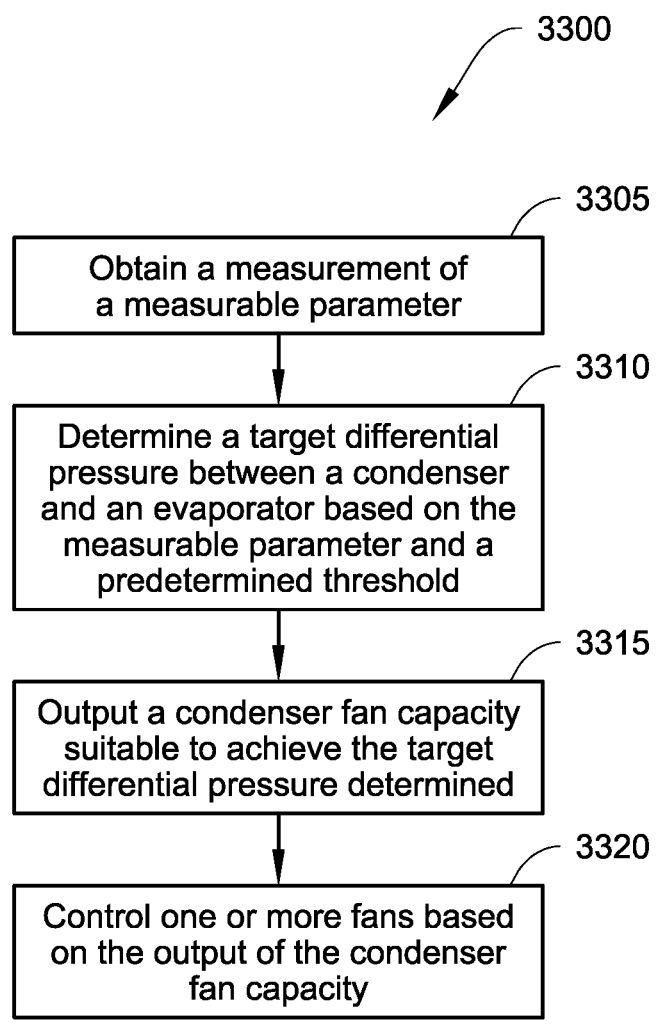
FIG. 9 is a flow chart of a method on fan control, according to one embodiment.

FIG. 9 is a flow chart of one embodiment of a method 3300 of fan control. The method 3300 of controlling condenser fans in an HVAC system includes obtaining a measurement of a measureable parameter 3305. The measureable parameter can be one or more of a discharge superheat, a viscosity of lubricant used in the HVAC system, or a kappa value of the lubricant. With a controller, a target differential pressure between a condenser and an evaporator can be determined 3310, which can be based on, for example, the measureable parameter (such as the discharge superheat) and a predetermined threshold. If the measurement is less than the predetermined threshold, the controller can set the differential pressure (the first differential pressure) to a value greater than a second differential pressure between the condenser and the evaporator, to achieve target lubricant characteristics. In one embodiment, the second differential pressure can be based on a measured ambient air temperature and an obtained present load on the compressor. If the measurement is no less than the predetermined threshold, the controller can set the differential pressure (the first differential pressure) to be equal to a second differential pressure between the condenser and the evaporator.

With the controller, a condenser fan speed suitable to achieve a fan capacity can be outputted 3315 and that is suitable to achieve the target differential pressure determined. One or more variable speed fans can be controlled 3320 based on the output of condenser fan speed to achieve the fan capacity. It will be appreciated that the fans may be fans with a multiple number of fan stages or discrete steps, or a combination of variable speed fan(s) and fan(s) with a multiple number of fan stages or discrete steps. In an embodiment, when fixed speed fan(s) with a multiple number of fan stages or discrete steps are used, for example, to drop the amount of airflows, some fan(s) can be turned off, to increase the amount of airflows, more fan(s) can be turned on.

Using a system with such a control method, the differential pressure target can be varied based on the measureable parameter (such as the discharge superheat) to determine the fan speed, which can achieve target lubricant characteristics. At part load and full load operation conditions, the control can determine the fan speed to obtain efficiencies in the circuit to allow trade-offs between condenser fan power (which can increase to keep system differential pressure relatively low) and compressor power (which can increase when system differential pressure increases). In an embodiment, the objective is to achieve balance between compressor speed (or load) and the fan speed (or staging) to provide target efficiency (e.g., for the overall chiller performance or compressor performance) for a given capacity. In such embodiment, the discharge superheat generated by the compressor might not be high enough to achieve target lubricant characteristics. As a result, the control of the compressor speed (or load) and the fan speed (or staging) is moved from target efficiency to target lubricant characteristics to increase the discharge superheat (by e.g. making the compressor to work harder or less efficient for the same load and/or by lowering the fan speed).

It will be appreciated that a differential pressure (e.g., the second differential pressure) based on, for example, the compressor load and the ambient temperature, can be used to achieve target efficiency of the chiller. A differential pressure (e.g., the first differential pressure) based on, for example, a desired discharge superheat (or lubricant viscosity, or lubricant kappa value) can be used to achieve target lubricant characteristics. Moving from target efficiency to target lubricant characteristics can increase the discharge superheat (and thus the lubricant characteristics) but the efficiency of the chiller can be lower (compared with target efficiency).

It will also be appreciated that in an operation map for fan control to achieve target efficiency, the fan control (e.g., fan speed control) can be a function of the compressor speed/load and the ambient temperature. It will be appreciated that the fan control to achieve target chiller efficiency works better around minimum compressor speed (for example, 1400 rpm) than at other compressor speed. It will further be appreciated that to achieve target lubricant characteristics, in the corresponding areas of the operating map, discharge superheat can be raised by utilizing fan control to target higher differential pressures. The higher pressure differential results in the compressor doing more work for the same operating point (e.g., in the operating map) providing a higher discharge superheat value and thus higher lubricant characteristics.

Testing and/or simulation show that in one embodiment, for a screw compressor in an air cooled chiller, from a baseline configuration, when the power consumption of the chiller increases about 33.5% (e.g., the fan speed decreases 32% and the compressor speed increases about 4%), the discharge superheat gains about one degree (Fahrenheit). Testing and/or simulation also show that in one embodiment, for a screw compressor in an air cooled chiller, from a baseline configuration, when the power consumption of the chiller increases about 68% (e.g., the fan speed decreases 43% and the compressor speed increases about 8%), the discharge superheat gains about four degrees (Fahrenheit). In an embodiment, the baseline configuration is based on the chiller operating at target efficiency (e.g., optimal efficiency achieved by determining a fan speed by minimizing total (e.g., compressor and fan) power consumption at a certain operating load and/or capacity of the chiller).

Figure 10:
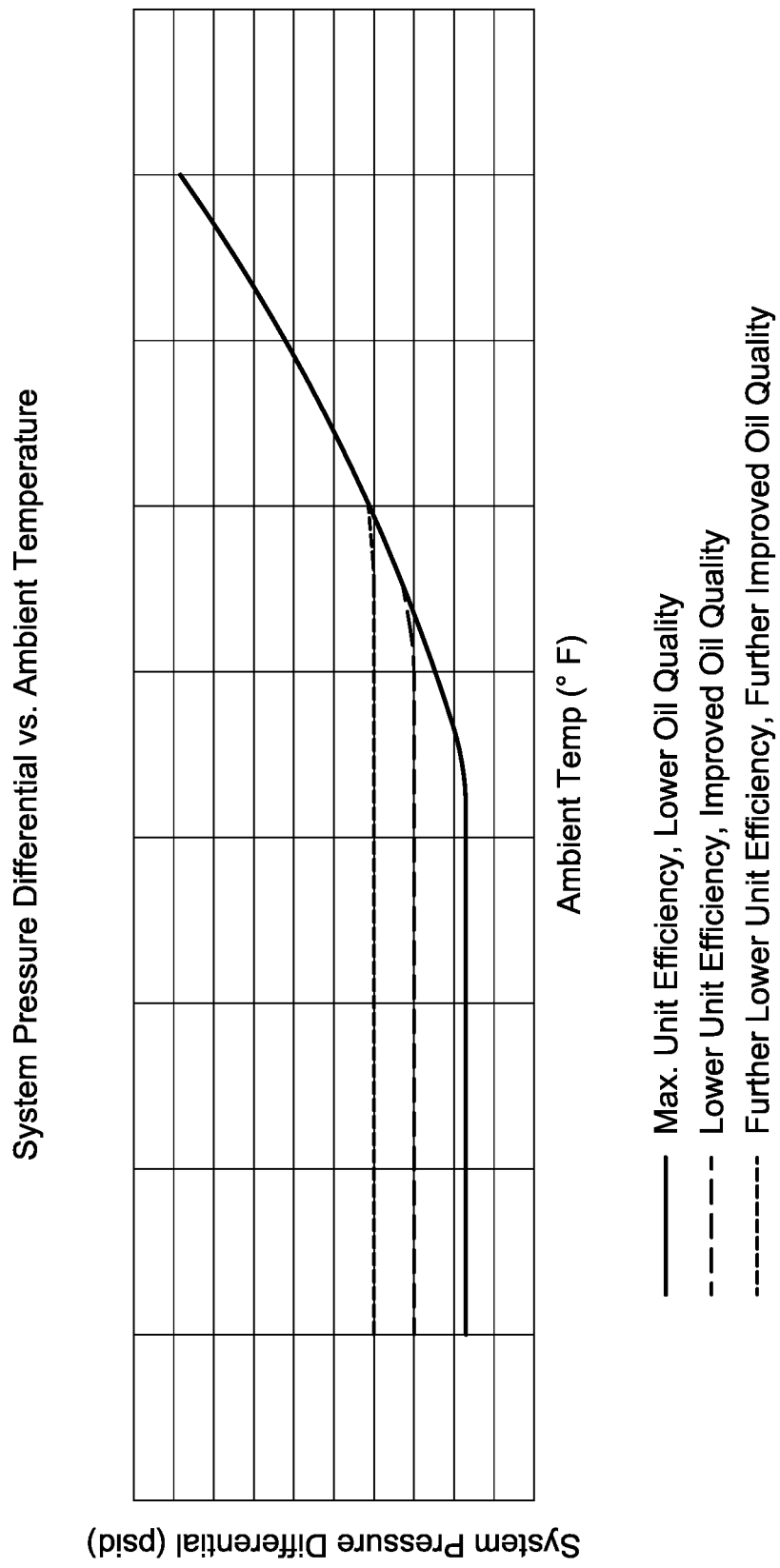
FIG. 10 shows a relationship between the system pressure differential and the ambient temperature, according to one embodiment

FIG. 10 shows a relationship between the system pressure differential and the ambient temperature, according to one embodiment. In FIG. 10, the vertical coordinate is the system pressure differential (unit psid), and the horizontal coordinate is the ambient temperature. The solid line represents a fan control curve to achieve the maximum unit efficiency (but the lubricant characteristics (such as lubricant quality) are low because of, e.g., low discharge superheat). The dotted lines represent fan control curves to achieve lower (and/or further lower) unit efficiency (compared with the maximum unit efficiency) but the lubricant characteristics are improved (and/or further improved) because of, e.g., increased discharge superheat.

It will be appreciated that as soon as the fan control is changed from target lubricant characteristics control to target efficiency control, the dotted lines transition/merge into the solid line. It will be appreciated that lubricant characteristics can be a function of discharge superheat. For any given saturated discharge temperature, the lubricant characteristics improve as the discharge superheat improves/increases.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

Aspects:

Any of aspects 1-7 can be combined with any of aspects 8-14. It is understood that any of aspects 1-14 can be combined with any other aspects recited herein.

Aspect 1. A method of controlling condenser fans in a heating, ventilation, and air conditioning (HVAC) system, comprising: obtaining, by a controller, a measurement of a measureable parameter of the HVAC system; determining, by the controller, a differential pressure between a condenser and an evaporator based on the measurement and a predetermined threshold; outputting, by the controller, a fan speed suitable to achieve the differential pressure determined; and controlling one or more condenser fans based on an output of the fan speed to obtain a fan capacity suitable to control the one or more condenser fans, such that power of the HVAC system is managed through a power consumed by a compressor and the one or more condenser fans, wherein the measureable parameter is indicative of lubricant characteristics.

Aspect 2. The method of aspect 1, wherein the measureable parameter is one of a discharge superheat of the compressor, a viscosity of lubricant used in the HVAC system, or a kappa value of the lubricant.

Aspect 3. The method of aspect 1 or aspect 2, wherein the compressor is a variable speed compressor or a variable load compressor.

Aspect 4. The method of any one of aspects 1-3, wherein the one or more condenser fans are variable speed fans or fans with fan stages.

Aspect 5. The method of any one of aspects 1-4, wherein the measurement is an integral of measured values of the measureable parameter over a predetermined period of time.

Aspect 6. The method of any one of aspects 1-5, further comprising: determining a second differential pressure between the condenser and the evaporator based on a measured ambient air temperature and an obtained present load on the compressor, wherein if the measurement is less than the predetermined threshold, the differential pressure is set to greater than the second differential pressure.

Aspect 7. The method of any one of aspects 1-6, further comprising: determining a second differential pressure between the condenser and the evaporator based on a measured ambient air temperature and an obtained present load on the compressor, wherein if the measurement is no less than the predetermined threshold, the differential pressure is set to the second differential pressure.

Aspect 8. A heating, ventilation, and air conditioning (HVAC) system, comprising: a compressor; an evaporator fluidly connected to the compressor; a condenser fluidly connected to the compressor; the condenser including one or more condenser fans; a controller operatively connected to a device to measure a measureable parameter of the HVAC system, configured to obtain a measurement of the measureable parameter, and operatively connected to the condenser including the one or more condenser fans; the controller configured to determine a differential pressure between the condenser and the evaporator based on the measurement and a predetermined threshold, the controller configured to determine of a fan speed suitable to achieve the differential pressure determined, and the controller configured to operate the one or more condenser fans based on an output of the fan speed to obtain a fan capacity suitable to control the one or more condenser fans, such that the power of the HVAC system is managed through power consumed by the compressor and the one or more condenser fans, wherein the measureable parameter is indicative of lubricant characteristics.

Aspect 9. The system of aspect 8, wherein the measureable parameter is one of a discharge superheat of the compressor, a viscosity of lubricant used in the HVAC system, or a kappa value of the lubricant.

Aspect 10. The system of aspect 8 or aspect 9, wherein the compressor is a variable speed compressor or a variable load compressor.

Aspect 11. The system of any one of aspects 8-10, wherein the one or more condenser fans are variable speed fans or fans with fan stages.

Aspect 12. The system of any one of aspects 8-11, wherein the measurement is an integral of measured values of the measureable parameter over a predetermined period of time.

Aspect 13. The system of any one of aspects 8-12, wherein if the measurement is less than the predetermined threshold, the differential pressure is set to greater than a second differential pressure between the condenser and the evaporator, the second differential pressure is based on a measured ambient air temperature and an obtained present load on the compressor.

Aspect 14. The system of any one of aspects 8-13, wherein if the measurement is no less than the predetermined threshold, the differential pressure is set to a second differential pressure between the condenser and the evaporator, the second differential pressure is based on a measured ambient air temperature and an obtained present load on the compressor.

Methods and systems for controlling condenser fans in a heating, ventilation, and air conditioning (HVAC) system are provided. The method includes obtaining, by a controller, a measurement of a measureable parameter of the HVAC system. The method also includes determining, by the controller, a differential pressure between a condenser and an evaporator based on the measurement and a predetermined threshold. The method further includes outputting, by the controller, a fan speed suitable to achieve the differential pressure determined. Also the method includes controlling one or more condenser fans based on an output of the fan speed to obtain a fan capacity suitable to control the one or more condenser fans, such that power of the HVAC system is managed through a power consumed by a compressor and the one or more condenser fans.

Heat Transfer Circuit With Increased Compressor Suction Heat, And Operating Method Thereof (FIGS. 11-16)

AN HVACR system can include a heat transfer circuit configured to heat or cool a process fluid (e.g., air, water and/or glycol, or the like). A working fluid is circulated through the heat transfer circuit. The heat transfer circuit includes a compressor for compressing the working fluid. The working fluid and process fluid separately flow through a heat exchanger to cool or heat the process fluid. The heat exchanger may be a condenser or an evaporator.

The working fluid is heated by a first heating that occurs due to heat exchange between the working fluid and the process fluid. A flow path of the working fluid through the heat transfer circuit includes a suction stream. The suction stream extends from a location where a first heating occurs to the suction inlet of the compressor. The suction stream includes a heat source. The heat source is configured to heat the working fluid flowing through the suction stream. The heat source provides a second heating of the working fluid after the first heating.

In an embodiment, the working fluid includes one or more refrigerants.

In an embodiment, the heat source is disposed after the evaporator and before the compressor. The heat source heats the working fluid within the suction stream as it flows from the evaporator to the compressor.

In an embodiment, the heat source is located in the evaporator. The heat source is located between the location of the first heating and the outlet of the evaporator. The heat source heats the working fluid after it has been heated by the process fluid and before it exits the evaporator.

In an embodiment, high temperature compressed working fluid is discharged by the compressor and utilized by the heat source to provide the heat for the second heating. The heat source is configured so that at least a portion of the compressed working fluid flows through the heat source. Working fluid in the suction stream is heated as it flows through the heat source and absorbs heat from the compressed working fluid also flowing through the heat source. The heat source is configured to utilize the compressed working fluid to heat the working fluid of the suction stream.

In an embodiment, a method of operating a heat transfer circuit includes heating a working fluid with a process fluid in an evaporator. The method also includes heating the working fluid with a heat source after the working fluid has been heated by the process fluid.

A heating, ventilation, air conditioning, and refrigeration system ("HVACR") is generally configured to heat and/or cool an enclosed space (e.g., an interior space of a commercial building or a residential building, an interior space of a refrigerated transport unit, or the like). The HVACR system includes a heat transfer circuit to heat or cool a process fluid (e.g., air, water and/or glycol, or the like). A working fluid flows through the heat transfer circuit and is utilized to heat or cool the process fluid. In an embodiment, the working fluid includes one or more refrigerants. The working fluid may heat and/or cool a process fluid directly or indirectly. For example, indirect heating and/or cooling may include the working fluid heating and/or cooling an intermediate fluid (e.g., air, water and/or glycol, or the like), and then the heated/cooled intermediate fluid heating and/or cooling the process fluid.

There has been recent movement (e.g., the Kigali Amendment to the Montreal Protocol, the Paris Agreement, United States' Significant New Alternatives Policy ("SNAP")) to limit the types of refrigerants utilized in HVACR systems as concern about environmental impact (e.g., ozone depletion, global warming impact) has increased. In particular, the movement has been to replace ozone depleting refrigerants (e.g., chlorofluorocarbons (CFCs), hydrochlorofluorocarbons (HCFCs), or the like) and high global warming potential refrigerants with refrigerants that have a lower environmental impact.

The replacement refrigerants are non-ozone depleting, flammable or non-flammable, energy efficient, compatible with the materials of the heat transfer circuit and its equipment, low in toxicity, and chemically stable over the life of the equipment of the heat transfer circuit. For example, previous refrigerants having relatively higher GWPs such as R134a or the like, are being replaced with refrigerants such as, but not limited to, R1234ze (e.g., R1234ze(E)), R513A, and the like.

The heat transfer circuit includes a compressor that compresses the working fluid. Lubricant is supplied to the compressor to provide lubrication for its moving parts. A lubricant may include one or more types of lubricants. For example, a lubricant may be, but is not limited to, one or more polyolester (POE) oils, mineral oils, or the like. The lubricant is discharged from the compressor with the working fluid. Thus, the working fluid discharged from the compressor contains lubricant. In some heat transfer circuits, the lubricant is also separated from the working fluid and the separated lubricant is circulated back to the compressor. In other heat transfer circuits, the lubricant is circulated with the working fluid and is then supplied through a suction inlet of the compressor as part of the working fluid. The working fluid may also include one or more additional components other than lubricant(s) and refrigerant(s). For example, an additional component may be, but is not limited to, impurities, refrigeration system additives, tracers, ultraviolet ("UV") dyes, and/or solubilizing agents.

Various issues may arise with the use of newer/replacement refrigerants due to having different properties relative to previous refrigerants such as R134a. For example, newer refrigerants with lower GWPs such as R1234ze (e.g., R1234ze(E)), R513A, and the like may be more soluble in the lubricant relative to previous refrigerants such as R134a due to their chemical structures. Accordingly, the lubricant provided back to the compressor contains a higher concentration of refrigerant. The higher concentration of refrigerant decreases the viscosity of the lubricant, which reduces the amount of lubrication ("lubricity") provided by the lubricant. In particular, when a compressor is operated at certain operating conditions, the lubricant provided to the bearings of the compressor may not provide adequate lubricity due to the concentration of refrigerant in the lubricant being too high. The compressor might be operated to avoid operation conditions where lubricity of the lubricant becomes an issue. However, this may result in being unable to use significant areas of the operating map of a compressor that are most efficient for a desired operation of the compressor (e.g., desired flow rate of working fluid discharged by a compressor, a desired pressure for the discharged working fluid, or the like). As such, the incorporation and use of newer/replacement refrigerants may result in compressors being operated in a less efficient manner to avoid lubrication issues. Embodiments described herein are directed to heat transfer circuits and methods of operating a heat transfer circuit that help reduce and/or avoid such lubrication issues without having to avoid specific operating conditions of a compressor due to, for example, the use of newer/replacement refrigerants.

Figure 11:
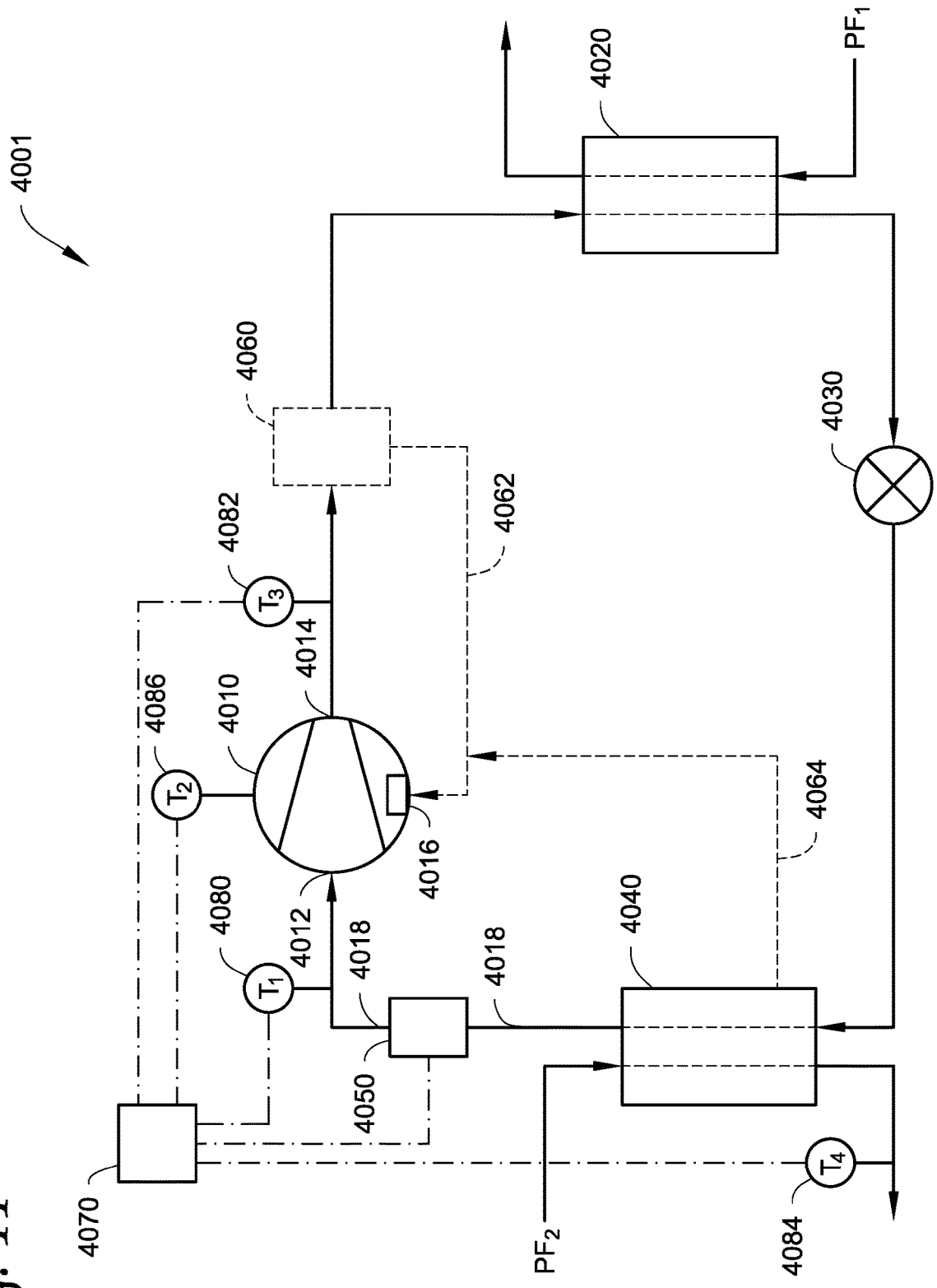
FIG. 11 is a schematic diagram of a heat transfer circuit, according to an embodiment.

FIG. 11 is a schematic diagram of a heat transfer circuit 4001 according to an embodiment. In an embodiment, the heat transfer circuit 4001 may be employed in an HVACR system. The heat transfer circuit 4001 includes a compressor 4010, a condenser 4020, an expansion device 4030, an evaporator 4040, and a heat source 4050. Optionally, the heat transfer circuit 4001 may also include a lubricant separator 4060 as shown in FIG. 11. In an embodiment, the heat transfer circuit 4001 can be modified to include additional components such as, for example, an economizer heat exchanger, one or more flow control devices, a receiver tank, a dryer, a suction-liquid heat exchanger, or the like.

The components of the heat transfer circuit 4001 are fluidly connected. The heat transfer circuit 4001 can be configured as a cooling system (e.g., a fluid chiller of an HVACR system, an air conditioning system, or the like) that can be operated in a cooling mode, or the heat transfer circuit 4001 may be configured to operate as a heat pump system that can run in a cooling mode or a heating mode.

A working fluid flows through the heat transfer circuit 4001. The flow path of the working fluid through the heat transfer circuit 4001 extends from the compressor 4010 through the lubricant separator 4060, the condenser 4020, the expansion device 4030, the evaporator 4040, the heat source 4050, and back to the compressor 4010. The working fluid includes one or more refrigerants with a lower environmental impact and may include one or more additional components as discussed above. Dotted lines are provided in the Figures to indicate fluid flows through the heat exchangers (e.g., condenser 4020, evaporator 4040), and should be understood as not specifying specific flow paths for the fluid flows through the heat exchangers. Dashed and dotted lines are provided in the Figures to illustrate electronic communications between different features. For example, a dashed dotted line extends between a temperature sensor 4080 and a controller 4070 as the controller 4070 receives temperatures readings from the temperature sensor 4080. For example, a dashed dotted line extends from the controller 4070 to the heat source 4050 as the controller 4070 can provide energy and/or electronically control the heat source 4050 in an embodiment.

Working fluid in a lower pressure gaseous state is drawn into the suction inlet 4012 of the compressor 4010. In an embodiment, the compressor 4010 is a screw compressor or a scroll compressor. A screw compressor utilizes one or more rotating screws to compress a gas. Trapped spaces are formed along the blades of the screw(s) as the screw rotates. As the screw(s) rotate, a trapped space is moved along a length of the screw and becomes smaller. Gas in the trapped space is compressed as the trapped space becomes smaller. The trapped space eventually rotates along an opening and is released as compressed gas. A scroll compressor includes at least one pair of scrolls. Each scroll includes a baseplate and a wrap, and the wraps of the pair of scrolls are intermeshed. One or both of the scrolls are moved such that the scrolls orbit/rotate relative to each other. As the scrolls orbit/rotate relative to each other, a trapped space between the intermeshed wraps and the baseplates is moved along the intermeshed wraps in a clockwise or counter-clockwise direction and becomes smaller. The gas in the trapped space is compressed as the trapped space becomes smaller. The trapped space eventually reaches an outlet located along a diameter or central location of the baseplates and is released as compressed gas.

In an embodiment, the lubricant for the bearings 4016 of the compressor 4010 may be provided with the working fluid via the suction inlet 4012 of the compressor 4010. In such an embodiment, the compressor 4010 may also be a different type of compressor than a screw or scroll compressor.

The working fluid is compressed as it flows from the suction inlet 4012 to an outlet 4014 of the compressor 4010. The compression of the working fluid in the compressor 4010 also increases the temperature of the working fluid. Thus, the compressed working fluid discharged from the outlet 4014 of the compressor has a higher temperature. The compressor 4010 utilizes a lubricant to lubricate its moving parts (e.g., rotor, bearings 4016). Lubricant mixes with the working fluid flowing through the compressor 4010 such that the compressed working fluid discharged from the compressor 4010 contains lubricant.

In an embodiment, the high pressure and temperature working fluid flows from the outlet 4014 of compressor 4010 to the lubricant separator 4060. The working fluid discharged from the compressor 4010 includes a gaseous portion and a liquid portion. The gaseous portion of the working fluid contains gaseous refrigerant. The gaseous portion of the working fluid may also contain entrained lubricant. The liquid portion contains lubricant and refrigerant dissolved in the lubricant. The gaseous and liquid portions of the working fluid may also include one or more additional components, respectively, as discussed above. The lubricant separator 4060 is configured to physically separate the gaseous working fluid from the liquid lubricant. A primary lubricant flow path 4062 fluidly connects the lubricant separator 4060 to the compressor 4010. The liquid lubricant is separated in the lubricant separator 4060. The separated liquid lubricant then flows back to the compressor 4010 from the lubricant separator 4060 through the primary lubricant flow path 4062. In an embodiment, the separated lubricant is provided to the bearings 4016 of the compressor 4010.

The higher pressure and temperature gaseous working fluid flows from the lubricant separator 4060 to and through the condenser 4020. A first process fluid $PF_1$ also separately flows through the condenser 4020. The condenser 4020 is a heat exchanger that allows the working fluid and the first process fluid $PF_1$ to be in a heat transfer relationship within the condenser 4020 without physically mixing. As the working fluid and first process fluid $PF_1$ flow through the condenser 4020, the working fluid is cooled by the first process fluid $PF_1$. The process fluid $PF_1$ is heated by the working fluid and exits the condenser 4020 at a higher temperature. In an embodiment, the first process fluid $PF_1$ may be air, water and/or glycol, or the like that is suitable for absorbing and transferring heat from the working fluid and the heat transfer circuit 4001. For example, the first process fluid $PF_1$ may be ambient air circulated from an outside atmosphere, water to be heated as hot water, or a fluid for transferring heat from the heat transfer circuit 4001. The working fluid becomes liquid or mostly liquid as it is cooled in the condenser 4020.

The liquid/gas working fluid flows from the condenser 4020 to the expansion device 4030. The expansion device 4030 allows the working fluid to expand. The expansion causes the working fluid to significantly decrease in temperature. In an embodiment, the expansion device 4030 may be an expansion valve, expansion plate, expansion vessel, orifice, the like, or other such types of expansion mechanisms. It should be appreciated that the expansion device 4030 may be any type of expander used in the field for expanding a working fluid causing the working fluid to decrease in temperature.

The lower temperature gaseous/liquid working fluid then flows from the expansion device 4030 to and through the evaporator 4040. A second process fluid $PF_2$ also flows through the evaporator 4040 separately from the working fluid. The evaporator 4040 is a heat exchanger that allows the working fluid and the second process fluid $PF_2$ to be in a heat transfer relationship within the evaporator 4040 without physically mixing. As the working fluid and second process fluid $PF_2$ flow through the evaporator 4040, the working fluid absorbs heat from the second process fluid $PF_2$ cooling the second process fluid $PF_2$. In an embodiment, the evaporator 4040 may be a flooded evaporator as described below with respect to FIG. 15. In an embodiment, the working fluid exiting the evaporator 4040 may be at or about its saturation temperature.

In an embodiment, the second process fluid $PF_2$ is air cooled by the HVACR system and ventilated to the enclosed space to be conditioned. In an embodiment, the second process fluid $PF_2$ may be an intermediate fluid (e.g., water, heat transfer fluid, or the like) and the cooled second process fluid $PF_2$ may then be utilized by the HVACR system to cool air. The working fluid is mostly gaseous as it exits the evaporator 4040.

In some embodiments, lubricant that was entrained in gaseous working fluid exiting the lubricant separator 4060 is later separated due to the temperature and/or pressure changes of the working fluid as it flows to and/or through the evaporator 4040. This separated lubricant may flow to a bottom of the evaporator 4040. In an embodiment, an optional secondary lubricant flow path 4064 may fluidly connect the evaporator 4040 to the compressor 4010 and allow the liquid lubricant in the evaporator 4040 to flow back to the compressor 4010.

The mostly gaseous working fluid flows from the evaporator 4040 to and through the heat source 4050. The heat source 4050 further heats the working fluid. The heat source 4050 heats the working fluid to increase the superheat of the working fluid. Superheat is a measure of the temperature change relative to the temperature at which the working fluid evaporates at a set pressure (e.g., $T(P_x)_{superheat} = T(P_x)_{Actual} - T(P_x)_{Saturation}$). For example, increasing superheat of the working fluid is an increase in the temperature of the working fluid to above the saturation temperature at which the refrigerant(s) of the working fluid change state from a liquid to vapor.

In an embodiment, the heat source 4050 in FIG. 11 is an electrical heat source that generates heat from supplied electricity. A suction pipe 4018 extends from outlet of the evaporator 4040 to the suction inlet 4012 of the compressor 4010. In an embodiment, the suction pipe 4018 may include one or more sections or portions (i.e. not be a single continuous length of pipe). In an embodiment, the heat source 4050 contacts an outside surface of the suction pipe 4018. In such an embodiment, the heat source 4050 may be wrapped around the suction pipe 4018. In an embodiment, the heat source 4050 may be located within the suction pipe 4018. The heat source 4050 being disposed outside of the suction pipe 4018 may be advantageous as the heat source 4050 is not located in the flow path of the working fluid and can avoid causing a pressure drop.

The flow path of the working fluid through the heat circuit 4001 includes a suction stream. The suction stream is disposed after the location where the working fluid is heated by the second process fluid $PF_2$ and before the compressor 4010. In an embodiment, the suction stream extends from a location after where the working fluid is heated by the second process fluid $PF_2$ to the suction inlet 4012 of the compressor 4010. In an embodiment, the suction stream extends from the evaporator 4040 to the suction inlet 4012 of the compressor 4010. In FIG. 11, the suction stream includes the heat source 4050 and the suction pipe 4018. In an embodiment, the heat transfer circuit 4001 may include additional components (one or more pipes, flow control device(s), a receiver tank, a dryer, or the like) disposed between the evaporator 4040 and the compressor 4010. In such an embodiment, the suction stream may also include such additional components. The heat source 4050 is configured to provide heat to and increase the temperature of the working fluid flowing through the suction stream (i.e. increase the suction temperature $T_1$).

The temperature of the working fluid entering the compressor 4010 ("suction temperature $T_1$") is increased by the heat source 4050. The heat source 4050 increases the temperature of the working fluid as it flows through the suction stream. The increase of the suction temperature $T_1$ causes an increase in a temperature $T_2$ of the compressor 4010 itself and the temperature $T_3$ of the working fluid exiting the compressor 4010 ("discharge temperature $T_3$").

As discussed above, the working fluid discharged from the compressor 4010 includes liquid lubricant. The lubricant is circulated back to the compressor 4060. In FIG. 11, the lubricant is separated in the lubricant separator 4060 and separately circulated back to the compressor 4010 (e.g., through primary lubricant flow path 4062). However, the heat transfer circuit 4001 in an embodiment may not include the lubricant separator 4060. In an embodiment, the lubricant may be configured to be circulated back to the compressor 4010 as part of the working fluid without being separated with a lubricant separator 4060. In such an embodiment, the lubricant may enter through the suction inlet 4012 of the compressor 4010 as part of the working fluid.

As discussed above, the lubricant may contain dissolved refrigerant that decreases the lubricity of the lubricant, which has a negative impact on the efficiency of the compressor 4010 and the heat transfer circuit 4001. Additionally, the separated lubricant is at a higher pressure after the lubricant separator 4060 in FIG. 11. As discussed above, the working fluid is compressed as it flows through the compressor 4010 from the suction inlet 4012 to the outlet 4014. For example, the working fluid has its highest pressure at the outlet 4014 of the compressor 4010. The lubricant may be provided to the compressor 4010 at a location before the outlet 4014. Accordingly, the lubricant undergoes a pressure drop as it goes from a higher pressure to a lower pressure. The pressure drop liberates at least some of the refrigerant dissolved in the lubricant. The liberation of the refrigerant in the lubricant allows the refrigerant to expand and thereby cool the lubricant. This temperature decrease of the lubricant further decreases the lubricity of the lubricant, reducing and/or countering the increased lubricity caused by the lubricant having a lower concentration of refrigerant.

The increase in the temperature $T_2$ of the compressor 4010 increases the temperature of the lubricant flowing through the compressor 4010. This can reduce and/or counter the temperature decrease caused by the refrigerant being liberated due to the pressure drop. Accordingly, the lubricant has a decreased concentration of refrigerant due to the pressure drop while no longer having a reduced temperature due to the liberation of refrigerant caused by the pressure drop. This advantageously reduces and/or prevents the lowered lubricity caused by dissolved refrigerant while also reducing and/or preventing a temperature decreased that also decreases the lubricity of the lubricant.

The concentration of refrigerant in the lubricant separated in the lubricant separator 4060 is based on temperature and pressure. A higher temperature causes a lower concentration of refrigerant to be dissolved in the lubricant. Thus, an increase in the discharge temperature $T_3$ of the working fluid results in the separated lubricant having a lower concentration of refrigerant. The increased discharge temperature $T_3$ causes the separated lubricant supplied back to the compressor 4010 from the lubricant separator 4060 to advantageously have an increased viscosity and lubricity due to its lower concentration of refrigerant.

The heat transfer circuit 4001 includes a circuit controller 4070 that controls the heat output of the heat source 4050. In an embodiment, the circuit controller 4070 controls a heat output of the heat source 4050 based on at least one of the suction temperature $T_1$, the discharge temperature $T_3$, and/or a temperature of the second process fluid $PF_2$ after the passing through the evaporator 4040 ("second process fluid exit temperature $T_4$"). In an embodiment, a desired temperature for the second process fluid exit temperature $T_4$ may be at or about 10° F. to at or about 75° F. In an embodiment, a desired temperature for the second process fluid exit temperature $T_4$ may be at or about 44° F. In an embodiment, the circuit controller 4070 may be an HVACR controller for controlling operation of the HVACR system.

In an embodiment, the circuit controller 4070 may control the heat provided by the heat source 4050 to the working fluid so that the suction temperature $T_1$ is within a desired temperature range. In an embodiment, the heat transfer circuit 1 may be configured so that the working fluid entering the suction inlet 4012 contains the lubricant for lubricating the compressor 4010. For example, a desired temperature range for the suction temperature $T_1$ in an embodiment may be based on one or more of a chemical degradation temperature of the lubricant, a minimum efficiency for the compressor 4010, and/or the concentration of lubricant in the liquid portion of the working fluid entering the suction inlet 4012. In an embodiment, the desired temperature for the suction inlet temperature $T_1$ may be at or about 0° F. to at or about 70° F. In an embodiment, the desired temperature for the suction inlet temperature $T_1$ may be at or about 40° F. In an embodiment, the superheat of the working fluid entering the compressor 4010 may be at least 6° F. (e.g., $T_1-T_{Sat} \geq 6°$ F.). In an embodiment, the superheat of the working fluid entering the compressor 4010 may at or about 6° F. to at or about 15° F. (e.g., 15° F. $\geq (T_1-T_{Sat}) \geq 6°$ F.).

In an embodiment, the circuit controller 4070 may control the heat output of the heat source 4050 so that the discharge temperature $T_3$ is within a desired temperature range. For example, a desired temperature range for the discharge temperature $T_3$ may be based on one or more of a chemical degradation temperature of the lubricant, a minimum efficiency for the compressor 4010, and/or a concentration of the lubricant in the liquid portion of the working fluid discharged from the compressor 4010. In an embodiment, a desired temperature for the discharge temperature $T_3$ may be at or about 60° F. to at or about 180° F. In an embodiment, a desired temperature for the discharge temperature $T_3$ may be at or about 125° F. In an embodiment, the discharge temperature $T_3$ may be controlled so that the separated lubricant provided to the bearings 4016 has a lubricant concentration of 70% or greater.

The circuit controller 4070 in FIG. 11 utilizes a sensor 4080 to detect the suction inlet temperature $T_1$, a sensor 4082 to detect the discharge temperature $T_3$, a sensor 4084 to detect the second process fluid exit temperature $T_4$, and a sensor 4086 to detect the temperature $T_2$ of the compressor 4010. In an embodiment, the heat transfer circuit 4001 may include one or more sensors (e.g., sensor 4080, sensor 4082, sensor 4084, sensor 4086, or the like) as suitable and/or desired for controlling the heat source 4050 to provide the desired amount of heat to the working fluid as discussed above.

Figure 12:
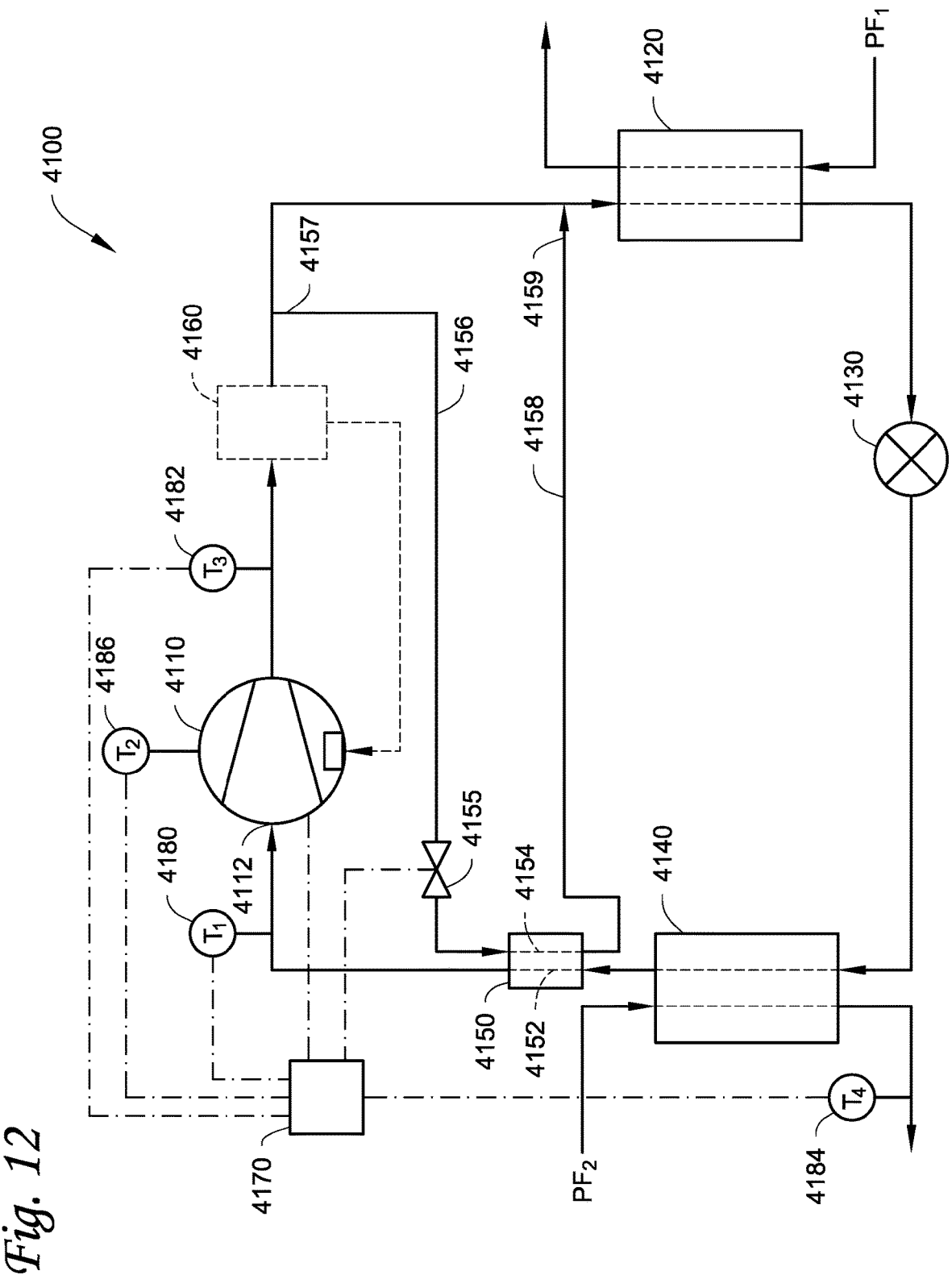
FIG. 12 is a schematic diagram of a heat transfer circuit, according to an embodiment.

FIG. 12 is a schematic diagram of a heat transfer circuit 4100 according to an embodiment. In an embodiment, the heat transfer circuit 4100 may be employed in an HVACR system. The heat transfer circuit 4100 is similar to the heat transfer circuit 4001 in FIG. 11, except with respect to a heat source 4150 and the flow of working fluid between the lubricant separator 4160 and the condenser 4120. For example, the heat transfer circuit 4100 includes a compressor 4110, the optional lubricant separator 4160, the condenser 4120, an expansion device 4130, and an evaporator 4140. The condenser 4120 utilizes a first process fluid $PF_1$ to cool the working fluid, and the evaporator 4140 utilizes the working fluid to cool a second process fluid $PF_2$ similar to the heat transfer circuit 4001 in FIG. 11. In an embodiment, the evaporator 4140 may be a flooded evaporator as described below with respect to FIG. 15. In an embodiment, the working fluid exiting the evaporator 4140 may be at or about its saturation temperature.

The heat source 4150 is configured to increase the suction temperature $T_1$ of the working fluid entering the compressor 4110 similar to the heat source 450 in FIG. 11. As shown in FIG. 12, the heat source 4150 is a heat exchanger with a first side 4152 and a second side 4154. It should be understood that "side" refers to a separate flow passageway through the heat source 4150, and not to a particular physical orientation. Fluids in the first side 4152 and second side 4154 of the heat source 4150 exchange heat but do not mix. Working fluid from the evaporator 4140 flows to the heat source 4150, through the first side 4152, and from the heat source 4150 to the compressor 4110. A first passageway 4156 and second passageway 4158 extend from opposite ends of the second side 4154. A portion of the compressed working fluid exiting the lubricant separator 4160 flows into the first passageway 4156, through the second side 4154 of the heat source 4150, through the second passageway 4158, and to the condenser 4120. A second portion of the compressed working fluid exits the lubricant separator 4160, flows past the first and second passageways 4156, 4158, and to the condenser 4120. The end 4159 of the second passageway 4158 opposite to the heat source 4150 is fluidly connected downstream of the end 4157 of the first passageway 4156 opposite to the heat source 4150.

In FIG. 12, the first passageway 4156 and second passageway 4158 are connected between the lubricant separator 4160 and the condenser 4120. However, the first passageway 4156 and/or the second passageway 4158 in an embodiment may be connected at a different location than shown in FIG. 12. In an embodiment, the first passageway 4156 may be connected between the compressor 4110 and the expansion device 4130. In an embodiment, the first passageway 4156 may be connected between the compressor 4110 and the lubricant separator 4160. In another embodiment, the first passageway 4156 may be connected between the condenser 4120 and the expansion device 4130. In such an embodiment, a portion of the compressed working fluid discharged from the compressor 4110 would flow from the lubricant separator 4160, through the condenser 4120, through the heat source 4150, then enter then expansion device 4130.

In an embodiment, the second passageway 4158 may be connected at a different location. In an embodiment, the second passageway 4158 may be connected between the condenser 4120 and the expansion device 4130. In an embodiment, the second passageway 4158 may be connected between the expansion device 4130 and the evaporator 4140, and may include a second expansion device to provide an expansion to the working fluid flowing through the second passageway 4158 similar to the expansion device 4130. In an embodiment, the portion of compressed working fluid may flow from the heat source 4050, through the second expansion device, and to the evaporator 4140, bypassing the expansion device 4130. In such embodiments, the compressed working fluid flowing through the heat source 4050 may bypass one or both of the condenser 4120 and the expansion device 4130.

As discussed above, the working fluid increases in temperature as the working fluid is compressed in the compressor 4110. Accordingly, the working fluid discharged from the compressor 4110 has a higher temperature and pressure. The heat source 4150 utilizes the higher temperature compressed working fluid to heat the working fluid flowing from the evaporator 4140 to the compressor 4110. Utilizing the compressed working fluid in the heat source 4150 may be advantageous as the heat source 4150 does not require additional heat (e.g., heat generated from electricity, heat provided by an external process fluid or fluid circuit) to be added to the heat transfer circuit 4100.

The heat transfer circuit 4100 includes a circuit controller 4170. A control valve 4155 regulates the flow rate of the compressed working fluid through the second side 4154 of the heat source 4150. The circuit controller 4170 controls the heat provided to the working fluid flowing through the first side 4152 of the heat source 4150 using the control valve 4155. In an embodiment, the circuit controller 4170 may be an HVACR controller of the HVACR system.

The amount of heat provided to the working fluid flowing through the heat source 4150 may be controlled in a similar manner as discussed regarding the heat source 4050 in FIG. 11. For example, the circuit controller 4170 may control the amount of heat provided to the working fluid flowing through the first side 4152 of the heat source 4150 based on at least one of the suction temperature $T_1$, the discharge temperature $T_3$, and/or the second process fluid exit temperature $T_4$. In an embodiment, the heat transfer circuit 4100 may include one or more sensors (e.g., sensor 4180, sensor 4182, sensor 4184, sensor 4186, and the like) as suitable and/or desired for the heat source 150 to provide the desired amount of heat to the working fluid as discussed above.

The heat source 4150 in FIG. 12 is an active system. However, it should be appreciated that the heat source 4150 in FIG. 12 may be configured as a passive system. In an embodiment, heat transfer circuit 4100 may be configured so that the working fluid exits the evaporator 4140 within a set temperature range, and the flow rate of compressed working fluid through the heat source 4150 is a set amount or within a set range so that the working fluid reaches a desired temperature (e.g., suction temperature $T_1$ is above a desired temperature) as discussed above.

The heat source 4150 in FIG. 12 utilizes the compressed working fluid. However, it should be appreciated that the heat source 4150 may utilize a different fluid to heat the working fluid flowing through the first side 4152 instead of the compressed working fluid. In an embodiment, the heat source 4150 may utilize the first process fluid $PF_1$, the second process fluid $PF_2$, or a third process fluid (e.g., hot air, hot water, or the like) that flows through the second side 4154 to heat the working fluid. In an embodiment, a portion of the second process fluid $PF_2$, before entering the evaporator 4140, may flow through the second side 4154 of the heat source 4150 instead of the compressed working fluid. The portion of the second process fluid $PF_2$ may then flow through the evaporator 4140 or bypass the evaporator 4140 before joining the rest of the second process fluid $PF_2$. In another embodiment, the first process fluid $PF_1$ (or a portion of the first process fluid $PF_1$) after being heated in the condenser 120 may flow through the second side 4154 of the heat source 4150 instead of the compressed working fluid.

In FIG. 12, the lubricant is separated in the lubricant separator 4160 and separately circulated back to the compressor 4110. However, the heat transfer circuit 4100 in an embodiment may not include the lubricant separator 4160. In an embodiment, the lubricant may be configured to be circulated back to the compressor 4010 as part of the working fluid without being separated with a lubricant separator 4060. In such an embodiment, the lubricant may enter through the suction inlet 4012 of the compressor 4010 as part of the working fluid.

The flow path of the working fluid through the heat circuit 4100 includes a suction stream. The suction stream is disposed after the location where the working fluid is heated by the second process fluid $PF_2$ and before the compressor 4110. In an embodiment, the suction stream extends from a location after where the working fluid is heated by the second process fluid $PF_2$ to the suction inlet 4112 of the compressor 4110. In an embodiment, the suction stream extends from the evaporator 4140 to the suction inlet 4112 of compressor 4110. In FIG. 12, the suction stream includes the heat source 4150, the pipe that fluidly connects the evaporator 4140 to the heat source 4150, and the suction pipe that fluidly connects the heat source 4150 to the suction inlet 4112 of the compressor 4110. In an embodiment, the heat transfer circuit 4100 may include additional components (one or more pipes, flow control device(s), a receiver tank, a dryer, or the like) disposed between the evaporator 4140 and the compressor 4110. In such an embodiment, the suction stream may also include such additional components. The heat source 4150 is configured to provide heat to and increase the temperature of the working fluid flowing through the suction stream (i.e. increase the suction temperature $T_1$).

Figure 13:
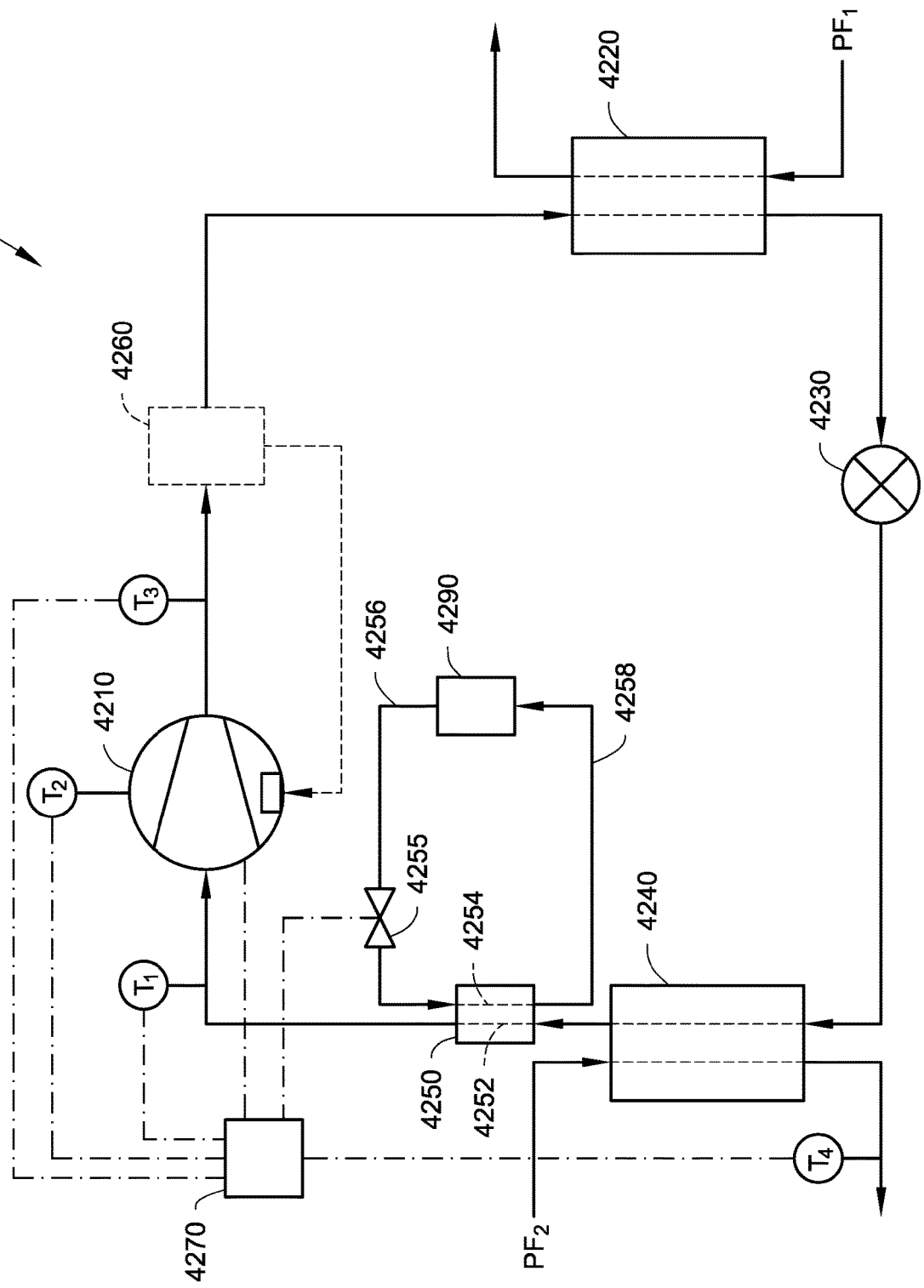
FIG. 13 is a schematic diagram of a heat transfer circuit, according to an embodiment.

FIG. 13 is a schematic diagram of a heat transfer circuit 4200 according to an embodiment. In an embodiment, the heat transfer circuit 4200 may be employed in an HVACR system. The heat transfer circuit 4200 is similar to the heat transfer circuit 4100 in FIG. 12, except with respect to fluid utilized by the heat source 4250 for heating the working fluid. For example, the heat transfer circuit includes a compressor 4210, an optional lubricant separator 4260, a condenser 4220, an expansion device 4230, an evaporator 4240, and a circuit controller 4270.

Similar to the heat transfer circuit 4100, the flow path of the working fluid through the heat circuit 4100 includes a suction stream. The suction stream is disposed after the location where the working fluid is heated by the second process fluid $PF_2$ in the evaporator 240 and before the compressor 4110. The suction stream includes the heat source 4250. The heat source 4250 is disposed in the suction stream between the evaporator 4240 and the compressor 4210. The heat source 4250 is configured to heat the gaseous or mostly gaseous working fluid as it flows from the evaporator 4240 to the compressor 4210.

The heat source 4250 is a heat exchanger that includes a first side 4252 and a second side 4254. The working fluid from the evaporator 4240 flows to the heat source 4250, through the first side 4252, and from the heat source 4250 to the compressor 4210. The heat source 4250 is fluidly connected to a secondary cooling circuit 4290. In an embodiment, the secondary cooling circuit 4290 may be for cooling electronics. For example, the electronics may be the electronics of the compressor 4210 or an HVACR system of the heat circuit 4200. The secondary cooling circuit 4290 utilizes a working fluid to provide cooling. The working fluid provides cooling by absorbing heat. The working fluid of the secondary cooling circuit 4290 is provided to the heat source 4250 as a third process fluid. In an embodiment, the third process fluid may be and/or include air, water, refrigerant(s), or the like. The third process fluid has an elevated temperature as it absorbs heat to provide cooling in the secondary cooling circuit 4290. The third process fluid having a temperature sufficient for superheating the working fluid flowing through the heat source 4250.

A first passageway 4256 and a second passageway 4258 extend from opposite ends of the second side 4254 and fluidly connect the second side 4254 of the heat source 4250 to the secondary cooling circuit 4290. The third fluid flows from secondary cooling circuit 4290 into the first passageway 4256, through the second side 4254 of the heat source 4250, through the second passageway 4258, and back to secondary cooling circuit 4290. As similarly discussed above regarding the heat source 4150 in FIG. 12, the third fluid flowing through the second side 4254 is configured to superheat the gaseous or mostly gaseous working fluid as it flows through the heat source 4250.

The heat transfer circuit 4200 may include a control valve 4255 regulates the flow rate of the third fluid through the second side 4254 of the heat source 4250. In a similar manner as discussed above regarding the circuit controller 4170 in FIG. 12, the circuit controller 4270 may control the heat provided to the working fluid flowing through the first side 4252 of the heat source 4250 using the control valve 4255. In an embodiment, the circuit controller 4270 may be an HVACR controller of the HVACR system. In another embodiment, the heat transfer circuit 4200 may be a passive system as similar discussed above and may not include/ utilize the control valve 4255.

Figure 14:
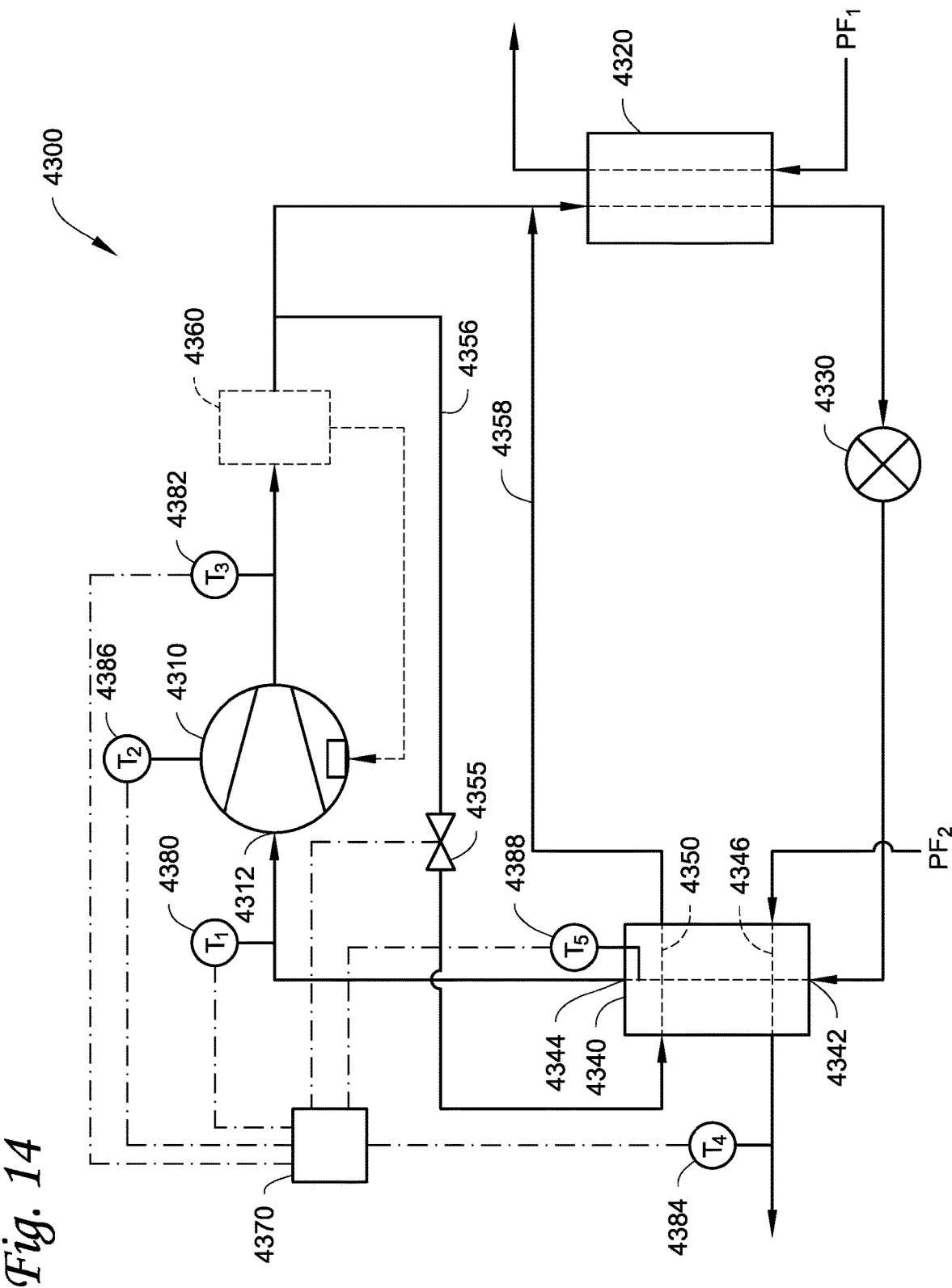
FIG. 14 is a schematic diagram of a heat transfer circuit, according to an embodiment.

FIG. 14 is a schematic diagram of a heat transfer circuit 4300 according to an embodiment. In an embodiment, the heat transfer circuit 4300 may be employed in an HVACR system. The heat transfer circuit 4300 is similar to the heat transfer circuit 4100 in FIG. 12, except with respect to the heat source 4350. For example, the heat transfer circuit 4300 includes a compressor 4310, an optional lubricant separator 4360, a condenser 4320, an expansion device 4330, and an evaporator 4340.

Figure 15:
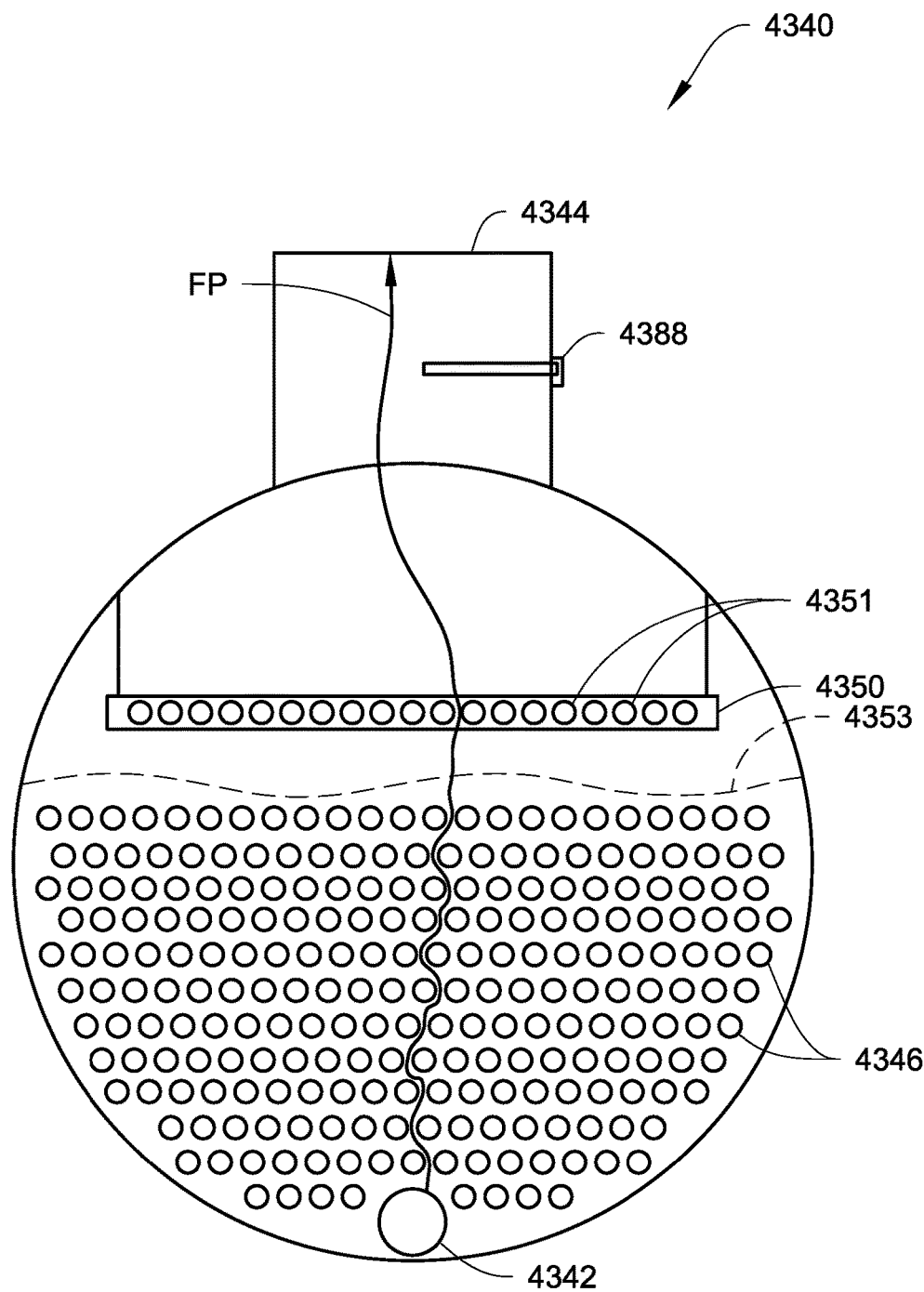
FIG. 15 is a diagram showing a flow of working fluid through an evaporator.

The evaporator 4340 includes an inlet 4342 and an outlet 4344. FIG. 15 shows a diagram of the flow of the working fluid through the evaporator 4340 in an embodiment. The working fluid from the expansion device 4330 enters the evaporator 4340 through the inlet 4342 and exits the evaporator 4340 through the outlet 4344. FIG. 15 illustrates an exemplary flow path FP of the working fluid through the evaporator 4340. The working fluid flows from the inlet 4342 of the evaporator 4340, past a set of heat exchanger tubes 4346, past the heat source 4350, and then to the outlet 4344 of evaporator 4340. The heat exchanger tubes 4346 are configured to evaporate the liquid working fluid. The heat source 4350 is configured to provide additional heat to the evaporated (or mostly evaporated) working fluid to superheat the working fluid. In an embodiment, the evaporator 4340 may be a flooded heat exchanger. In such an embodiment, the liquid working fluid pools in the bottom of the evaporator 4340, and some of the heat exchanger tubes 4346 extend through the pool of liquid working fluid. For example, as shown in FIG. 15, an upper surface 4353 of the pooled working fluid in the evaporator 4340 may be above all of the heat exchanger tubes 4346. During operation, location of the upper surface 4353 (e.g., level) of the pooled working fluid may vary. For example, the upper surface 4353 may lower such that some of the heat exchanger tubes 4346 are not submerged in the pooled liquid working fluid.

The second process fluid $PF_2$ flows through the heat exchanger tubes 4346. The second process fluid $PF_2$ is configured to heat the pooled liquid working fluid in the evaporator 4340 and continuously evaporate the liquid working fluid. Once evaporated, the working fluid flows towards the outlet 4344. In an embodiment, the heat exchanger tubes 4346 are configured to heat the working fluid to at or about its saturation temperature as the heat exchanger tubes 4346 provide a sufficient amount of heat to evaporate the liquid working fluid.

As shown in FIG. 15, the heat source 4350 in an embodiment is another set of heat exchanger tubes 4351. The first passageway 4356 is fluidly connected to the inlets of the heat exchanger tubes 4351 and the second passageway 4358 is fluidly connected to the outlets of the heat exchanger tubes 4351. The passageways 4356, 4358 allow a portion of the compressed working discharged by the compressor 4310 to pass through the heat exchanger tubes 4351 before the compressed working fluid flows to the condenser 4320 and the expansion device 4330.

The process fluid $PF_2$ flows through the heat exchanger tubes 4346. The compressed working fluid flows through the next set of heat exchanger tubes 4351. In an embodiment, the set of heat exchanger tubes 4351 are spaced apart from the set of heat exchanger tubes 4346. For example, as shown in FIG. 15, a space (e.g., an open space) may be provided between the set of heat exchanger tubes 4346 and the set of heat exchanger tubes 4351 along the flow path 4351 of the working fluid. The working fluid is heated as it flows past the heat exchanger tubes 4346 and absorbs heat from the flowing process fluid $PF_2$. The heat exchanger tubes 4346 configured to evaporate the liquid working fluid. The heated working fluid is then heated further as it flows past the heat exchanger tubes 4351 and absorbs heat from the compressed working fluid. The heat exchanger tubes 4351 are configured to heat the gaseous or mostly gaseous working fluid. For example, the heat exchanger tubes 4351 are configured to be above the upper surface 4353 of the working fluid (e.g., not be submerged in liquid working fluid) during normal operation of the evaporator 4340.

As shown in FIG. 14, the heat transfer circuit 4300 includes a circuit controller 4370. The amount of heat provided by the heat source 4350 to the working fluid flowing past the heat exchanger tubes 4351 is controlled by the circuit controller 370 in a similar manner as discussed above regarding the heat source 4050 in FIG. 11. For example, the circuit controller 4370 may control the amount of heat provided by the heat source 4350 to the working fluid flowing past the heat exchanger tubes 4351 based on at least one of the suction temperature $T_1$, the discharge temperature $T_3$, and/or the second process fluid exit temperature $T_4$. The circuit controller 4370 controls the heat provided by the heat source 4350 using the control valve 4355 to adjust the flow rate of compressed working fluid through the heat exchange tubes 4351.

As shown in FIG. 14, the evaporator 4340 includes a temperature sensor 4388. The temperature sensor 4388 is configured to detect a temperature of the working fluid as it exits the evaporator 4340 ("evaporator outlet temperature $T_5$"). The heat transfer circuit 4300 in FIG. 14 does not include any components that heat or cool the working fluid between the evaporator 4340 and the compressor 4310. Accordingly, the suction temperature $T_1$ would be the same as the evaporator outlet temperature $T_5$, and the sensor 4388 may be for detecting the suction temperature $T_1$ instead of sensor 4380. In an embodiment, the heat transfer circuit 4300 may include one or more sensors (e.g., sensor 4380, sensor 4382, sensor 4384, sensor 4386, sensor 4388, or the like) as suitable and/or desired for controlling the heat source 4350 to generate the desired heat output as discussed above.

The heat source 4350 in the heat transfer circuit 4300 is an active system. However, it should be appreciated that the heat transfer circuit 4300 and the heat source 4350 may be configured to be a passive system as similarly discussed above regarding the heat transfer circuit 4100 in FIG. 12. In such an embodiment, circuit controller 4370 may not actively operate the heat output of the heat source 4350.

In an embodiment, the passageways 4356, 4358 are connected to the flow path of the working fluid between the lubricant separator 4360 and the condenser 4320. However, one or both of the passageways 4356, 4358 may be connected at a different location than shown in FIG. 14 as similarly discussed above regarding the passageways 4156, 4158 in FIG. 12. In an embodiment, the passageways 4356, 4358 are connected after the compressor 4310 and before the expansion device 4330.

The heat source 4350 in FIGS. 14 and 15 is the heat exchanger tubes 4351 through which the compressed working fluid flows. However, the hot fluid flowing through the heat source 4350 in an embodiment may be the first process fluid $PF_1$, the second process fluid $PF_2$, or a third process fluid (e.g., hot water, hot air, fluid from a secondary cooling circuit, or the like) instead of the compressed working fluid as similarly discussed above regarding the heat source 4150 in FIG. 12 and the heat source 4250 in FIG. 13. In such an embodiment, the first passageway 4356 and the second passageway 4358 would not be fluidly connected to the flow path of the working fluid.

Different steams of fluid flow through heat exchanger tubes 4346 and the heat exchanger tubes 4351. In an embodiment, the streams of fluid flowing through the heat exchanger tubes 4346 and the heat exchanger tubes 4351 may be the same type of fluid. In an embodiment, the type of fluid flowing through the heat exchanger tubes 4351 may be the second process fluid $PF_2$ instead of compressed working fluid. A main stream of second process fluid $PF_2$ is supplied from a source (e.g., a duct system of an HVACR, an intermediate heat exchange circuit, or the like) (not shown) to the heat circuit 4300. For example, a portion of the main stream of second process fluid $PF_2$ branches off and flows through the heat exchanger tubes 4351 of the heat source 4350. The remaining portion of the main stream of second process fluid $PF_2$ flows through the heat exchanger tubes 4346. The portion of the main stream of second process fluid $PF_2$ may rejoin the remaining portion of the main stream after the remaining portion has flowed through the heat exchanger tubes 4346. Alternatively, the portion of the main stream of second process fluid $PF_2$ may rejoin the remaining portion of the main stream before the heat exchanger tubes 4346, such that both portions flow through the heat exchanger tubes 4346. In another example, the main stream of the second process fluid $PF_2$ flows through the heat exchanger tubes 4351 and then flows through the heat exchanger tubes 4346.

In another embodiment, the type of fluid flowing through the heat exchanger tubes 4351 may be the first process fluid $PF_1$ instead of compressed working fluid. The first process fluid $PF_1$ flowing through the condenser 4320 is heated by the compressed working fluid. For example, after the first process fluid $PF_1$ flows through the condenser 4320, at least a portion of the heated first process fluid $PF_1$ flows through the heat exchanger tubes 4351 of the heat source 4350. The first process fluid $PF_1$ being utilized to transfer heat from the compressed working fluid to the working fluid flowing past the heat exchanger tubes 4351.

In another embodiment, the type of fluid flowing through the heat exchanger tubes 4351 may be a third process fluid instead of the compressed working fluid. For example, the third process fluid may be hot air, hot water, working fluid, or the like. In an embodiment, the third process fluid may be the fluid for a secondary cooling circuit as similarly discussed in FIG. 13 (e.g., secondary cooling circuit 4290). For example, the third process fluid of the secondary cooling loop may be a fluid utilized for transferring heat (e.g., air, water and/or glycol, or the like that is suitable for absorbing and transferring heat) or a working fluid that is expanded to provide cooling (e.g., a fluid including one or more refrigerants).

In another embodiment, the heat source 4350 may be an electric heater similar to the heat source 4050 in FIG. 11. In such an embodiment, the heat source 4350 utilizes supplied electricity to generate the heat provided to the passing working fluid instead of utilizing a hot fluid (e.g., the compressed working fluid, the third process fluid). For example, the circuit controller 4370 in such an embodiment may control the amount of heat provided by the heat source 4350 to the passing working fluid by controlling the amount of electricity supplied to the heat source 4350.

The flow path of the working fluid through the heat circuit 4300 includes a suction stream. The suction stream is disposed after the location where the working fluid is heated by the second process fluid $PF_2$ flowing through the heat exchanger tubes 4346 and before the compressor 4310. In an embodiment, the suction stream extends from after the location where the working fluid is heated by the second process fluid $PF_2$ to the suction inlet 4312 of the compressor 4310. In an embodiment, the suction stream extends from the heat exchanger tubes 4346 to the suction inlet 4312 of the compressor 4310. In FIG. 14, the suction stream includes the heat source 4350, the portion of the evaporator 4340 after the heat exchanger tubes 4346, and the suction pipe that fluidly connects the evaporator 4340 to the suction inlet 4312 of the compressor 4310. In an embodiment, the heat transfer circuit 300 may include additional components (one or more pipes, flow control device(s), a receiver tank, a dryer, or the like) disposed between the evaporator 4340 and the compressor 4310. In such an embodiment, the suction stream would also include such additional components. The heat source 4350 is configured to provide heat to and increase the temperature of the working fluid as it flows through the suction stream (i.e. increase the suction temperature $T_1$).

In FIG. 14, the lubricant is separated in the lubricant separator 4360 and separately circulated back to the compressor 4310. However, the heat transfer circuit 300 in an embodiment may not include the lubricant separator 4360. In an embodiment, the lubricant may be configured to be circulated back to the compressor 4310 as part of the working fluid without being separated with a lubricant separator 4360. In such an embodiment, the lubricant may enter through the suction inlet 4312 of the compressor 4310 as part of the working fluid.

Figure 16:
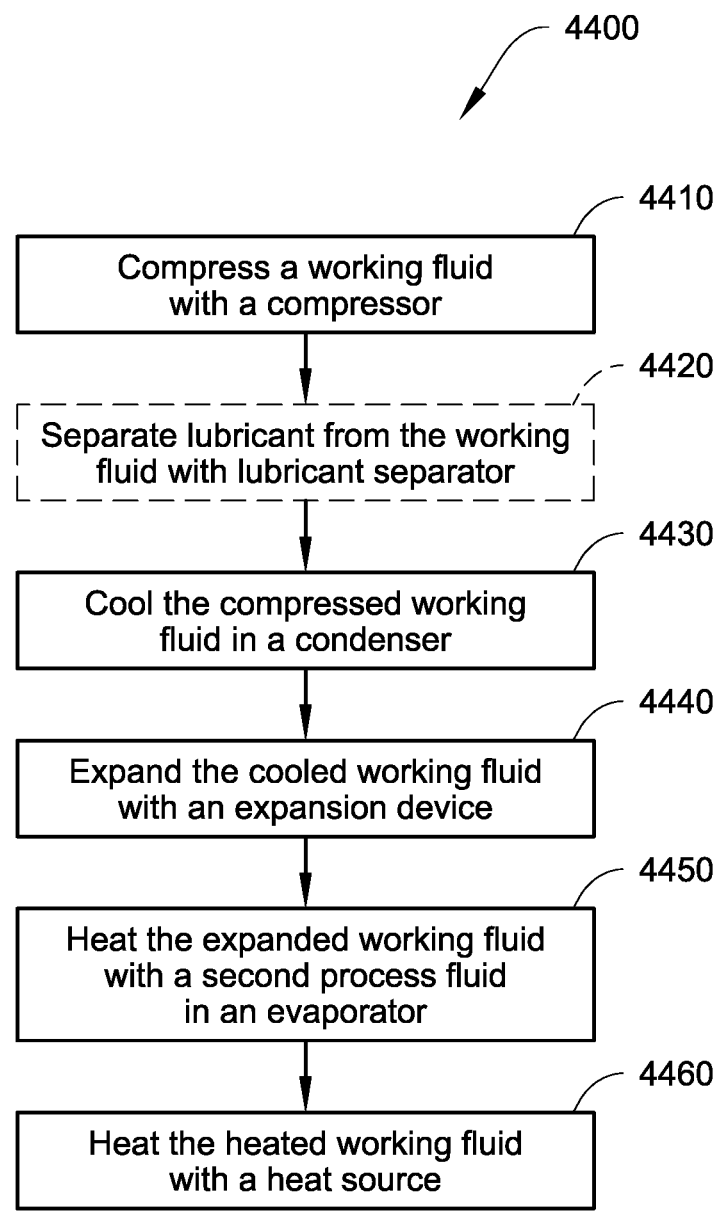
FIG. 16 is a block diagram of a method of operating a heat transfer circuit.

FIG. 16 is a block diagram of a method of operating a heat transfer circuit 400. For example, the method 4400 may be for operating the heat transfer circuit 4001 in FIG. 11, the heat transfer circuit 4100 in FIG. 12, and/or the heat transfer circuit 4300 in FIG. 14. In an embodiment, the heat transfer circuit is employed in an HVACR system. The method 4400 starts at 4410.

At 4410, a compressor (e.g., compressor 4010, 4110, 4310) is operated to compress a working fluid. The temperature of the working fluid increases as it is compressed in the compressor. The compressed working fluid discharged from the compressor contains lubricant. In an embodiment, the lubricant is circulated to the compressor separately from the working fluid and mixes with the working fluid as it passes through the compressor. In such an embodiment, the method 4400 proceeds to optional 4420. At optional 4420, a liquid lubricant is separated from the working fluid by a lubricant separator (e.g., lubricant separator 4060, 4160, 4360). The separated liquid lubricant in some cases contains a concentration of refrigerant that has been dissolved in the liquid lubricant. The separated liquid lubricant is then circulated back to the compressor from the lubricant separator. A stream of working fluid, which may contain entrained lubricant, is also discharged from the lubricant separator. The method 4400 then proceeds to 4430.

In another embodiment, the lubricant is circulated with the working fluid to a suction inlet (e.g., suction inlet 4012 in FIG. 11) of the compressor without being separated with a lubricant separator (e.g., lubricant separator 4060, 40160, 4360). In such an embodiment, the method 4400 proceeds from 4410 to 4430 and does not include optional 4420.

At 4430, the compressed working fluid is cooled as it flows through a condenser (e.g., condenser 4020, 4120,

4320). The compressed working fluid is cooled by a first process fluid (e.g., first process fluid $PF_1$ in FIG. 11, 12, or 14) that separately flows through the condenser. The working fluid is partially or entirely condensed as it is cooled in the condenser. The method 4400 then proceeds to 4440.

At 4440, the working fluid from the condenser is expanded by an expansion device (e.g., expansion device 4030, 4130, 4330). The expansion device allows the working fluid to suddenly expand. The expansion causes the working fluid to significantly decrease in temperature. The method 4400 then proceeds to 4450.

At 4450, the expanded working fluid from the expansion device is heated in an evaporator (e.g., evaporator 4040, evaporator 4140, evaporator 4340). A second process fluid (e.g., second process fluid $PF_2$ in FIG. 11, 12, or 14) flows through the evaporator separately from the working fluid. The working fluid absorbs heat from the second process fluid and is heated as it flows through the evaporator. The second process fluid being cooled by the working fluid as it flows through the evaporator. The method 4400 then proceeds to 4460.

At 4460, a heat source (e.g., heat source 4050, heat source 4150, heat source 4350) heats the working fluid after it has been heated by the second process fluid. The heating by the heat source increases the suction temperature (e.g., suction temperature $T_1$) of the working fluid as it enters the compressor. The increase in suction temperature decreases the concentration of dissolved refrigerant in the lubricant provided to the compressor. In an embodiment, suction stream includes the heat source. The suction stream is disposed after the location where the working fluid is heated by the second process fluid and before the compressor. In an embodiment, the suction stream extends from a location after where the working fluid is heated by the second process fluid to a suction inlet (e.g., suction inlet 4012, suction inlet 4112, suction inlet 4312) of the compressor. In an embodiment, the heat source heats the working fluid as it flows from the evaporator to the compressor. In such an embodiment, the suction stream may include a suction pipe that connects the suction inlet of the compressor to at least one of the heat source and the evaporator. In another embodiment, the heat source is located within the evaporator and heats the working fluid as to flows through the evaporator after being heated by the second process fluid. In such an embodiment, suction stream may include the portion of the evaporator that is after the heat exchanger tubes of the evaporator through which the second process fluid flows (e.g., heat exchanger tubes 4346).

In an embodiment, the method 4400 may be modified based on the heat transfer circuit 4001, heat transfer circuit 4100, heat transfer circuit 4200, and/or heat transfer circuit 4300 as shown in FIGS. 11-14 and as described above. For example, the method 4400 in an embodiment may include directing hot fluid (e.g., compressed working fluid, the first process fluid $PF_1$, the second process fluid $PF_2$, a third process fluid) through the heat source as similarly described for the heat source 4150 in FIG. 12, the heat source 4250 in FIG. 13, and the heat source 4350 in FIGS. 13 and 14.

Aspects:

Any of aspects 1-12 can be combined with any of aspects 13-17. It is understood that any of aspects 1-17 can be combined with any other aspects recited herein.

Aspect 1. A heat transfer circuit, comprising: a compressor for compressing a working fluid; a condenser for cooling the working fluid; an expansion device for expanding the working fluid; an evaporator for providing a first heating of the working fluid flowing through the evaporator, the first heating being a heat exchange between the working fluid and a process fluid flowing through the evaporator, a flow path of the working fluid extending from the compressor through the condenser, the expansion device, the evaporator, and back to the compressor, the flow path including a suction stream disposed after the first heating and before the compressor; and a heat source, the suction stream including the heat source and the heat source configured to provide a second heating of the working fluid.

Aspect 2. The heat transfer circuit of aspect 1, wherein the heat source is an electric heater.

Aspect 3. The heat transfer circuit of either one of aspects 1 and 2, wherein the heat source is disposed within the evaporator.

Aspect 4. The heat transfer circuit of either one of aspects 1 and 3, wherein the evaporator includes a first set of heat exchanger tubes through which the process fluid flows, and the working fluid flowing past the first set of tubes undergoing the first heating, and the heat source is a second set of heat exchanger tubes in the evaporator, the second heating of the working fluid being a heat exchange between the working fluid flowing past the second set of heat exchange tubes and a third fluid flowing through the second set of heat exchanger tubes.

Aspect 5. The heat transfer circuit of either one of aspects 1 and 2, the heat source is disposed in the suction stream between the evaporator and the compressor.

Aspect 6. The heat transfer circuit of either one of aspects 1 and 5, wherein the heat source is a heat exchanger including a first side and a second side, the working fluid heated by the heat source flowing through the first side, a third fluid flowing through the second side, and the second heating of the working fluid being a heat exchange between the third fluid and the working fluid.

Aspect 7. The heat transfer circuit of either one aspects 4 and 6, wherein the third fluid is a portion of the compressed working fluid discharged by the compressor before the compressed working fluid flows through the expansion device.

Aspect 8. The heat transfer circuit of either one of aspects 4 and 6, wherein the third fluid is the same type of fluid as the process fluid.

Aspect 9. The heat transfer circuit of either one of aspects 4 and 6, wherein a second process fluid flows through the condenser and absorbs heat from the working fluid to provide the cooling of the working fluid, and the third fluid includes a portion of the second process fluid.

Aspect 10. The heat transfer circuit of either one of aspects 1, 2, 5, and 6, further comprising: a suction pipe extending to a suction inlet of the compressor, the suction stream including the suction pipe, wherein the heat source extends along an outside of the suction pipe.

Aspect 11. The heat transfer circuit of any one of aspects 1-10, further comprising: a controller configured to control heat provided by the heat source to the working fluid based on a suction temperature of the working fluid entering the compressor.

Aspect 12. The heat transfer circuit of any one of aspects 1-11, wherein the heat source is configured to increase superheat of the working fluid entering a suction inlet of the compressor.

Aspect 13. A method of operating a heat transfer circuit to cool a first process fluid, the heat transfer circuit including a compressor, a condenser, an expansion device, an evaporator, a heat source, and a working fluid flowing through the heat transfer circuit, the method comprising: compressing the working fluid with the compressor; cooling the working fluid compressed by the compressor with the condenser; expanding the working fluid cooled by the condenser with the expansion device; heating the working fluid expanded by the expansion device in the evaporator with a process fluid, the working fluid absorbing heat from the process fluid; and heating the working fluid heated by the process fluid with the heat source, the working fluid heated with the heat source as the working fluid flows through a suction stream, the suction stream including the heat source and disposed after a location at which the working fluid is heated by the process fluid and before the compressor.

Aspect 14. The method of aspect 13, wherein heating the working fluid with the heat source includes heating the working fluid flowing from the evaporator to the compressor.

Aspect 15. The method of either one of aspects 13 and 14, wherein heating the working fluid with the heat source includes increasing superheat of the working fluid entering a suction inlet of the compressor.

Aspect 16. The method of any one of aspects 13-15, further comprising: directing the working fluid from an inlet of the evaporator, past a first set of heat exchanger tubes in the evaporator through which the first fluid flows, past the heat source, and to an outlet of the evaporator in this order, wherein the suction stream includes a portion of the evaporator located after the first set of heat exchanger tubes.

Aspect 17. The method of any one of aspects 13-15, further comprising: directing at least a portion of the compressed working fluid discharged by the compressor, which has not been expanded by the expansion device, through a first side of the heat source, wherein heating the working fluid heated by the process fluid with the heat source includes directing the working fluid heated by the heat source through a second side of the heat source.

A heat transfer circuit that utilizes a working fluid to provide heating or cooling. The heat transfer circuit includes a compressor for compressing the working fluid and a heat source configured to increase a suction temperature of the working fluid entering the compressor. A flow path of the working fluid through the heat transfer circuit includes a suction stream. The suction stream is disposed after a location at which the working fluid is heated by a process fluid and before the compressor. The suction stream includes the heat source. A method for operating a heat transfer circuit includes heating a working fluid with a process fluid, and further heating the working fluid heated by the process fluid with a heat source.

Figure 17:
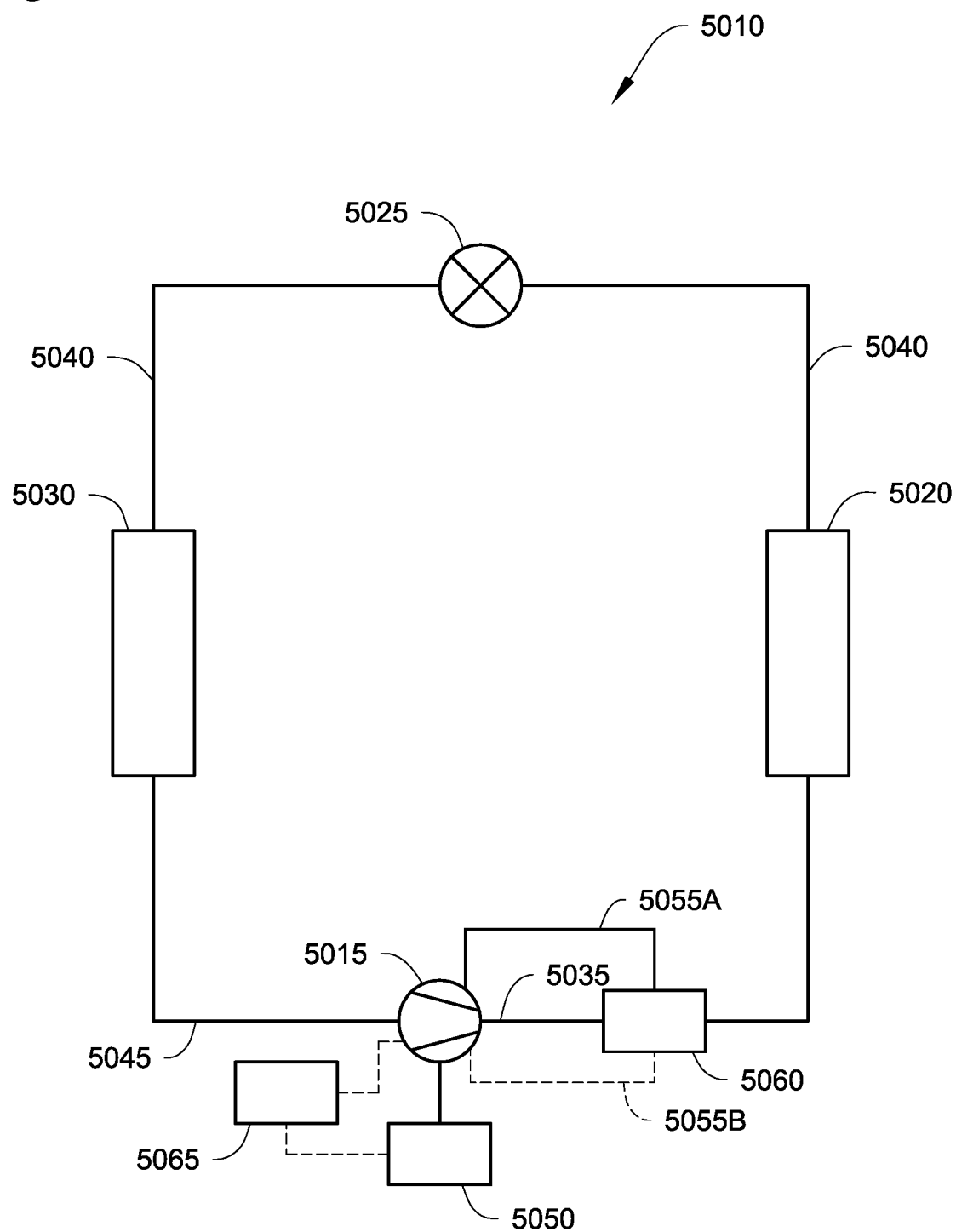
FIG. 17 is a schematic diagram of a refrigerant circuit, according to an embodiment.
Figure 18:
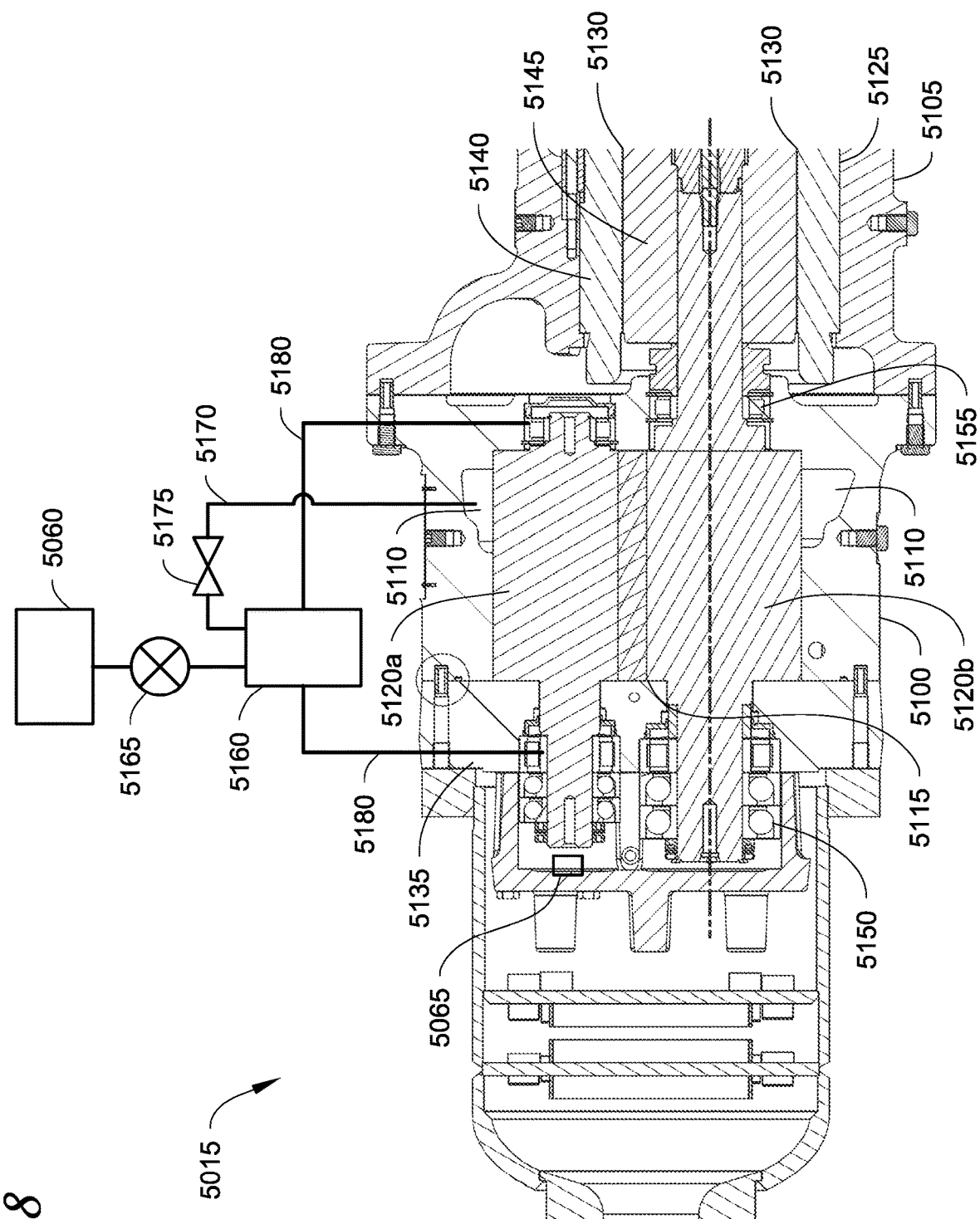
FIG. 18 is a side sectional view of a compressor for a vapor compression system (e.g., the refrigerant circuit of FIG. 17), according to an embodiment.
Figure 19:
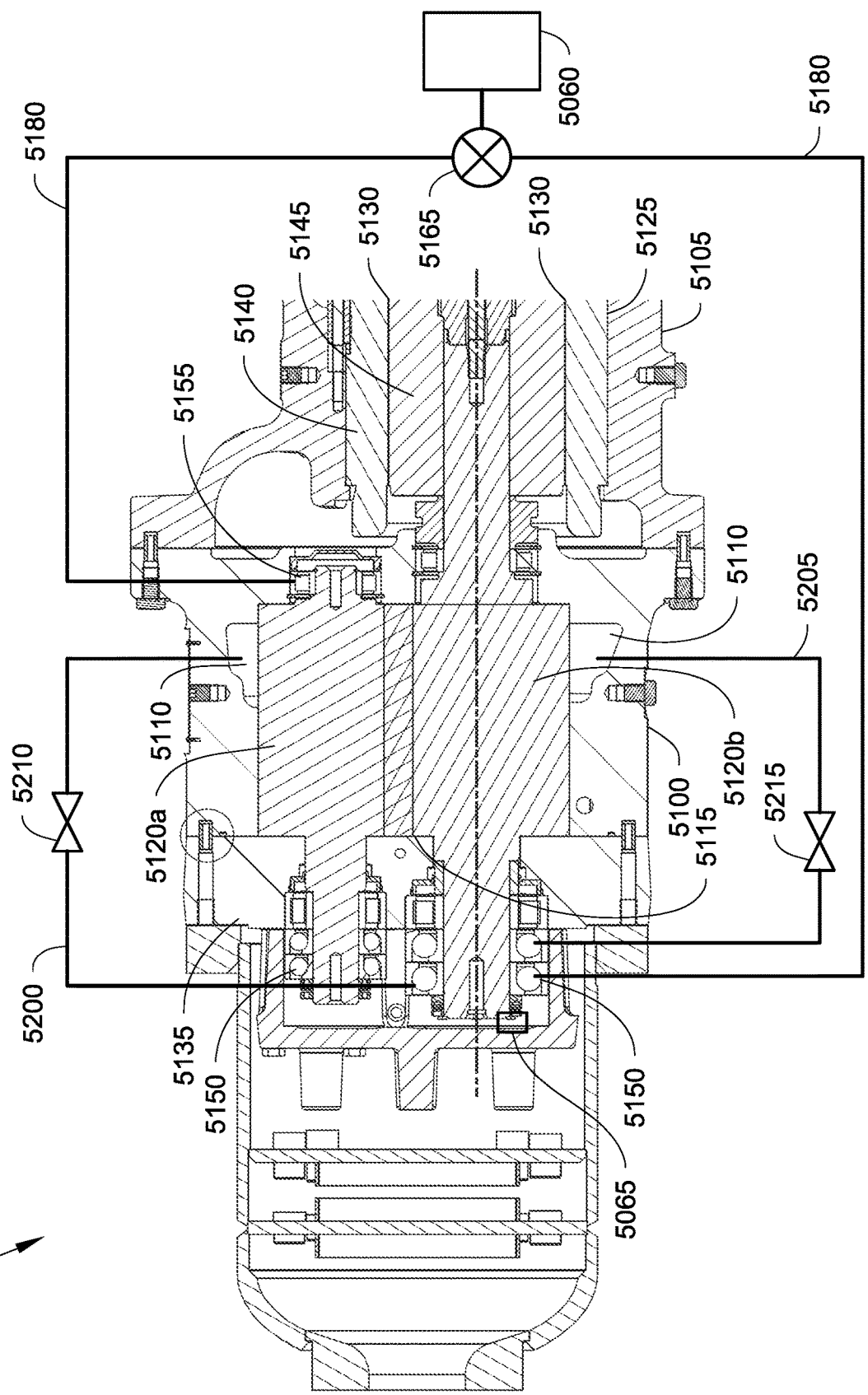
FIG. 19 is a side sectional view of a compressor for a vapor compression system (e.g., the refrigerant circuit of FIG. 17), according to an embodiment.

Lubricant Management For An HVACR System (FIGS. 17-19)

This disclosure relates generally to a heating, ventilation, air conditioning, and refrigeration (HVACR) system. More specifically, this disclosure relates to lubricant management for a compressor in an HVACR system.

A heating, ventilation, air conditioning, and refrigeration (HVACR) system includes a refrigerant circuit. The refrigerant circuit includes a compressor, lubricant source, a condenser, an expansion device, and an evaporator fluidly connected. One or more sensors are included for determining a pressure and a temperature. The compressor includes a plurality of bearings and a suction port. A lubricant reservoir is fluidly connected to the lubricant source, the plurality of bearings, and the suction port. The lubricant reservoir is configured to receive a lubricant-refrigerant mixture. The lubricant reservoir is in thermal communication with a discharge flow path of the compressor.

A heating, ventilation, air conditioning, and refrigeration (HVACR) system is also disclosed. The HVACR system includes a refrigerant circuit. The refrigerant circuit includes a compressor including a plurality of bearings and a suction port, a lubricant source, a condenser, an expansion device, and an evaporator fluidly connected. One or more sensors are included for determining a pressure and a temperature. The plurality of bearings include discharge side bearings and suction side bearings. The plurality of bearings are fluidly connected to the lubricant source and configured to receive a lubricant mixture from the lubricant source. The discharge side bearings are fluidly connected to the suction port.

Environmental impacts of HVACR refrigerants are a growing concern. For example, since 2011, the European Union has been phasing out refrigerants with a global warming potential (GWP) of more than, for example, 150 in some refrigeration systems. Environmentally-suitable HVACR refrigerants, with suitable properties such as density, vapor pressure, heat of vaporization, and suitable chemical properties, which satisfy the requirements regarding safety and environment impacts, such as the European Union standard discussed above, can be utilized for HVACR systems. The environmentally-suitable HVACR refrigerants are nonflammable or mildly flammable, non-ozone depleting, energy efficient, low in toxicity, compatible with materials of construction, and are chemically stable over the life of the equipment.

Current refrigerants, such as R134a or the like, may have relatively higher GWPs. For example, R134a has a GWP of 1,430. As a result, replacement refrigerants such as, but not limited to, R1234ze, R513A, and the like, are being implemented in HVACR systems.

In utilizing newer refrigerant compositions such as, but not limited to, R1234ze and R513A, various problems may arise as a result of the different properties of the refrigerant compared to prior refrigerants such as R134a. In general, refrigerants with lower GWPs such as R1234ze, R513A, and the like may be carried over into the lubricant. In some instances, the replacement refrigerants are relatively more likely to dissolve into the lubricant than the current refrigerants, resulting in a higher concentration of refrigerant within the lubricant (e.g., lubricant dilution).

As a result, portions of an operating map for a compressor of the HVACR system may suffer from higher lubricant dilution and limited bearing viscosity due to low discharge superheat. In some instances, the occurrence of higher lubricant dilution and limited bearing viscosity may be more significant when the variable speed compressor operates at relatively lower speeds. Higher lubricant dilution and limited bearing viscosity can result in, for example, a shortened lifetime for the bearings and ultimately compressor failures. In some instances, utilizing the R134A replacement refrigerants may require a replacement of the mechanical components (e.g., bearings or the like) in the compressor.

In other instances, controlling a variable speed compressor to maximize efficiency can also result in lubricant dilution problems, even when utilizing the current refrigerants such as R134a.

In general, lubricants utilized with R134a replacement refrigerants suffer the higher lubricant dilution problem. The lubricants can include any suitable lubricant which is miscible with the selected replacement refrigerant.

In general, higher lubricant dilution may occur when discharge superheat becomes relatively low. For example, higher lubricant dilution can occur when the discharge superheat is below at or about 8° C.

FIG. 17 is a schematic diagram of a refrigerant circuit 5010, according to an embodiment. The refrigerant circuit 5010 generally includes a compressor 5015, a condenser 5020, an expansion device 5025, an evaporator 5030, and a lubricant source 5060.

The refrigerant circuit 5010 is an example and can be modified to include additional components. For example, in an embodiment, the refrigerant circuit 5010 can include other components such as, but not limited to, an economizer heat exchanger, one or more flow control devices, a receiver tank, a dryer, a suction-liquid heat exchanger, or the like.

The refrigerant circuit 5010 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 5015, condenser 5020, expansion device 5025, and evaporator 5030 are fluidly connected via refrigerant lines 5035, 5040, 5045. In an embodiment, the refrigerant lines 5035, 5040, and 5045 can alternatively be referred to as the refrigerant conduits 5035, 5040, and 5045, or the like.

In an embodiment, the refrigerant circuit 5010 can be configured to be a cooling system (e.g., an air conditioning system) capable of operating in a cooling mode. In an embodiment, the refrigerant circuit 5010 can be configured to be a heat pump system that can operate in both a cooling mode and a heating/defrost mode.

The refrigerant circuit 5010 can operate according to generally known principles. The refrigerant circuit 5010 can be configured to heat or cool a gaseous process fluid (e.g., a heat transfer medium or fluid such as, but not limited to, air or the like), in which case the refrigerant circuit 5010 may be generally representative of an air conditioner or heat pump.

In operation, the compressor 5015 compresses a working fluid (e.g., a heat transfer fluid such as a refrigerant or the like) from a relatively lower pressure gas (e.g., suction pressure) to a relatively higher-pressure gas (e.g., discharge pressure). In an embodiment, the compressor 5015 can be a positive displacement compressor. In an embodiment, the positive displacement compressor can be a screw compressor, a scroll compressor, a reciprocating compressor, or the like. In an embodiment, the compressor 5015 can be a centrifugal compressor.

The relatively higher-pressure gas is also at a relatively higher temperature, which is discharged from the compressor 5015 and flows through refrigerant line 5035 to the condenser 5020. The working fluid flows through the condenser 5010 and rejects heat to a process fluid (e.g., water, air, or the like), thereby cooling the working fluid. The cooled working fluid, which is now in a liquid form, flows to the expansion device 5025 via the refrigerant line 5040. The expansion device 5025 reduces the pressure of the working fluid. As a result, a portion of the working fluid is converted to a gaseous form. The working fluid, which is now in a mixed liquid and gaseous form flows to the evaporator 5030 via the refrigerant line 5040. The working fluid flows through the evaporator 5030 and absorbs heat from a process fluid (e.g., water, air, or the like), heating the working fluid, and converting it to a gaseous form. The gaseous working fluid then returns to the compressor 5015 via the refrigerant line 5045. The above-described process continues while the refrigerant circuit is operating, for example, in a cooling mode (e.g., while the compressor 15 is enabled).

In the illustrated embodiment, the refrigerant circuit 5010 can include a lubricant source 5060 disposed between the compressor 5015 and the condenser 5020. In the illustrated embodiment, the lubricant source 5060 can be a lubricant separator. It will be appreciated that a particular location for the lubricant source 5060 can vary within the principles of this disclosure. For example, in an embodiment, the lubricant source 5060 could alternatively be a location at or near the evaporator 5030.

The lubricant source 5060 is fluidly connected to a discharge of the compressor 5015 via the refrigerant line 5035. The lubricant source 5060 is fluidly connected to the compressor 5015 to provide lubricant to various components of the compressor 5015 (e.g., bearings, rotors, or the like) via lubricant return line 5055A and optionally via a second lubricant return line 5055B. It will be appreciated that the number of lubricant return lines 5055A, 5055B can be selected based on, for example, which components of the compressor are being provided with lubricant.

A controller 5050 is included in the system. The controller 5050 can be used to control one or more aspects of the refrigerant circuit 5010. For example, in embodiments disclosed in accordance with FIGS. 18 and 19 below, the controller 5050 can be used to selectively control a state of a flow control device (e.g., a valve or the like) to control lubricant flow within the refrigerant circuit 5010. The controller 5050 can be in electronic communication with the flow control device and one or more sensors 5065 to determine one or more operating conditions (e.g., temperature, pressure, or the like) of the compressor 5015 and its components (e.g., bearings, rotors, or the like). In an embodiment, the controller 5050 can monitor a pressure and temperature of the lubricant using the one or more sensors 5065. The controller 5050 will use the measured pressure and temperature to selectively manage the lubricant flow rate (e.g., to the bearings, the rotors, or the like) to achieve a desired lubricant viscosity. In an embodiment, the pressure may be measured in a bearing cavity or inferred from a suction pressure or suction saturation temperature. In an embodiment, the temperature may be measured at the bearings or in a lubricant reservoir.

FIG. 18 is a side sectional view of a compressor 5015 for a vapor compression system (e.g., the refrigerant circuit 5010 of FIG. 17), according to an embodiment.

In an embodiment, the compressor 5015 is a screw compressor. The screw compressor 5015 includes a rotor housing 5100 and an electric motor housing 5105. The rotor housing 5100 includes a suction port 5110 and a discharge port 5115. Rotors 5120a, 5120b are intermeshed and are disposed at least partially within the rotor housing 5100. The screw compressor 5015 can operate in accordance with generally known principles to compress a working fluid received via the suction port 5110 and to be output via the discharge port 5115.

The motor housing 5105 houses a motor 5125, according to an embodiment. The motor housing 5105 may be integral to the rotor housing 5100. The electric motor 5125 can drive the intermeshed rotors 4120a, 4120b.

The motor housing 4105 includes the electric motor 4125. The motor housing 4105 further includes a stator 5140 and a rotor 5145. The rotor 5145 rotates a shaft which is also connected to the rotor 5120b. An airgap 5130 is formed between the stator 5140 and the rotor 5145. In the embodiment illustrated in FIG. 18, the electric motor 5125 can be provided with a portion of the working fluid (e.g., a heat transfer fluid such as refrigerant or the like) which flows through the airgap 5130 of the electric motor 5125, in a flow direction which is generally from right to left with respect to the figure, and is provided to the suction port 5110. In an embodiment, the working fluid can be in a gaseous form. It will be appreciated that a gaseous form of the working fluid may include a portion that is in liquid form, but the gaseous form includes a relatively higher portion of the working fluid in the gaseous form than the liquid form.

A bearing housing 5135 contains discharge side bearings 5150. Suction side bearings 5155 are disposed within the rotor housing 5100. A combination of the discharge side bearings 5150 and the suction side bearings 5155 support the rotors 5120a, 5120b. The discharge side bearings 5150 and the suction side bearings 5155 can be provided with a lubricant for lubricating the discharge side bearings 5150 and the suction side bearings 5155. In an embodiment, the discharge side bearings 5150 can include radial bearings and thrust bearings. In an embodiment, a bearing may be configured to accommodate both thrust and radial loads.

In an embodiment, the discharge side bearings 5150 in the bearing housing 5135 are maintained at a pressure that is lower than a discharge pressure of the compressor 5015. In an embodiment, the discharge side bearings 5150 in the bearing housing 5135 are maintained at a pressure that is at or about a suction pressure of the compressor 5015. In an embodiment, the suction side bearings 5155 are also at or about the suction pressure of the compressor 5015.

In the illustrated embodiment, a lubricant reservoir 5160 is disposed at a location that thermally communicates with the compressor 5015. In an embodiment, the lubricant reservoir 5160 can alternatively be referred to as a lubricant still or a lubricant sump. In an embodiment, the entire lubricant reservoir 5160 or a portion of the lubricant reservoir 5160 can be disposed within the rotor housing 5100. In an embodiment, the lubricant reservoir 5160 can be placed at a location that is relatively closer to the discharge port 5115 than the suction port 5110. As a result, the lubricant reservoir 5160 can receive more heat generated through the compression process than if located relatively closer to the suction port 5110. The thermal communication with the discharge flow path of the compressor 5015 can include a location at which the lubricant reservoir 5160 can receive heat generated from the compression process. The discharge flow path can include, for example, a rotor housing of the compressor 5015, a bearing housing of the compressor 5015, a muffler of the compressor 5015, a discharge conduit of the compressor 5015, an oil separator, a condenser, or the like. In an embodiment, the lubricant reservoir 5160 can be in thermal communication with another heat generating component of the HVACR system such as, but not limited to, a variable frequency drive controller, an electric fan motor, or the like.

In an embodiment, a total volume of the lubricant reservoir 5160 can be less than a typical low-side lubricant sump in prior systems. In the illustrated embodiment, the lubricant reservoir 5160 is disposed on a top (with respect to the page) of the compressor 5015. The placement can enable fluid flow from the lubricant reservoir 5160 to the compressor 5015 via gravity. As a result, in an embodiment, the lubricant reservoir 5160 does not include a pump. This can, for example, reduce a cost and complexity of the system relative to prior systems which generally utilize a pump to move lubricant.

In an embodiment, the lubricant reservoir 5160 can be placed at or near the lubricant source 5060 so that the fluid in the lubricant reservoir 5160 can receive heat from the higher temperature working fluid at the location of the lubricant source 5060.

The lubricant reservoir 5160 is fluidly connected to the lubricant source 5060. In operation, the lubricant reservoir 5160 can receive lubricant as separated from the lubricant source 5060. Even though the lubricant reservoir 5160 is downstream of the lubricant source 5060, the lubricant can include a mixture of lubricant and refrigerant.

An expansion device 5165 is disposed at a location between the lubricant source 5060 and the lubricant reservoir 5160. The expansion device 5165 can be, for example, a fixed or variable orifice that induces a pressure drop in the lubricant being received from the lubricant source 5060. In an embodiment, the expansion device 5165 can be an electronic expansion device or the like.

Inducing the pressure drop also reduces a temperature of the lubricant mixture. The mixed refrigerant and lubricant mixture received in the lubricant reservoir 5160 can be heated due to thermal communication with a discharge flow path of the compressor 5015. The thermal communication with the discharge flow path of the compressor 5015 can include a location at which the lubricant reservoir 5160 can receive heat generated from the compression process. The discharge flow path can include, for example, a rotor housing of the compressor 5015, a bearing housing of the compressor 5015, a muffler of the compressor 5015, a discharge conduit of the compressor 5015, an oil separator, a condenser, or the like. The heat can cause the refrigerant in the refrigerant and lubricant mixture to boil off to the gaseous state. In an embodiment, an electric resistance heater could be included, although the electric resistance heater may reduce performance of the compressor 5015.

A conduit 5170 is fluidly connected to a top portion of the lubricant reservoir 5160 so that the gaseous refrigerant boiling from the refrigerant and lubricant mixture can be returned to the suction port 5110 of the compressor 5015.

The conduit 5170 includes a flow control device 5175. In an embodiment, the flow control device 5175 can be, for example, a fixed orifice. The flow control device 5175 in such an embodiment can limit an overall flowrate of the refrigerant flowing from the lubricant reservoir 5160 to the suction port 5110. In an embodiment, the orifice can be variable. In such an embodiment, a size of the orifice can be controlled to control an amount of flow through the conduit 5170 to the suction port 5110.

In an embodiment, the flow control device 5175 can be a valve. In such an embodiment, the flow control device 5175 can have a plurality of states (e.g., an open state, a closed state, one or more intermediate states). The state of the flow control device 5175 can be selectively controlled using a controller (e.g., controller 5050, FIG. 17) to control an amount of flow through the conduit 5170.

A second conduit 5180 is fluidly connected to a bottom portion of the lubricant reservoir 5160. The second conduit 5180 is fluidly connected to the discharge side bearings 150 and the suction side bearings 5155. The second conduit 180 is disposed at a location of the lubricant reservoir 5160 via which a lubricant (e.g., in a liquid or substantially liquid state) can flow via, for example, gravity. The lubricant can then be provided to the discharge side bearings 5150 and the suction side bearings 5155.

The flow control device 5175 in the conduit 5170 can be designed so that a flowrate of the lubricant in the conduit 5180 is controlled. For example, to increase a lubricant flow to the discharge side bearings 5150 and the suction side bearings 5155, the flow control device 175 can be placed into the closed state by the controller 5050. As a result, a pressure in the lubricant reservoir 5160 can increase, thereby resulting in an increased flow of lubricant through the conduit 5180.

The flow control device 5175 can be selectively controlled based on, for example, a temperature as sensed in the bearing housing 5150.

During operation of the compressor, the discharge side bearings 5150 and the suction side bearings 5155 generate heat. With focus on the discharge side bearings 5150, when the heat is generated during operation, the lubricant pool is heated. In an embodiment, the discharge side bearings 5150 can be a flooded bearing design in which drag of the discharge side bearings 5150 in the lubricant pool can generate heat. The heat can raise a temperature of the lubricant in the cavity of the discharge side bearings. As the heat increases, lubricant viscosity increases for a period of time until the heat becomes excessive, at which point the lubricant viscosity drops. As discussed above, the lubricant received from the lubricant source 5060 can include a mixture of lubricant and refrigerant. As a result, when the lubricant pool is heated, refrigerant may be boiled off from the mixture.

When the temperature increases to a threshold limit, indicating that additional lubricant is desired, the controller 5050 can place the flow control device 5175 in the closed state, thereby increasing flow of lubricant from the lubricant reservoir 5160 to the discharge side bearings 5150 and the suction side bearings 5155.

When the temperature is within the threshold limit, indicating that additional lubricant is not needed, the controller 5050 can place the flow control device in the open state, thereby decreasing flow of lubricant from the lubricant reservoir 5160 to the discharge side bearings 5150 and the suction side bearings 5155.

In an embodiment, the flow control device 5175 can include an intermediate state in which some flow is permitted (e.g., between the open and the closed state). In such an embodiment, the controller 5050 can vary the position of the flow control device 5175 to maintain the sensed temperature within a desired operating range.

In an embodiment, by controlling the pressure in the lubricant reservoir 5160 to maintain a selected lubricant flowrate to the discharge side bearings 5150 and the suction side bearings 5155, the lubricant reservoir 5160 may generally be considered to be at a medium pressure that is between the suction pressure and the discharge pressure of the compressor 5015.

FIG. 19 is a side sectional view of a compressor 5015 for a vapor compression system (e.g., the refrigerant circuit 5010 of FIG. 17), according to an embodiment.

For simplicity of this Specification, aspects of FIG. 19 which have previously been described with respect to FIG. 18 will not be described in additional detail. Such aspects are labeled with the same reference numbers as FIG. 18.

In FIG. 19, the lubricant reservoir 5160 is not present. Instead, the discharge side bearings 5150 are fluidly connected to the suction port 5110. Connecting the discharge side bearings 5150 with the suction port 5110 enables refrigerant gas to be returned from the discharge side bearings 5150 to the suction stream. As a result, refrigerant gas can be removed from the cavity in which the discharge side bearings 5150 are located.

In operation, lubricant is provided to the discharge side bearings 5150 and the suction side bearings 5155 via the conduit 5180. A pool of lubricant is formed within the cavity in which the discharge side bearings 5150 and the suction side bearings 5155 are located.

As discussed above regarding FIG. 18, during operation of the compressor, the discharge side bearings 5150 and the suction side bearings 5155 generate heat. With focus on the discharge side bearings 5150, when the heat is generated during operation, the lubricant pool is heated. As discussed above, the lubricant received from the lubricant source 5060 can include a mixture of lubricant and refrigerant. As a result, when the lubricant pool is heated, refrigerant may be boiled off from the mixture. The gaseous refrigerant can be removed from the cavity via conduit 5200 and lubricant can be removed via conduit 5205. The conduit 5200 is fluidly connected to the cavity containing the discharge side bearings 5150 and to the suction port 5110. The conduit 5205 is also fluidly connected to the cavity containing the discharge side bearings 5150 and to the suction port 5110. As illustrated, an inlet of the conduit 5200 is disposed at a location on a top side of the cavity (e.g., above a depth of the lubricant pool in the cavity) so that gaseous refrigerant can be removed and the inlet of the conduit 5205 is disposed at a location on a lower side of the cavity (e.g., below a depth of the lubricant pool in the cavity) so that liquid lubricant can be removed.

The conduit 5200 can include a flow control device 5210 which can be selectively controlled to enable, disable, or limit the amount of refrigerant being pulled from the discharge side bearings 5150 and provided to the suction port 5110. In an embodiment, the conduit 200 can be sized to restrict a flow of fluid therethrough to a predetermined flowrate. When the flow control device 5210 is closed, a pressure in the bearing cavity increases. As the pressure increases, a flow of lubricant from the lubricant source 5060 decreases. If the temperature in the cavity approaches an upper limit, the flow through conduit 5200 can be enabled, allowing gaseous refrigerant to leave the cavity and increasing a flow of lubricant from the lubricant source 5060, which should reduce a temperature of the discharge side bearings 50150, The conduit 5205 can include a flow control device 5215. In an embodiment, the flow control device 5215 can be a restriction, such as a fixed orifice. In an embodiment, the flow control device 5215 can alternatively be selectively controllable to, for example, vary a flow through the conduit 5205. In such an embodiment, the flow control device 5215 can be a valve or the like.

In operation, the controller (e.g., controller 5050 in FIG. 17) can be used to monitor a temperature of the lubricant for the discharge side bearings 5150 (e.g., using one or more sensors 5065). If the temperature of the lubricant increases beyond a threshold limit, additional lubricant can be provided to the discharge side bearings 5150. If the temperature decreases below a threshold limit, additional lubricant can be prevented from being provided.

Aspects:

Any of aspects 1-9 can be combined with any one of aspects 10-17. It is understood that any of aspects 1-17 can be combined with any other aspects recited herein.

Aspect 1. A heating, ventilation, air conditioning, and refrigeration (HVACR) system, comprising: a refrigerant circuit, including: a compressor including a plurality of bearings and a suction port, a lubricant source, a condenser, an expansion device, and an evaporator fluidly connected; one or more sensors for determining a pressure and a temperature; and a lubricant reservoir fluidly connected to the lubricant source, the plurality of bearings, and the suction port, the lubricant reservoir configured to receive a lubricant-refrigerant mixture, wherein the lubricant reservoir is in thermal communication with a discharge flow path of the compressor.

Aspect 2. The HVACR system of aspect 1, further comprising a flow control device disposed between the lubricant reservoir and the suction port.

Aspect 3. The HVACR system of aspect 2, wherein the flow control device is one of an orifice and an electronically controlled valve.

Aspect 4. The HVACR system of any one of aspects 1-3, wherein the lubricant reservoir is fluidly connected to the plurality of bearings at a location configured to provide a lubricant to the plurality of bearings.

Aspect 5. The HVACR system of any one of aspects 1-4, wherein the lubricant reservoir is fluidly connected to the suction port at a location configured to provide a gaseous refrigerant to the suction port.

Aspect 6. The HVACR system of any one of aspects 1-5, wherein a pressure within the lubricant reservoir is between a suction pressure of the compressor and a discharge pressure of the compressor.

Aspect 7. The HVACR system of any one of aspects 1-6, wherein a conduit fluidly connecting the lubricant reservoir and the suction port is sized to restrict a flow of fluid therethrough to a predetermined flowrate.

Aspect 8. The HVACR system of any one of aspects 1-7, wherein the compressor is a screw compressor.

Aspect 9. The HVACR system of any one of aspects 1-8, wherein the lubricant source is a lubricant separator.

Aspect 10. A heating, ventilation, air conditioning, and refrigeration (HVACR) system, comprising: a refrigerant circuit, including: a compressor including a plurality of bearings and a suction port, a lubricant source, a condenser, an expansion device, and an evaporator fluidly connected; one or more sensors for determining a pressure and a temperature; and wherein the plurality of bearings include a discharge side bearing and a suction side bearing, the plurality of bearings fluidly connected to the lubricant source and configured to receive a lubricant mixture from the lubricant source, and wherein the discharge side bearing is fluidly connected to the suction port.

Aspect 11. The HVACR system of aspect 10, further comprising a flow control device disposed between the discharge side bearing and the suction port.

Aspect 12. The HVACR system of aspect 11, wherein the flow control device is one of an orifice and an electronically controlled valve.

Aspect 13. The HVACR system of any one of aspects 10-12, wherein the lubricant mixture includes a lubricant and a refrigerant.

Aspect 14. The HVACR system of any one of aspects 10-13, wherein the fluid connection between the discharge side bearing and the suction port is disposed at a location configured to provide a gaseous refrigerant to the suction port.

Aspect 15. The HVACR system of any one of aspects 10-14, wherein a conduit fluidly connecting the discharge side bearing and the suction port is sized to restrict a flow of fluid therethrough to a predetermined flowrate.

Aspect 16. The HVACR system of any one of aspects 10-15, wherein the compressor is a screw compressor.

Aspect 17. The HVACR system of any one of aspects 10-16, wherein the lubricant source is a lubricant separator.

A heating, ventilation, air conditioning, and refrigeration (HVACR) system includes a refrigerant circuit. The refrigerant circuit includes a compressor, a lubricant source, a condenser, an expansion device, and an evaporator fluidly connected. The compressor includes a plurality of bearings and a suction port. A lubricant reservoir is fluidly connected to the lubricant source, the plurality of bearings, and the suction port. The lubricant reservoir is configured to receive a lubricant-refrigerant mixture. The lubricant reservoir is in thermal communication with a discharge flow path of the compressor.

Heat Exchanger In Compressor Housing And Method For Degassing Compressor Lubricant (FIGS. 20-24)

The disclosure relates to an internal heat exchanger within a compressor, a system, and a method for improving viscosity of a lubricant to be recycled back into the compressor for reuse.

The internal heat exchanger is in fluid communication with the compressor, for example cavities of bearings of the compressor. The internal heat exchanger can utilize system heat in the compressor to drive refrigerant out of the lubricant to be recycled back into the compressor. In an embodiment, the lubricant is oil.

The internal heat exchanger can include a single or a plurality of passages. The passage(s), in part or as a whole, can be provided or formed within a component of the compressor or on a surface of a component of the compressor. In an embodiment, the passage(s), in part or as a whole, can extend within a component of the compressor. In an embodiment, the passage(s), in part or as a whole, can be integrated into a component of the compressor. In an embodiment, the passage(s), in part or as a whole can be formed onto or into a surface of a component of the compressor. The surface can include, but not limited to, an interface surface or a face of the component.

The component can be, but not limited to, a bearing housing cover, bearing housing, rotor housing, motor housing, muffler of the compressor.

The passage(s), in part or as a whole, can be a machined passage(s) or passage(s).

In an embodiment, the passage(s), in part or as a whole, can be manufactured through a process including but not limited to drilling, casting, etching, milling, welding, or retrofitting, combinations thereof, or the like.

In an embodiment, the passage(s), in part or as a whole, can be casted or drilled within a wall of a casting of a bearing housing cover, bearing housing, rotor housing, motor housing, or muffler of the compressor. Thereby, the casting can utilize system heat to remove refrigerant from the lubricant returning to the compressor.

In an embodiment, the passage(s), in part or as a whole, can be milled on a surface including but not limited to an interface surface or face of a bearing housing cover, bearing housing, rotor housing, motor housing, or muffler of the compressor.

The passage(s), in part or as a whole, can adopt any type of suitable flow configuration including but not limited to serpentine, straight, and curved flow configurations.

The passage(s), in part or as a whole, can be configured into any type of flow arrangements including but not limited to a single-pass or multi-pass passage. In an embodiment, the single-pass or multi-pass passage can be serpentine single-pass or serpentine multi-pass passages.

In an embodiment, the compressor is a screw compressor. In an embodiment, the compressor is a scroll compressor. In an embodiment, the compressor is a reciprocating compressor. In an embodiment, the compressor is a centrifugal compressor.

The system in an embodiment can be an HVACR system including a compressor having an internal heat exchanger. The HVACR system can include a lubricant source. In an embodiment, the lubricant source may be a lubricant separator. The lubricant separator can receive compressed refrigerant discharged from the screw compressor, and then separate a lubricant from compressed gaseous refrigerant.

In an embodiment, the HVACR system can further include a pressure-reducing device. The pressure-reducing device can receive lubricant separated by the lubricant separator and then reduce pressure of the lubricant so that at least a portion of the refrigerant in the lubricant evaporates. The pressure-reducing device then directs the lubricant to the internal heat exchanger for improving a viscosity of the lubricant. In an embodiment, the pressure-reducing device is disposed within the compressor. In an embodiment, the pressure-reducing device is separate (e.g., physically separate) from the compressor. In an embodiment, the pressure-reducing device can be an expansion device of the HVACR system.

In an embodiment, a method for improving viscosity of lubricant to a compressor includes reducing a pressure of a lubricant containing refrigerant by a pressure-reducing device; and heating the lubricant containing refrigerant in an internal heat exchanger of the compressor.

The compressor can be, but is not limited to, a screw, scroll, reciprocating, or centrifugal compressor.

In an embodiment, the compressor can include male and female rotors that can be supported by bearings such as, for example, radial and axial bearings at a discharge end of the compressor. The rotors can be enclosed within a rotor and motor housing, and the bearings can be enclosed and/or supported by a bearing housing assembly. The bearing housing assembly can include a bearing housing and bearing cover. The bearing housing assembly can be, for example, positioned at the axial end of the rotor housing. The bearing cover can be attached to the bearing housing to form an enclosed space.

During operation, the male and female rotors of the compressor can rotate in opposite direction and mesh with each other. The meshing rotors draw refrigerant vapor and force the refrigerant vapor moving along the rotors. As the refrigerant vapor progresses, the refrigerant vapor is compressed with higher temperature as the volume space between the rotors decreases. The compressed refrigerant vapor can be discharged out of the compressor with high heat and pressure through a discharge port.

In an embodiment, the compressor can include intermeshing scrolls, a bearing, a motor, and housings. The intermeshing scrolls can include an orbiting scroll member and a fixed scroll member. An orbiting motion of the orbiting scroll member relative to the fixed scroll member creates pockets that trap refrigerant gas. The pocket becomes increasingly smaller as the refrigerant gas moves toward a center of the fixed scroll member, and thereby the refrigerant gas is compressed and pressurized, accompanied by an increasing temperature. The compressed refrigerant reaches the highest pressure and temperature at the center of the fixed iron scroll member and then is discharged through a discharge port.

In an embodiment, the compressor can include a muffler.

The compressor can be used to compress working fluids, such as for example refrigerant vapor.

The compressor can be provided with lubricant, which is used to lubricate, seal, and protect running surfaces of a component, for example bearings, within the compressor. During operation of the compressor, some lubricant in the compressor is mixed with refrigerant such that the lubricant leaving the compressor contains an amount of refrigerant. This may cause, for example, inadequate supply of lubricant to the compressor. In an HVACR system, the lubricant discharged from the compressor can be circulated back into the compressor such as cavities of the bearings to maintain an adequate supply of the lubricant.

In an embodiment, a lubricant separator can be provided upstream or downstream of the compressor to separate the lubricant from the refrigerant discharged from the compressor. However, the lubricant separated from the lubricant separator can contain an appreciable amount of refrigerant, as the refrigerant may dissolve in the lubricant. This may lower purity of the lubricant and in turn reduce, for example, viscosity of the lubricant. Low viscosity can cause insufficient lubrication, sealing, and/or protection of the running surfaces within the compressor.

Generally, a desirable viscosity range for a lubricant may vary with regard to the type of compressor and/or operation of the compressor. A lubricant used in a compressor in an HVACR system may have a peak viscosity at a temperature higher than a saturation temperature of the refrigerant.

Removing refrigerant dissolved in the lubricant can improve the viscosity of the lubricant to be recycled back into the compressor. This can be achieved by reducing pressure of the lubricant and heating the lubricant.

By reducing the pressure of the lubricant, a portion of the refrigerant contained in the lubricant can evaporate due to the loss of pressure. The evaporation of the refrigerant may lower the temperature of the lubricant.

By adding heat to the lubricant whose pressure and temperature have been reduced, another portion of refrigerant can be boiled from the lubricant. Thereby, the viscosity of the lubricant can be further improved. Generally, if the pressure and temperature of a lubricant containing refrigerant is lowered, for example, by a pressure reducer, and subsequently heat is added to the lubricant, refrigerant can be removed from the lubricant-refrigerant mixture.

By combining the processes of reducing the pressure of a lubricant and adding heat to the lubricant, the viscosity of the lubricant can be improved to a desirable level.

The process of reducing pressure can be performed by any suitable pressure-reducing device known in the art that has a mechanism for reducing pressure. The pressure-reducing device can including but not limited to an expander, pressure reducer, pressure regulator, orifice, expansion valve, or the like. In an embodiment, the pressure-reducing device can be a dedicated device. In an embodiment, the pressure-reducing device can be an expansion device of a refrigerant circuit of an HVACR system.

The process of adding heat to the lubricant can be implemented by creating an internal heat exchanger within a compressor so that the system heat can be utilized to boil off refrigerant from the lubricant.

The term "boil off," as used in this Specification, means that refrigerant contained in a lubricant is driven out of the lubricant by heat.

The term "system heat," as used in this Specification, means heat generated by the compressor due to compressing a working fluid such as, for example, refrigerant. In an embodiment, system heat can include heat from a motor driving the compressor.

The internal heat exchanger can include a single or a plurality of passages. The passage(s), in part or as a whole, can be provided or formed on a surface or within a body of a component of the compressor. The component can be used to transfer system heat to boil off refrigerant from the lubricant returning to the compressor.

In an embodiment, the passage(s), in part or as a whole, can extend within a body of a component of the compressor.

In an embodiment, the passage(s), in part or as a whole, can be integrated into a body, for example a wall, of a component of the compressor.

In an embodiment, the passage(s), in part or as a whole, can be extended onto a surface of a component of the compressor. In an embodiment, the internal heat exchanger, in part or as a whole, can be integrated onto or into a surface of a component of the compressor. The surface can include an interface surface or non-interface surface. The interface surface in an embodiment can be a machined surface between mating parts such as bearing housing to rotor housing. A non-interface surface in an embodiment can have a cover and bolts. In an embodiment, the surface can be a face of the component. The "face" means any flat surface of a component of the compressor.

The component of the compressor can be any part of the compressor that can accommodate the passage(s) of the internal heat exchanger and can transfer sufficient system heat. In an embodiment, the component can be a part exposed to discharge temperature. In an embodiment, the component can be a part whose temperature is greater than a suction temperature of the compressor. In an embodiment, the component can be a part near or close to the discharge port of compressor. In an embodiment, the component of the compressor can include but not limited to a bearing housing cover, bearing housing, rotor housing, motor housing, and/or muffler.

In an embodiment, the passage(s) of the internal heat exchanger, in part or as a whole, can be provided within a casting of a bearing housing cover, bearing housing, rotor housing, motor housing, or muffler of the compressor. The casting of the bearing housing, rotor housing, motor housing, or muffler of the compressor can accommodate the passage(s) and transfer system heat. In an embodiment, the passage(s), in part or as a whole, extend within a bottom of the casting of the bearing housing, rotor housing, or motor housing.

In an embodiment, the passage(s), in part or as a whole, can be provided onto a surface of a bearing cover, bearing housing, rotor housing, motor housing, or a muffler of the compressor. In an embodiment, the passage(s), in part or as a whole, can extend on an interface of the casting of a bearing housing, rotor housing, motor housing, or muffler of the compressor. In an embodiment, the passage(s), in part or as a whole, can be provided on a face of the casting of the bearing housing cover, bearing housing, rotor housing, motor housing, or muffler of the compressor.

The passage(s), in part or as a whole, can be machined passages(s).

The passage(s), in part or as a whole, can be formed by any suitable means including but not limited to casting, etching, drilling, milling, retrofitting, welding, or a combination thereof.

In an embodiment, the passage(s), in part or as a whole, can, but not limited to, be casted within the bearing housing, rotor housing, motor housing, or muffler of the compressor. In an embodiment, the passage(s), in part or as a whole, is drilled hole(s) within the casting of the bearing housing, bearing cover, rotor housing, motor housing, or muffler of the compressor. In an embodiment, the passage(s), in part or as a whole, can be milled on a surface of the bearing housing cover, bearing housing, rotor housing, motor housing, or muffler of the compressor.

The bearing housing can be disposed at or near the discharge end where the compressed hot refrigerant is discharged. In some circumstances, for example, the temperature of the casting of the bearing housing may be higher than those of the rotor housing and the motor housing.

The passage(s) of the internal heat exchanger can be configured to any type of flow arrangements. In an embodiment, the internal heat exchanger can be configured to include a single-pass or multi-pass passage. In an embodiment, the internal heat exchanger can be configured to include multiple parallel single-pass passages.

The passage(s), in part or as a whole, can adopt any suitable configuration, such as geometry and shape, that can transfer sufficient system heat to the lubricant flowing therein. The configuration can include but not limited to serpentine, straight, and/or curved configurations. In an embodiment, the passage(s) can be configured to form one or more serpentine single-pass passages. In an embodiment, the passage(s) can be configured to form one or more serpentine multi-pass passages, so that the lubricant can flow back and forth for multiple times to increase the heat transfer efficiency.

The compressor can be a component of a system. In an embodiment, the system can be an HVACR system. The HVACR system can include a lubricant source and a pressure-reducing device, in addition to a compressor containing the internal heat exchanger. In an embodiment, the lubricant source can be a lubricant separator. The lubricant separator can receive compressed refrigerant discharged from the compressor, and then separate lubricant from gaseous compressed refrigerant. The pressure-reducing device can reduce pressure of the lubricant received from the lubricant separator so that at least a portion of the refrigerant in the lubricant evaporates due to loss of pressure. The lubricant can be routed to the internal heat exchanger for further improvement of viscosity. Thus, the lubricant separator, pressure-reducing device, and internal heat exchanger can constitute a pathway for refining the lubricant to be cycled back to the compressor.

The lubricant separator can be disposed upstream or downstream of the compressor. In an embodiment, the lubricant separator is fluidly disposed between the compressor and the condenser. In an embodiment, the lubricant separator is disposed upstream of the compressor.

The lubricant separator can be any suitable device known in the art that has a mechanism for separating lubricant from refrigerant. In an embodiment, the lubricant separator can be an oil tank or reservoir. The lubricant separator can be a dedicated or non-dedicated device. In an embodiment, an oil reservoir is deposed upstream of the compressor for separating lubricant from refrigerant. In an embodiment, an evaporator of a refrigerant circuit of an HVACR system can function as a non-dedicated lubricant separator.

The pressure-reducing device can be disposed within the compressor or outside of the compressor. In an embodiment, the pressure-reducing device is disposed within the compressor. In an embodiment, the pressure-reducing device is disposed outside of the compressor.

The pressure-reducing device can include, but is not limited to, a pressure regulator or expansion device. In an embodiment, the pressure-reducing device is an orifice. In an embodiment, the pressure-reducing device can be an expander such as, for example, an expansion valve. In an embodiment, the pressure-reducing device can be an expansion device of the refrigerant circuit of the HVACR system.

A method, which uses the internal heat exchanger, the compressor, or the system for improving the viscosity of a lubricant to be cycled back into the compressor, can include reducing a pressure of a lubricant containing refrigerant by a pressure-reducing device and heating the lubricant containing refrigerant in the internal heat exchanger of the compressor with system heat to obtain a refined lubricant.

In an embodiment, the method can further include directing a refrigerant-lubricant mixture discharged from the compressor to a lubricant separator.

In an embodiment, the method can further include directing a lubricant containing refrigerant from the lubricant separator to a pressure-reducing device.

In an embodiment, the method can further include directing a lubricant containing refrigerant from the pressure-reducing device to the internal heat exchanger of the compressor.

In an embodiment, the method can further include directing a lubricant from the internal heat exchanger to cavities of bearings of the compressor.

The internal heat exchanger, system, and method herein can improve viscosity of the lubricant returning to a compressor to a desirable level without use of a sump. A sump is a device that can receive both the lubricant separated from the lubricant separator and a hot lubricant directly from the compressor, for example the bearings. The hot lubricant heats the lubricant separated from the lubricant separator in the sump, and as such a portion of refrigerant in the lubricant can be boiled off. However, the sump can increase the complexity and cost of the system.

Figure 20:
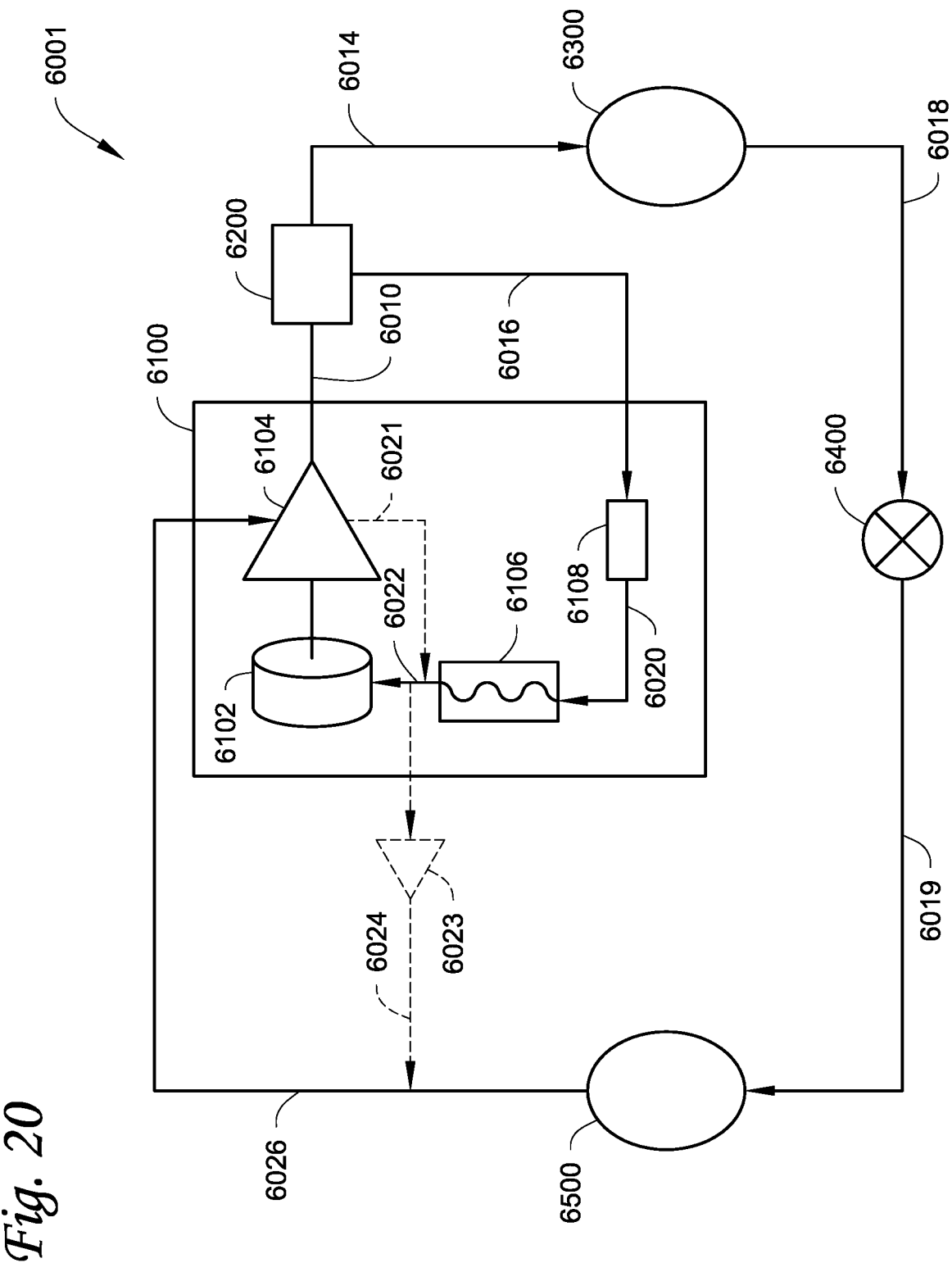
FIG. 20 illustrates a schematic view of an embodiment of a refrigeration system.

FIG. 20 illustrates a schematic view of a refrigeration system 6001, with which the embodiments as disclosed herein can be practiced. The refrigeration system 6001 provides benefits for improving viscosity of the lubricant returning to a compressor by utilizing system heat generated in the compressor. The lubricant may be cycled to, for example, lubricate, seal, and cool moving surfaces within the compressor 6100.

Referring to FIG. 20, the refrigeration system 6001 can include a compressor 6100, a lubricant separator 6200, a condenser 6300, an expansion device 6400, and an evaporator 6500. In an embodiment, the lubricant separator 6200 may not be present or can be included at a different location of the refrigeration system 6001. The compressor 6100 can include bearings 6102, rotors 6104, an internal heat exchanger 6106, and a pressure-reducing device 6108. The internal heat exchanger 6106 is disposed within the compressor 6100. The internal heat exchanger 6106 is in fluid communication with cavities of the bearings 6102 and with the pressure-reducing device 6108. The pressure-reducing device 6108 is further in fluid communication with the lubricant separator 6200. The lubricant separator 6200 is further in fluid communication with the compressor 6100 and the condenser 6300. The lubricant separator 6200, the pressure-reducing device 6108, and the internal heat exchanger 6106 can constitute a return pathway to circulate the lubricant back to the compressor 6100.

In operation, the compressor 6100 compresses gaseous refrigerant. The compressed gaseous refrigerant is discharged together with lubricant as a high-pressure refrigerant-lubricant mixture. The compressor 6100 then delivers the high-pressure superheated refrigerant-lubricant mixture through a line 6010 to the lubricant separator 6200. The lubricant separator 6200 separates the lubricant from the compressed gaseous refrigerant at high pressure. In an embodiment, the lubricant separator 6200 can include an oil reservoir. The lubricant, even after separation, may contain an appreciable amount of refrigerant, which can lower viscosity of the lubricant. As a result, the lubricant may not have sufficient viscosity to lubricate the running surfaces of the compressor 6100 including the bearings 6102.

If the lubricant from the lubricant separator 6200 at high pressure is directly circulated into the bearings 6102 at low pressure, a proportion of the refrigerant may evaporate from the lubricant. However, this would not increase viscosity of the lubricant to a sufficient level.

In the embodiment illustrated by FIG. 20, the viscosity of the lubricant returning the compressor 6100 can be improved by both reducing pressure and increasing temperature of the lubricant.

The lubricant from the lubricant separator 6200 enters the pressure-reducing device 6108 through passage 6016. The pressure-reducing device 6108 lowers the pressure of the lubricant, and a proportion of refrigerant in the lubricant evaporates due to loss of pressure. The evaporation of refrigerant also reduces temperature of the lubricant. In an embodiment, the pressure-reducing device 6108 is an orifice. In an embodiment, the pressure-reducing device 6108 can be an expansion valve. In an embodiment, the pressure-reducing device 6108 can be expander.

After pressure reduction, the lubricant from the pressure-reducing device 6108 enters the internal heat exchanger 6106 through line 6020. The internal heat exchanger 106 can utilize system heat generated in the compressor 6100 to increase temperature of the lubricant, so that an additional proportion of refrigerant can be driven out of the lubricant to further improve viscosity. In an embodiment, the internal heat exchanger 6106 absorbs the system heat in the compressor 6100 to boil off refrigerant contained in the lubricant. In an embodiment, the pressure-reducing device 6108 is configured to reduce the pressure of the lubricant as much as possible.

The internal heat exchanger 6106 can be integrated with a component within the compressor 6100. The internal heat exchanger 6106 can include passage(s) where the lubricant flows. The passage(s) of the internal heat exchanger 6106, in part or as a whole, can be integrated for example within or on a surface of the bearing housing assembly, rotor housing, motor housing, or muffler of the compressor 6100.

The passage(s) of the internal heat exchanger 6106, in part or as a whole, can be machined passage(s). In an embodiment, the passage(s), in part or as a whole, can be drilled in a bottom of the bearing housing, rotor housing, or motor housing of the compressor 6100. In an embodiment, the passage(s), in part or as a whole, can be casted in a bottom of the bearing housing, rotor housing, or motor housing of the compressor 6100.

In an embodiment, the passage(s) of the internal heat exchanger 6106 can be milled on a surface, for example an interface surface, within the compressor 6100. In an embodiment, the passage(s) can be milled on an interface surface of the bearing housing, rotor housing, motor housing, or muffler of the compressor 6100.

In an embodiment, the flow rates of the lubricant in the heat exchanger 6106 and/or the pressure-reducing device 6108 can be controlled to optimize heat transfer to the lubricant and/or pressure reduction of the lubricant, achieving an excellent performance in degassing and raising temperature. In an embodiment, the flow rates can be controlled by using a solenoid valve or other regulating valve or flow control method. In an embodiment, the flow rates could be controlled by logic defined by compressor operating parameters to optimize the flow and heat transfer.

The lubricant can be optionally further heated by mixing with a hot lubricant from the compressor 6100 such as the bearing 6102 and the rotor 6104. In an embodiment, the hot lubricant from the compressor 6100 flows through line 6021 and enters into passage 6022 to further vaporize the refrigerant in the lubricant, before the lubricant returns to the compressor 6100.

The fluid entering cavities of the bearings 6102 includes gaseous refrigerant and a refined lubricant. The refined lubricant is a liquid. The fluid to enter the cavities of the bearings 6102 is a two-phase fluid. Both the refined lubricant and the gaseous refrigerant can enter into the cavities of the bearings 6102. In an embodiment, the gaseous refrigerant is separated from the refined lubricant by, for example, an internal lubricant separator, so that the refined lubricant enters into the cavities of the bearings 6102. The gaseous refrigerant separated from the refined lubricant merges with refrigerant from the evaporator 6500 through line 6024. In an embodiment, the line 6024 is provided with a flow regulator 6023 to direct flow of the gaseous refrigerant separated from the refined lubricant.

The compressed high-pressure gaseous refrigerant separated from the lubricant separator 6200 enters the condenser 6300 through passage 6014. In the condenser 6300, the compressed high-pressure gaseous refrigerant is cooled and condenses into a liquid phase. The refrigerant then passes an expansion device 6400 and enters the evaporator 6500 through lines 6018 and 6019. The liquid refrigerant in the evaporator 6500 evaporates into a gaseous phase. The gaseous refrigerant then enters the compressor 6100 through passage 6026.

Figure 21:
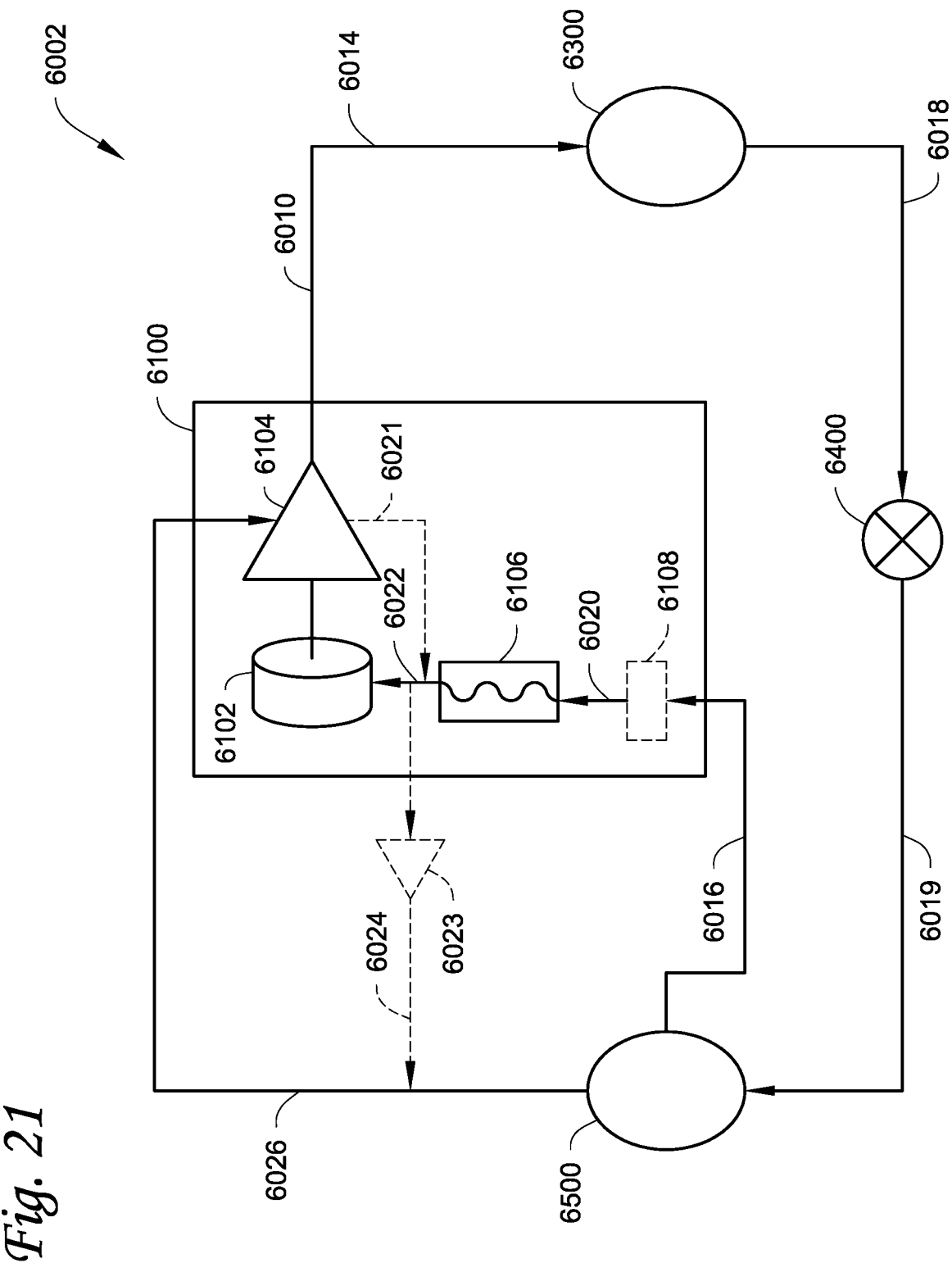
FIG. 21 illustrates a schematic view of another embodiment of a refrigeration system.

FIG. 21 illustrates another schematic view of a refrigeration system 6002, with which the embodiments as disclosed herein can be practiced.

Referring to FIG. 21, the compressor 6100 compresses a gaseous refrigerant. The compressed gaseous refrigerant is discharged from the compressor 6100 together with an appreciable amount of lubricant, forming a compressed high-pressure refrigerant-lubricant mixture. The compressor 6100 then delivers the compressed high-pressure refrigerant-lubricant mixture through a line 6010 to the condenser 6300. The compressed high-pressure refrigerant-lubricant mixture gets cooled in the condenser 6300, and gaseous refrigerant in this mixture is transformed into liquid refrigerant. The condenser 6300 then delivers the refrigerant-lubricant mixture to an expansion device 6400 and the evaporator 6500 through lines 6018 and 6019. The expansion device 6400 reduces the pressure of the refrigerant-lubricant mixture, so that the liquid refrigerant evaporates into a gaseous phase in evaporator 6500, which cools the air flowing through the evaporator 6500. In an embodiment, the lubricant, which is in liquid form, and some residual liquid refrigerant settle down in the evaporator 6500, forming a lubricant-refrigerant mixture. In an embodiment, the expansion device 6400 reduces the pressure of the lubricant discharged from the compressor 6100. This lubricant-refrigerant mixture is then delivered to an optional pressure-reducing device 6108 through line 6016 to further lower the pressure of the lubricant-refrigerant mixture. As such, an additional proportion of the refrigerant may flash out of the lubricant-refrigerant mixture due to reduction of the pressure, which may also further reduce the temperature of the lubricant-refrigerant. In an embodiment, a pump type device is provided at, for example, the line 6016 to drive the lubricant-refrigerant mixture toward the internal heat exchanger 6106. The pump type device can be any types of pumper know in the art that has a mechanism for pumping the lubricant-refrigerant mixture. The lubricant-refrigerant mixture is then delivered to the internal heat exchanger 6106 through passage 6020. The heat exchanger 6106 further boils off refrigerant from the lubricant-refrigerant mixture to obtain a refined lubricant with sufficient viscosity for lubricating and sealing running surfaces within the compressor 6100.

The refined lubricant can be optionally further heated by mixing with hot lubricant from the compressor 6100 such as the bearing 6102 and the rotor 6104. In an embodiment, the hot lubricant from the compressor 6100 flows through line 6021 and enters into passage 6022 to further boil off the refrigerant from the refined lubricant, before the refined lubricant returns to cavities of the bearings 6102 though the passage 6022.

Both the gaseous refrigerant and the refined lubricant can enter into cavities of the bearings 6102 through passage 6022.

In an embodiment, the gaseous refrigerant is separated from the refined lubricant, so that the refined lubricant enters into the bearings of 6102. In an embodiment, the separated gaseous refrigerant merges with the gaseous refrigerant from the evaporator 6500 through line 6024 and then enters the compressor 6100 through line 6026 for compression. In an embodiment, the line 6024 is provided with a flow regulator 6023 directing the flow of the gaseous refrigerant separated from the refined lubricant.

Figure 22:
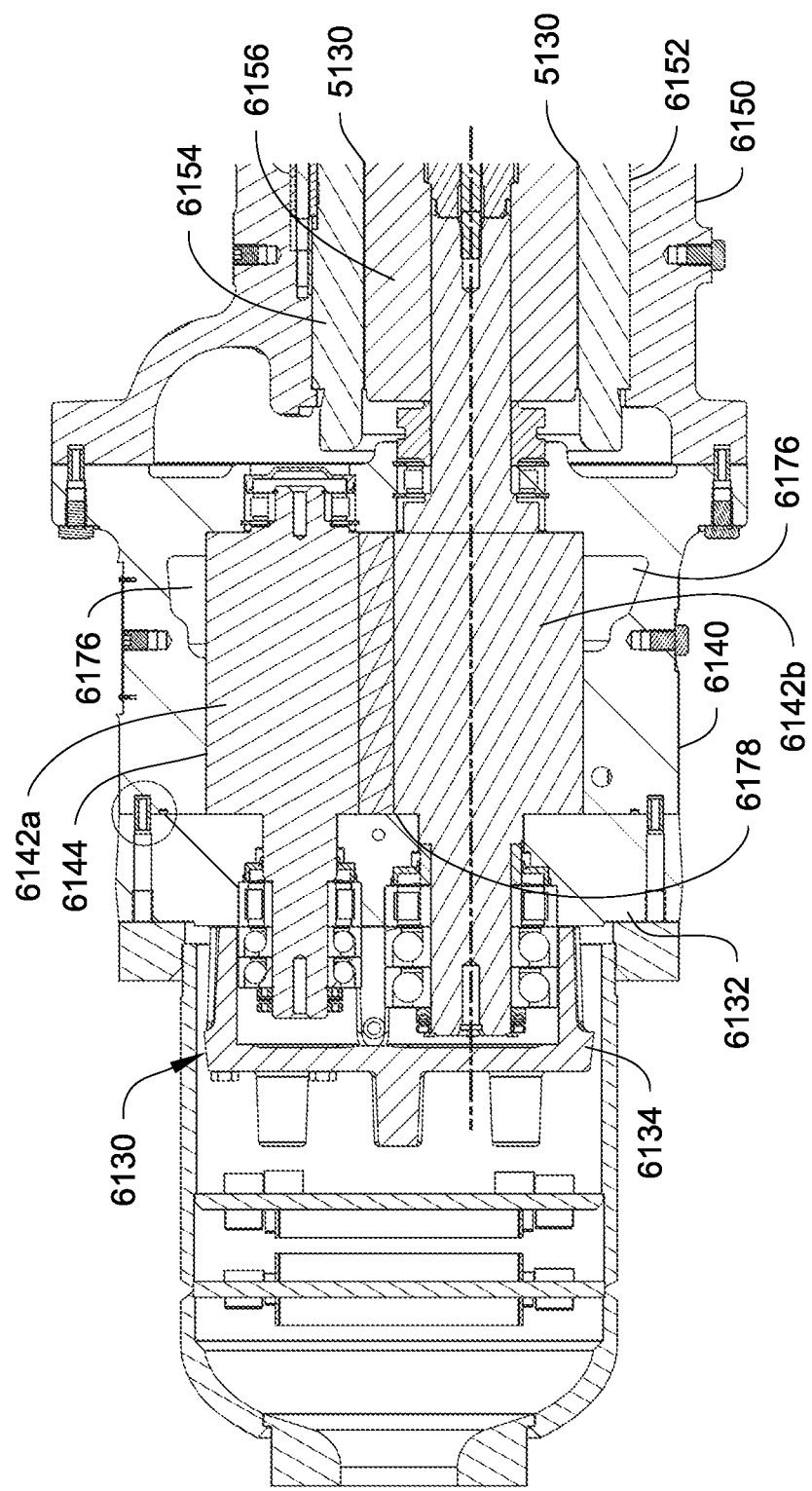
FIG. 22 illustrates an example of a screw compressor, with which the embodiments as disclosed herein can be practiced.

FIG. 22 illustrates an example of the compressor 6100, with which the embodiments as disclosed herein can be practiced.

Referring to FIG. 22, the compressor 6100 is a screw compressor and further includes a bearing assembly 6130, a rotor housing 6140, and a motor housing 6150.

The bearing assembly 6130 includes a bearing housing 6132 and a bearing cover 6134. The bearing assembly 6130 houses bearings. The compressed working fluid such as refrigerant can be discharged through the bearing assembly 6130. The bearing assembly 6130 covers the rotor housing 6140 at the axial end.

The rotor housing 6140 houses rotors 6142a and 6142b. The rotor housing may have a suction port 6176 and discharge port 6178. The suction port 6176 and discharge port 6178 are in fluid communication with the working chamber 6144. The suction port 6176 and the discharge port 6178 may each be an axial port, a radial port, or a combination of a radial and an axial port.

The suction port 6176 may receive the refrigerant at a suction pressure and a suction temperature. The compressor 6100 compresses the refrigerant as the compressor 6100 communicates the refrigerant from the suction port 6176 to the discharge port 6178.

In an embodiment, the motor housing 6150 houses an electric motor 6152. The electric motor 6152 drives meshed screw rotors 6142a, 6142b. In an embodiment, the motor housing 6150 may be integral to the rotor housing 6140.

Figure 23:
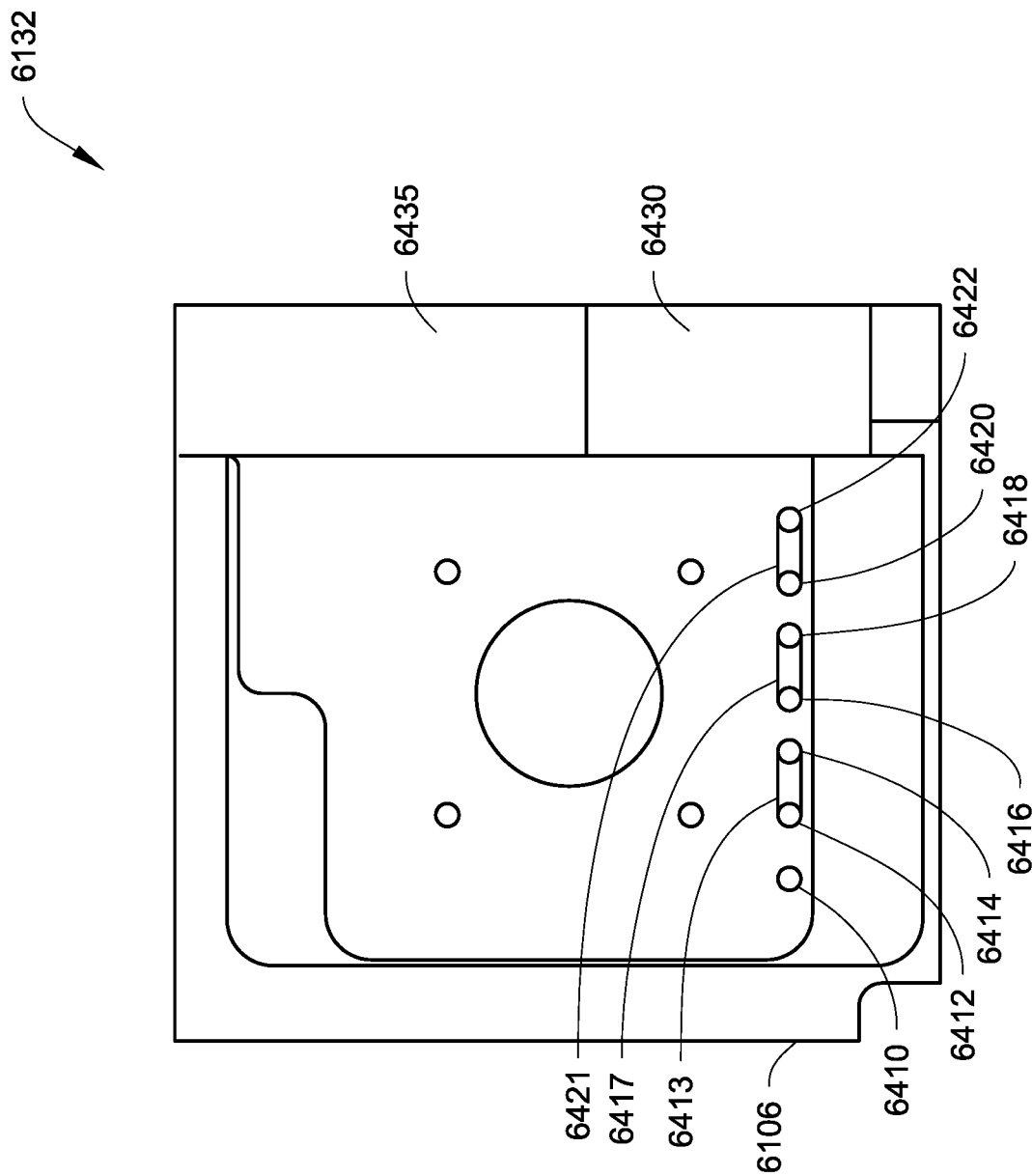
FIG. 23 illustrates an example of an internal heat exchanger utilizing passages drilled or casted in the bottom wall of the bearing housing of a screw compressor, according to an embodiment.

FIG. 23 illustrates an embodiment of the internal heat exchanger 6106 including passages drilled or casted within the bottom wall of the casting of the bearing housing 6132 of a compressor, according to an embodiment.

Referring to FIG. 23, the embodiment of the internal heat exchanger 6106 can include a plurality passages. In an embodiment, the internal heat exchanger includes seven internal passages provided within the bottom wall of the casting of the bearing housing 6132 of a compressor. The seven internal passages are 6410, 6412, 6414, 6416, 6418, 6420, and 6422. The seven internal passages can be arranged in a parallel manner. It is understood that the number and the arrangement of the internal passages in the embodiment of the internal heat exchanger 6106 is exemplary and can be other number and/or arrangement that can transfer sufficient system heat for boiling off refrigerant out of lubricant.

The seven passages can be configured to a serpentine seven-pass passage by other passages including passages 6413, 6417, and 6421, with the passage 6410 being an inlet and the passage 6422 being an outlet in an embodiment. The serpentine seven-pass passage allows the lubricant to flow back and forth seven times to absorb system heat to remove the refrigerant contained in the lubricant. As such, the lubricant can become refined with sufficient viscosity to lubricating and sealing the running surfaces within the compressor. It is understood that the seven internal passages can be configured to any other flow configuration without being limited particular to the serpentine seven-pass passages. In an embodiment, the seven internal passages 6410, 6412, 6414, 6416, 6418, 6420, and 6422 can be configured to form multiple parallel single-pass passages.

The passage 6422 is in fluid communication with passage 6430. The passage 6430 is further in fluid communication with passage 6435 that is in fluid communication with cavities of the bearings of the compressor. The passage 6435 can receive a fluid from the passage 6422 and route the fluid to the cavities of the bearings 6102 of the compressor.

A length of each passage is not particularly limited but can be dependent on a flow rate and temperature rise needed. In an embodiment, each of the passages 6410, 6412, 6414, 6416, 6418, 6420, and 6422 can have a length of at or about 6020 inches. Thus, the total length of the serpentine seven-pass passage is at or about 6140 inches. It is understood that any other suitable length of passages can be chosen to transfer sufficient heat to boil off refrigerant out of the lubricant.

In an embodiment, the passages can be formed by for example machining. The passages can be manufactured by any suitable means including but not limited to drilling, casting, etching, retrofitting, etc.

The bottom wall of the bearing housing 6132 can have a sufficient thickness for accommodating the passages. In an embodiment, the passages, in part or as a whole can be manufactured by casting holes within the bottom wall of the bearing housing 6132 of the compressor. In an embodiment, the passages, in part or as a whole, can be manufactured by milling and/or retrofitting in addition to casting and/or drilling. It is understood that the above embodiment illustrated by FIG. 23 is merely an example. The passages can be machined in any suitable location of the bearing housing, rotor housing, or motor housing of the compressor, depending on their shape, size, and design, if the location can accommodate the passages and can provide sufficient system heat to boil off the refrigerant out of the lubricant.

Figure 24:
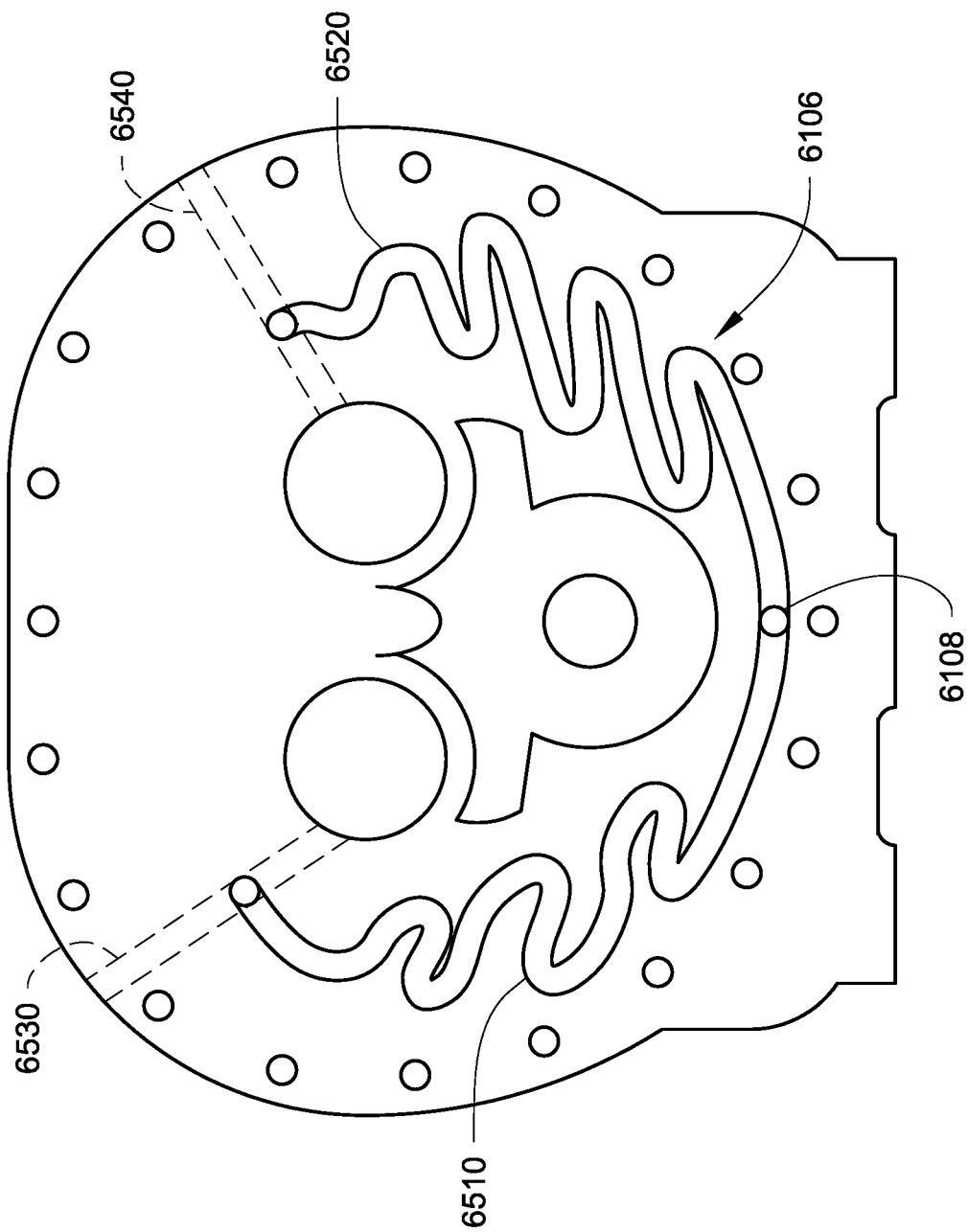
FIG. 24 illustrates another example of an internal heat exchanger utilizing surface passages milled on an interface surface of the bearing housing of a screw compressor, according to an embodiment.

FIG. 24 illustrate an embodiment of the internal heat exchanger 6106 including surface passages 6510 and 6520 provided on a surface of a bearing housing of a compressor according to an embodiment.

Referring to FIG. 24, the embodiment of the internal heat exchanger 6106 includes passages 6510 and 6520 provided on a surface of the bearing housing assembly of a compressor. In an embodiment, the passages 6510 and 6520 are milled on a surface of the bearing housing of the compressor. In an embodiment, the passages 6510 and 6520 are provided on an interface surface of the bearing housing of the compressor. In an embodiment, the interface can be an interface surface between the bearing housing and the rotor housing. It is understood that the embodiment of the internal heat exchange 6106 can include one (1) or more than two (2) passages.

The two passages 6510 and 6520 are fluidly connected with the pressure-reducing device 6108. In an embodiment, the two passages 6510 and 6520 can further respectively fluidly connected with passages 6530 and 6540 below the interface surface of the bearing housing of the compressor. In an embodiment, the passages 6530 and 6540 can be further in fluid communication with cavities of the bearings of the compressor.

The passages 6510 and 6520 can have a serpentine shape. The embodiment of the internal heat exchanger 6106 absorbs the system heat of the compressor to boil off liquid refrigerant in the lubricant. As such, the lubricant becomes refined with excellent viscosity before entering into bearings 6102 of the compressor.

It is understood that the embodiment illustrated by FIG. 24 is an example. In an embodiment, the passages 6510 and 6520 can be provided on a surface of the rotor housing, muffler, or motor housing of the compressor.

The passages 6510 and 6520 are milled on a surface of the bearing housing assembly. It is understood that the passages 6510 and 6520 can also be manufactured by any other suitable means such as for example etching, welding, and the like. In an embodiment, the passages 6530 and 6540 are drilled within the bearing housing assembly. It is understood that the passages 6530 and 6540 can also be manufactured by any other suitable means such as for example casting.

Aspects:

Any of aspects 1-6 can be combined with any of aspects 7-9, and any of aspects 1-9 can be combined with aspect 10. It is understood that any of aspects 1-10 can be combined with any other aspects recited herein.

Aspect 1. A compressor comprising an internal heat exchanger, wherein the internal heat exchanger is fluid communication with bearings of the compressor.

Aspect 2. The compressor of aspect 1, wherein the internal heat exchanger is fluidly connected with a pressure-reducing device.

Aspect 3. The compressor of aspects 1-2, wherein the internal heat exchanger includes passages extended within bearing housing, rotor housing, motor housing, or muffler of the compressor.

Aspect 4. The compressor of aspects 1-3, wherein the internal heat exchanger includes passage(s) provided onto a surface or interface surface of bearing housing, motor housing, motor housing, or muffler of the compressor.

Aspect 5. The compressor of aspects 1-4, wherein the internal heat exchanger includes passage(s) casted or drilled within bearing housing, motor housing, motor housing, or muffler of the compressor.

Aspect 6. The compressor of aspects 1-4, wherein the internal heat exchanger includes passage(s) milled on a surface or interface surface of bearing housing assembly, motor housing, motor housing, or muffler of the compressor.

Aspect 7. A heating, ventilation, air conditioning, and refrigeration (HVACR) system, comprising the compressor of aspects 1-6.

Aspect 8. The HVACR system of aspect 7, wherein the HVACR system further comprises a lubricant separator, the lubricant separator receives fluid discharged from the compressor and separates lubricant from the fluid.

Aspect 9. The HVACR system of aspect 8, wherein the lubricant separator is in fluid communication with a pressure-reducing device, and the pressure-reducing device is in fluid communication with the internal heat exchanger.

Aspect 10. A method form improving viscosity of lubricant returning to the compressor of aspects 1-9 for reuse, comprising: reducing a pressure and temperature of a lubricant-refrigerant mixture by a pressure-reducing device; and heating the lubricant-refrigerant mixture in an internal heat exchanger of the compressor, wherein the pressure-reducing device evaporates a portion of refrigerant out of the lubricant-refrigerant mixture, the internal heat exchanger absorbs system heat in the compressor to boil off another portion of refrigerant out of the lubricant-refrigerant mixture.

Disclosure relates to an internal heat exchanger within a compressor, a system, and a method for improving viscosity of the lubricant to be cycled back into the compressor. The internal heat exchanger is in fluid communication with a pressure-reducing device, which receives a lubricant separated from a refrigerant-lubricant mixture discharged from the compressor. The pressure-reducing device lowers pressure of the lubricant, causing a proportion of refrigerant in the lubricant evaporates concurrently with a temperature drop. The lubricant then flows through the internal heat exchanger, so that another proportion of refrigerant in the lubricant can be boiled off to obtain a refined lubricant. The refined lubricant then enters into cavities of bearings of the compressor for reuse.

Figure 25:
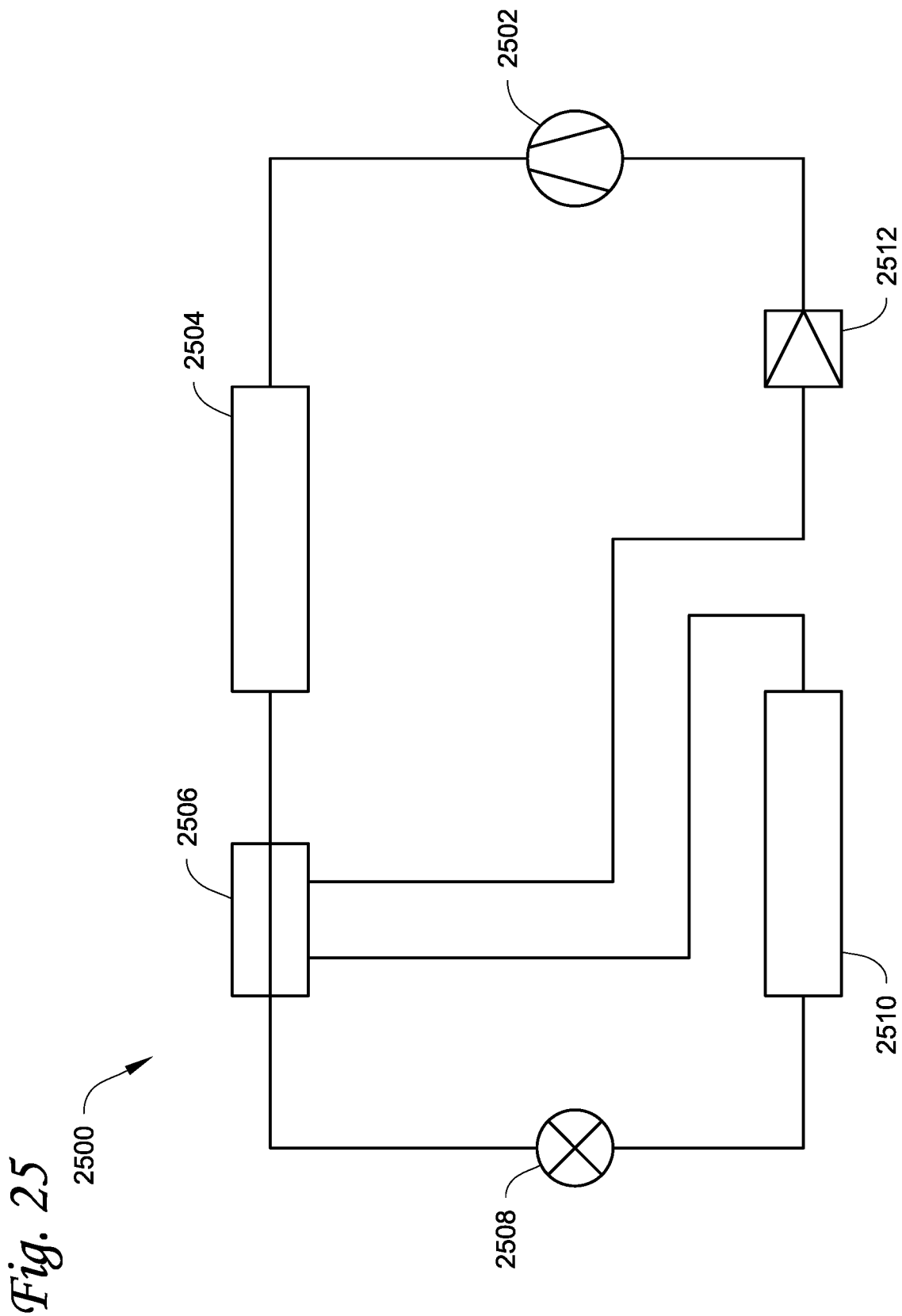
FIG. 25 illustrates a circuit including a suction-line heat exchanger according to an embodiment.
Figure 26A:
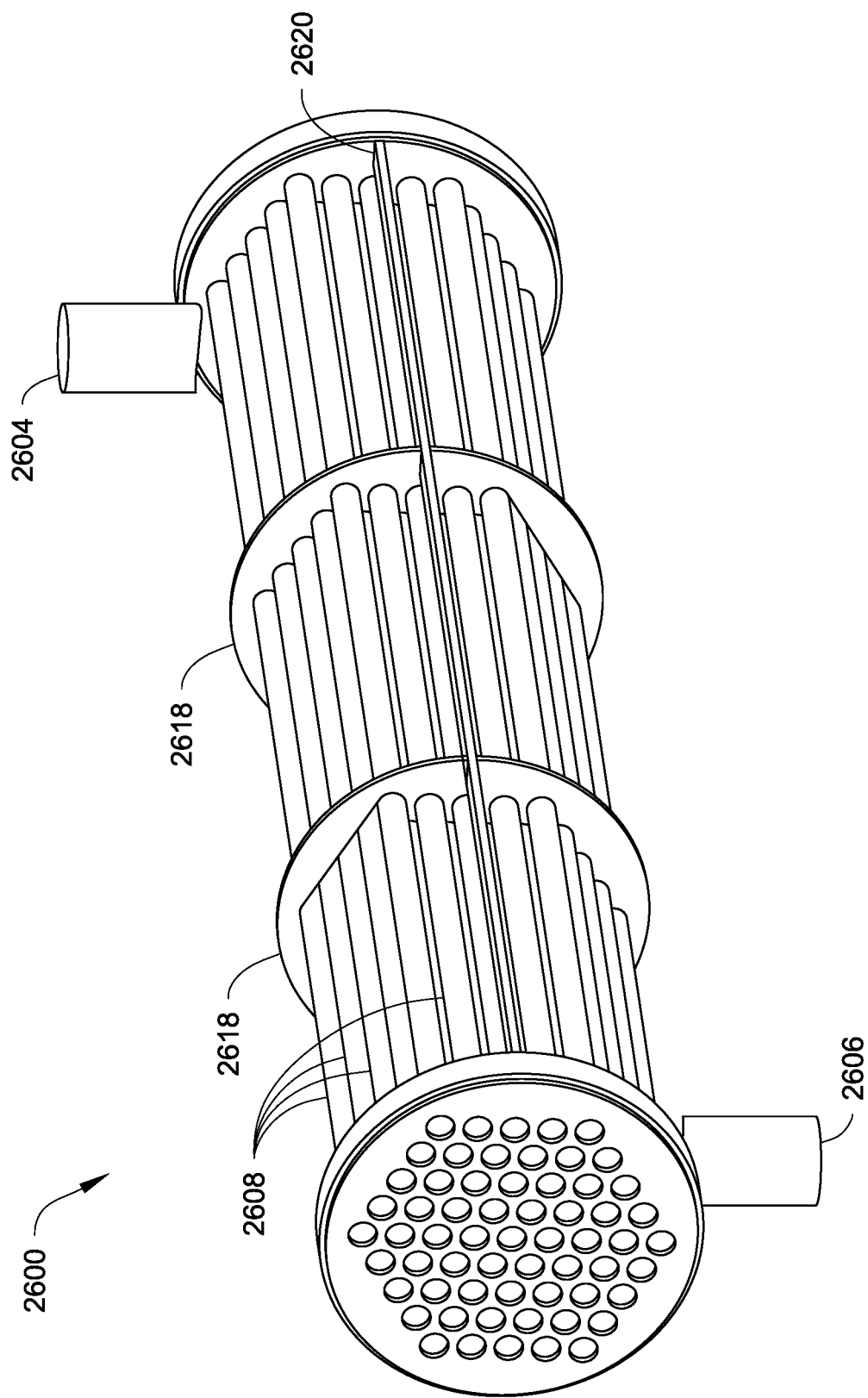
FIG. 26A illustrates a perspective view of a suction-line heat exchanger according to an embodiment.
Figure 26B:
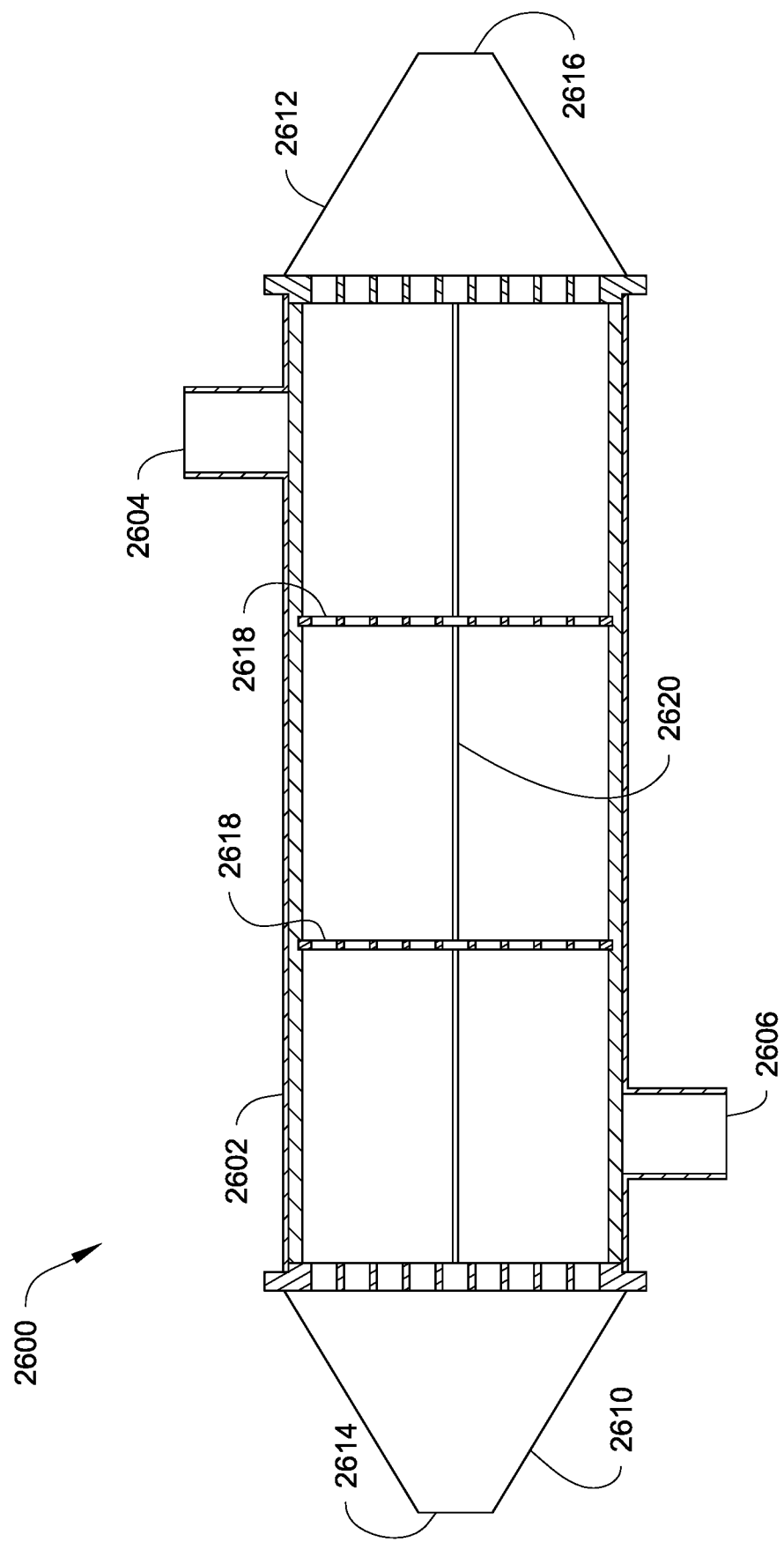
FIG. 26B illustrates a side view of a suction-line heat exchanger according to the embodiment shown in FIG. 26A.
Figure 27:
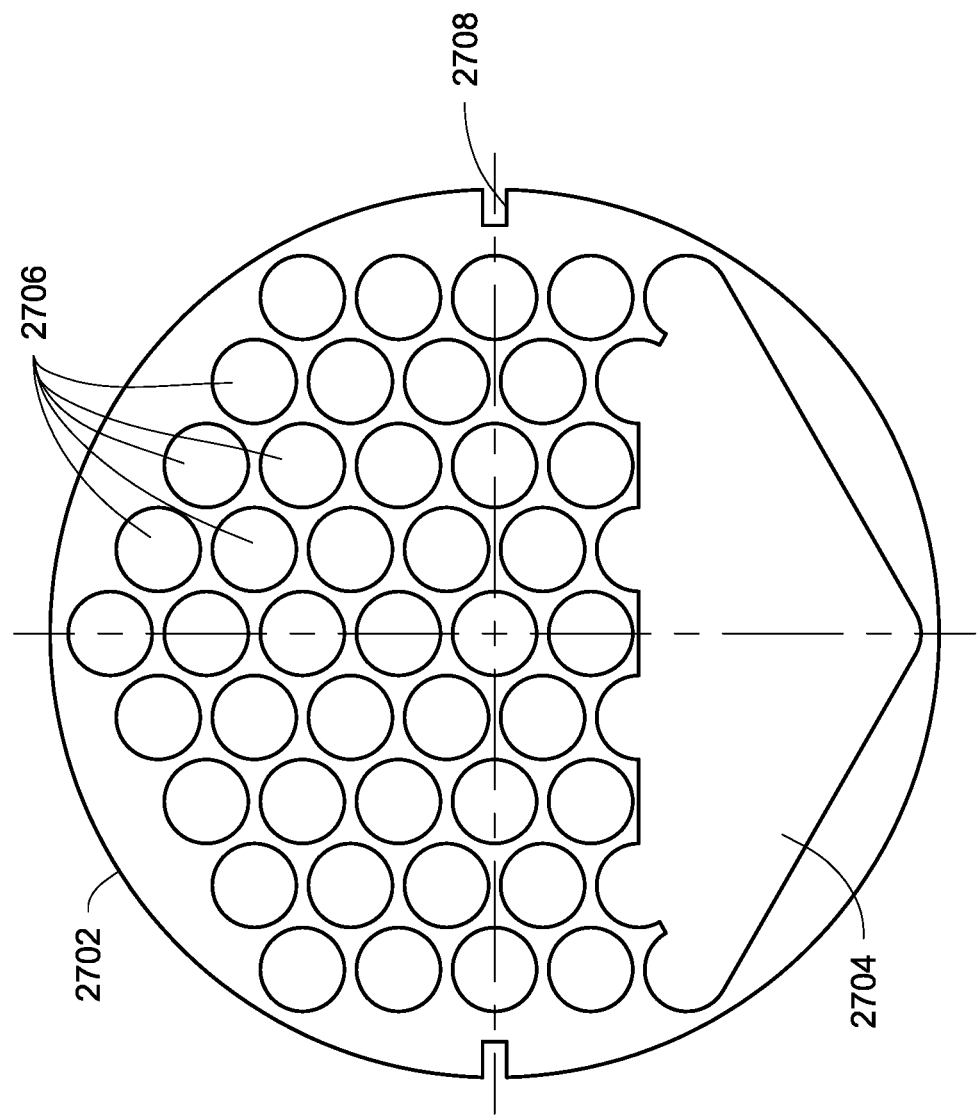
FIG. 27 illustrates a heat exchanger baffle of a suction-line heat exchanger according to an embodiment.

Suction-Line Heat Exchanger (FIGS. 25-27)

This disclosure is related to a refrigeration circuit including a suction line heat exchanger to increase a discharge superheat of the compressor.

A suction line heat exchanger can allow relatively hot liquid leaving a condenser of a refrigeration circuit to exchange heat with relatively cool gas leaving an evaporator of a refrigeration circuit. This heat exchange can increase the temperature of working fluid that is being received at a suction port of a compressor of the refrigeration circuit. The increased suction temperature in turn can result in increased discharge superheat for the discharge of the compressor. Increased discharge superheat can improve oil separation and recovery and reduce problems associated with lubricant being dissolved in the refrigerant, particularly for compressor designs having improved efficiency and for low global warming potential (low-GWP) refrigerants such as R1234ze.

In an embodiment, a refrigeration circuit includes a compressor, a condenser, an expander, an evaporator, and a suction line heat exchanger. The suction line heat exchanger is configured to exchange heat between a liquid side receiving a working fluid as a liquid leaving the condenser, prior to the expander and a gas side receiving the working fluid as a gas leaving the evaporator, prior to the compressor. The liquid side includes a shell and the gas side includes a plurality of tubes extending through the shell. The suction line heat exchanger is configured such that a discharge of the compressor has a discharge superheat of at or about 3.3° C. or more than 3.3° C.

In an embodiment, the refrigerant circuit further includes a throttling valve between the plurality of tubes of the suction line heat exchanger and the compressor.

In an embodiment, the shell has a length of at or about one meter and the shell has a diameter of between at or about 200 millimeters (mm) and at or about 220 mm. The plurality of tubes includes between at or about 55 and at or about 65 tubes, and each of the plurality of tubes has an interior diameter of between at or about 15 mm and at or about 18 mm.

In an embodiment, a pressure drop across the gas side of the suction line heat exchanger is at or about 10 kPa or less than 10 kPa for refrigerant R1234ze.

In an embodiment, a temperature of gas leaving the gas side of the suction line heat exchanger is greater than at or about 1.5° C. greater than a temperature of the gas entering the gas side of the suction line heat exchanger.

In an embodiment, the refrigeration circuit further includes a plurality of baffles within the shell. Each of the baffles includes a continuous perimeter in contact with an entire inner diameter of the shell and an open area. In an embodiment, the open area includes at or about 30% of the area defined by the continuous perimeter.

In an embodiment, the shell includes a plurality of longitudinal baffles each extending a length of the shell and extending from an inner surface of the shell to one of the plurality of tubes.

In an embodiment, a suction line heat exchanger embodiment includes a liquid side including an inlet connected to a condenser of a refrigeration circuit, an outlet connected to an expander of the refrigeration circuit, and a shell defining an internal space. The suction line heat exchanger also includes a gas side including, an inlet connected to an evaporator of the refrigeration circuit, an inlet header connecting the inlet to a plurality of tubes, the plurality of tubes extending through the internal space from one end of the shell to an opposing end of the shell, and an outlet header connecting the plurality of tubes to an outlet. The suction line heat exchanger is configured to increase a discharge superheat of a compressor of the refrigeration circuit such that the discharge superheat is at or about 3.3° C. or more than 3.3° C.

In an embodiment, the shell has a length of at or about one meter and the shell has a diameter of between at or about 200 millimeters (mm) and at or about 220 mm. The plurality of tubes includes between at or about 55 and at or about 65 tubes, and each of the plurality of tubes has an interior diameter of between at or about 15 mm and at or about 18 mm.

In an embodiment, a pressure drop across the gas side of the suction line heat exchanger is at or about 10 kPa or less than 10 kPa for refrigerant R1234ze.

In an embodiment, there is a chamfer where each of the tubes is connected to the inlet header, and a chamfer where each of the tubes is connected to the outlet header.

In an embodiment, the suction line heat exchanger further includes a plurality of baffles within the shell. Each of the baffles includes a continuous perimeter in contact with an entire inner diameter of the shell and an open area. In an embodiment, the open area includes at or about 30% of the area defined by the continuous perimeter.

In an embodiment, the shell includes a plurality of longitudinal baffles each extending a length of the shell and extending from an inner surface of the shell to one of the plurality of tubes.

In an embodiment, a method of increasing superheat of a refrigerant includes directing relatively hot liquid refrigerant from a condenser to a suction line heat exchanger; directing relatively cool gaseous refrigerant from an evaporator to the suction line heat exchanger; performing heat exchange between the relatively hot liquid refrigerant and the relatively cool gaseous refrigerant using the suction line heat exchanger, to increase the heat of the relatively cool gaseous refrigerant to obtain a heated gaseous refrigerant; and directing the heated gaseous refrigerant to a suction port of the compressor, wherein the compressor heats and pressurizes the heated gaseous refrigerant to obtain a superheated gaseous refrigerant.

Improvements to efficiency of compressors may reduce superheating by the compressor. In turn, this can result in difficulty in oil separation and increased issues with oil saturation in a working fluid. A heat exchanger at the suction line heating working fluid prior to its entry into the compressor can result in the discharge of the compressor being superheated, improving oil separation. Further, this can increase the available portions of the operational map by ensuring sufficient performance and lubricant separation even at lower capacities.

FIG. 25 illustrates a circuit including a suction-line heat exchanger according to an embodiment. The refrigeration circuit 2500 shown in FIG. 25 includes a compressor 2502, a condenser 2504, a suction line heat exchanger 2506, expansion device 2508, evaporator 2510, and optional throttling valve 2512.

Compressor 2502 is a compressor connected to the refrigeration circuit 2500. The compressor 2502 may be, for example, a screw compressor, where compression chambers are formed and a fluid such as a working fluid is compressed by the rotation of two rotors and the engagement of lobes on each of the rotors. Compressor 2502 may include one or more lubricated bearings that may, for example, support and allow the rotation of components of the compressor such as the rotors of a screw compressor. Compressor 2502 can be, for example, any of the compressor embodiments described herein. Compressor 2502 has an operational map defining its range of operation over saturated suction temperatures and saturated discharge temperatures for the compressor. Compressor 2502 can have a minimum required suction pressure for operation. The discharge of compressor 2502 can have a discharge superheat of at least 3.3° C. or at or about 3.3° C. across the entire operating map within which compressor 2502 is operated during operation of refrigeration circuit 2500. In an embodiment, the discharge superheat of the compressor 2502 is in the range from at or about 3.3° C. to at or about 25° C. In an embodiment, the compressor 2502 requires a suction pressure in a range from at or about 1.35 to at or about 5.13 bars.

Condenser 2504 is located downstream of the compressor 2502. Condenser 2504 is a component of the refrigeration circuit where the working fluid compressed by compressor 2502 rejects heat. Condenser 2504 receives the working fluid in a heated and compressed state from compressor 2502. Condenser 2504 allows the heated and compressed working fluid to reject heat.

Suction line heat exchanger 2506 allows the exchange of heat between the working fluid leaving condenser 2504, and the working fluid leaving evaporator 2510. The working fluid leaving condenser 2504 is at a relatively higher temperature than the working fluid leaving evaporator 2510. The exchange of heat in suction line heat exchanger 2506 heats the working fluid from evaporator 2510 that then passes to compressor 2502. The exchange of heat in suction line heat exchanger 2506 also cools the working fluid from condenser 2504 that then passes to expansion device 2508. Suction line heat exchanger 2506 can include a plurality of tubes, a shell and one or more baffles within the shell, which are detailed below and shown in FIGS. 26A, 26B, and 27. The suction line heat exchanger 2506 can be configured to provide subcooling sufficient to preserve the cooling capacity of the refrigeration circuit 2500 without excessive pressure drop of the working fluid across the suction line heat exchanger 2506. The subcooling and pressure drop values may be particular to the design of a particular refrigerant circuit 2500. In an embodiment, a temperature of gas leaving the gas side of the suction line heat exchanger 2506 can be in the range from at or about 0° C. to at or about 20° C. In an embodiment, the heating of gas in suction line heat exchanger can result in a discharge superheat of the compressor being increased by at least 1.5° C. or at or about 1.5° C. In an embodiment, a subcooling in suction line heat exchanger 2506 can be at least 33 kW or at or about 33 kW.

Expansion device 2508 is a device configured to expand the working fluid passing through. The expansion causes the working fluid to significantly decrease in temperature. In an embodiment, the expansion device 2508 may be an expander such as an expansion valve, expansion plate, expansion vessel, orifice, the like, or other such types of expansion mechanisms. It should be appreciated that the expansion device 2508 may be any type of expander used in the field for expanding a working fluid causing the working fluid to decrease in temperature.

Evaporator 2510 provides heat exchange between the working fluid leaving expansion device 2508 and another fluid. In evaporator 2510, the working fluid absorbs heat from the other fluid, evaporating the working fluid. Working fluid leaving evaporator 2510 then travels to suction line heat exchanger 2506.

Optionally, throttling valve 2512 can be included between suction line heat exchanger 2506 and compressor 2502. In an embodiment, throttling valve 2512 is not included in the refrigeration circuit 2500, and the suction line heat exchanger 2506 may be directly connected to the suction of compressor 2502. Throttling valve 2512 can control the flow of working fluid into the suction port of compressor 2502, for example to maintain suitable pressure between the evaporator 2510 and the suction port of the compressor 2502.

FIG. 26A illustrates a perspective view of a suction-line heat exchanger 2600 according to an embodiment. FIG. 26B illustrates a side view of the suction-line heat exchanger 2600 according to the embodiment shown in FIG. 26A. In FIG. 26A, the shell 2602 is omitted such that internal components of the heat exchanger are visible. In FIG. 26B, the tubes 2608 are omitted from the sectional view while shell 2602 is included.

Suction line heat exchanger 2600 includes a shell 2602, which is shown cut away to allow the interior of suction line heat exchanger 2600 to be visible. Shell 2602 has an inlet 2604 and an outlet 2606, and a plurality of tubes 2608 connected to an inlet header 2610 and an outlet header 2612. The inlet header 2610 is connected to an inlet 2614 and the outlet header 2612 is connected to an outlet 2616. Baffles 2618 can be included within shell 2602 and surrounding tubes 2608. Suction line heat exchanger 2600 can further include longitudinal baffles 2620.

The suction line heat exchanger 2600 can be configured to provide subcooling sufficient to preserve the cooling capacity of a refrigeration circuit and without excessive pressure drop of the working fluid across the suction line heat exchanger 2600. In an embodiment, the subcooling provided by suction line heat exchanger 2600 can be at least 33 kW or at or about 33 kW. For example, the heating of the fluid passing through tubes 2608 can be sufficient that the discharge superheat of a compressor receiving the fluid is at least 3.3° C. or at or about 3.3° C., for example, across the entire operating map of the compressor. In an embodiment, the suction line heat exchanger 2600 adds at least 1.5° C. or at or about 1.5° C. to the temperature of gas passing through tubes 2608. In an embodiment, the pressure drop is such that the fluid leaving the suction line heat exchanger 2600 has a pressure greater than a minimum suction pressure of the compressor. In an embodiment, a pressure drop for the relatively cool gas across the suction line heat exchanger 2600 is at or about 10 kPa or less than 10 kPa. This configuration can include parameters including the number and diameter of tubes 2608, the length of the shell 2602, features such as a conical inlet and outlet headers 2610, 2612, chamfering of the inlets to each of the tubes 2608, and the like.

Shell 2602 receives working fluid from a first point in a refrigeration circuit, such as refrigeration circuit 2500 described above and shown in FIG. 25. In an embodiment, the working fluid received by and conveyed through shell 2602 is a relatively hot liquid received from a condenser, such as condenser 2504 discussed above and shown in FIG. 25. In an embodiment, the length and/or the diameter of shell 2602 is based on, for example, one or more of the available space in an HVACR unit, the desired heat exchange at the suction line heat exchanger 2600, and the temperature, density, and/or flow rates of the fluids within shell 2602 and tubes 2608, respectively. In an embodiment, shell 2602 is at or about one meter in length. In an embodiment, shell 2602 is at or about 1006 mm in length. In an embodiment, shell 2602 has an exterior diameter of between at or about 200 mm and at or about 220 mm. In an embodiment, shell 2602 has an interior diameter of between at or about 195 mm to 202 mm.

Shell 2602 has an inlet 2604 and an outlet 2606. Inlet 2604 is an inlet in fluid communication with a hot liquid source such as a condenser of a refrigerant circuit, such as condenser 2504. Outlet 2606 allows fluid to exit shell 2602 once it has exchanged heat with the fluid in the tubes 2608. Outlet 2606 may be in fluid communication with an expander included in the refrigeration circuit such as expansion device 2508 described above and shown in FIG. 25. In an embodiment, shell 2602, inlet 2604 and outlet 2606 form the liquid side of suction line heat exchanger 2600.

A plurality of tubes 2608 extend through shell 2602. The tubes 2608 are sealed from the interior of shell 2602 such that fluid in tubes 2608 cannot mix with fluid within the shell 2602. The number of tubes can be selected based on the values defining a sufficient exchange of heat between the fluids, and properties of the fluids including, for example, their temperature, flow rate, density, and the like. The size of shell 2602 may be affected by the number and size of tubes 2608. In an embodiment, suction line heat exchanger 2600 includes sixty-one tubes 2608. The tubes 2608 may have a length and a diameter selected to allow sufficient heat exchange within the suction line heat exchanger 2600. In an embodiment, sufficient heat exchange can be defined based on one or more of the refrigerant used as the working fluid, such as, for example, R1234ze, a lubricant used in a compressor connected to the suction line heat exchanger 2600, the operating map of the compressor, compressor flow, compressor efficiency, discharge superheat for portions of the operating map, and the temperatures of the working fluid in the relatively hot liquid state entering shell 2602 and the relatively cool gaseous state entering tubes 2608. The tubes 2608 are made of a thermally-conductive material allowing heat transfer between the fluid in shell 2602 and the fluid in each of the tubes 2608. In an embodiment, the tubes are made of copper. In an embodiment, the material of the tubes is selected based on other parameters such as one or more of the length of the tubes 2608 and/or the shell 2602, the rates of fluid flow through the shell 2602 and/or the tubes 2608, the temperatures of the fluid in each of the shell 2602 and tubes 2608, and the like, to allow sufficient heat exchange within the suction line heat exchanger 2600. In an embodiment, the length of each of the tubes 2608 is the same as the length of shell 2602. In an embodiment, the length of each of the tubes 2608 is at or about approximately one meter. In an embodiment, the outer diameter of each of the tubes 2608 is from at or about 18 mm to at or about 19 mm. In an embodiment, the thickness of the wall of each of the tubes 2608 is between at or about 2.3 mm and at or about 2.6 mm. In an embodiment, the interior diameter of each of the tubes 2608 is between at or about 15.4 mm and at or about 16.7 mm.

The tubes 2608 are each connected to an inlet header 2610 and also to an outlet header 2612. The inlet header 2610 is connected to an inlet 2614 and the outlet header 2612 is connected to an outlet 2616. In an embodiment, the inlet header 2610 is generally conical and chamfered in shape, having a smaller diameter at the inlet 2614 and a larger diameter at shell 2602. In an embodiment, the outlet header 2616 is generally conical and chamfered in shape, having a smaller diameter at the outlet 2616 and a larger diameter at shell 2606.

In an embodiment, the working fluid received at inlet header 2610 and divided to flow through the plurality of tubes 2608 is a relatively cool gas received from an evaporator of a refrigeration circuit including the suction line heat exchanger 2600. The relatively cool gas is at a temperature lower than the temperature of the relatively hot liquid received at and passing through shell 2602. In an embodiment, there is a chamfer where each of the tubes 2608 meets the inlet header 2610, to facilitate flow into each of the tubes 2608 and reduce pressure drop.

Outlet header 2612 receives working fluid from tubes 2608 as a gas that has been heated by heat exchange with the relatively hot liquid in shell 2602. Each of tubes 2608 joins outlet header 2612, where the flows from the tubes combine and are conveyed to outlet 2616. In an embodiment, where each of the tubes 2608 joins the outlet header 2612, the tubes have a chamfered surface expanding towards outlet header 2612 to facilitate flow from tubes 2608 into outlet header 2612 and reduce pressure drop.

The outlet 2616 allows the working fluid that entered at inlet 2614 and was directed through tubes 2608 to leave the suction line heat exchanger 2600. In an embodiment, the outlet 2616 is connected to a suction port of a compressor of a refrigeration circuit. At outlet 2616, the working fluid has a greater temperature than it did at inlet 2614 of the suction line heat exchanger 2600. The relatively heated working fluid can result in an increased discharge superheat once the working fluid is compressed by the compressor and discharged, compared to working fluid in an otherwise equivalent refrigeration circuit lacking suction line heat exchanger 2600. In an embodiment, tubes 2608, inlet header 2610, outlet header 2612, inlet 2614, and outlet 2614 form the gas side of suction line heat exchanger 2600.

Baffles 2618 can be included within shell 2602 and surrounding tubes 2608. In an embodiment, two baffles 2618 are located within shell 2602. Baffles 2618 are configured to partially obstruct and/or redirect flow through the shell 2602. The direction of flow of fluid through shell 2602 by baffles 2618 can improve the exchange of heat between the fluid within shell 2602 and the fluid in tubes 2608. In an embodiment including multiple baffles, the baffles can each be oriented differently, so that areas allowing fluid to pass each of the baffles 2618 do not overlap one another or only partially overlap one another when viewed in the longitudinal direction of shell 2602. At least a portion of baffles 2618 surround a portion of the tubes 2608 of the suction line heat exchanger 2600, such that fluid cannot pass between those tubes 2608 and the baffle 218. In an embodiment, the baffles 2618 are according to the design of baffle 2800 described below and shown in FIG. 27.

Longitudinal baffles 2620 can also be provided within shell 2602. Longitudinal baffles 2620 can extend all or less than all of the length of the interior surface of the shell 2602. Longitudinal baffles 2620 and baffles 2618 can limit or reduce the amount of fluid flow bypassing tubes 2608 at the wall of the shell 2602. In an embodiment, two longitudinal baffles 2620 are provided. In an embodiment, the longitudinal baffles are at positions within shell 2602 opposing one another. Longitudinal baffles 2620 may pass through baffles 2618 at notches formed within those baffles. Longitudinal baffles 2620 can each extend from the inner surface of shell 2602 to an outer surface of one of the plurality of tubes 2608. In an embodiment, each of the longitudinal baffles 2620 extends from the inner surface of the shell 2602 to the nearest tube of the plurality of tubes 2608. In an embodiment, longitudinal baffles 2620 further assist in aligning and positioning the other components of suction line heat exchanger 2600. While longitudinal baffles 2620 are shown in a suction line heat exchanger 2600, longitudinal baffles 2620 can be included in any suitable shell and tube design heat exchanger.

FIG. 27 illustrates a heat exchanger baffle 2700 according to an embodiment. In an embodiment, one or more of the heat exchanger baffle 2700 can be included in a suction line heat exchanger such as suction line heat exchanger 2600 described above and shown in FIGS. 25 and 26.

The heat exchanger baffle 2700 generally includes a continuous perimeter 2702 corresponding to the inner shape of the shell of the heat exchanger, such as shell 2602 described above and shown in FIGS. 26A and 26B. The heat exchanger baffle 2700 includes a fluid passage 2704, and channels 2706 corresponding to the size, shape and position of tubes outside the fluid passage 2702, such as tubes 2608 described above and shown in FIGS. 26A and 26B. The heat exchanger baffle 2700 can further include notches 2708 configured to accommodate longitudinal baffles such as longitudinal baffles 2620 described above and shown in FIGS. 26A and 26 B.

Continuous perimeter 2702 follows the surface of the shell of a heat exchanger into which heat exchanger baffle 2700 is installed. Continuous perimeter 2702 is configured such that it surrounds all of the tubes of the heat exchanger within the shell, such as, for example, the entire plurality of tubes 2608 described above and shown in FIGS. 26A and 26B. Continuous perimeter 2702 can be configured to match the inner diameter of the shell, such as shell 2602 described above and shown in FIGS. 26A and 26B.

Fluid passage 2704 is an opening located within continuous perimeter 2702 allowing fluid to flow from one side of the baffle 2700 to the other. Fluid passage 2704 can be within the continuous perimeter 2702 such that it is completely surrounded by portions of heat exchanger baffle 2700 that obstruct fluid flow. In an embodiment, fluid passage 2704 has a generally pentagonal shape. In an embodiment, fluid passage 2704 has rounded corners. In an embodiment, the perimeter of fluid passage 2704 includes one or more recesses formed therein corresponding to tubes of the heat exchanger, such as tubes 2608, that would be intersected by the perimeter of the fluid passage 2704. In an embodiment, fluid passage 2704. In an embodiment, the area of fluid passage 2704 is between at or about 25% and at or about 35% of the area defined by continuous perimeter 2702. In an embodiment, the area of fluid passage 2704 is at or about 30% of the area defined by continuous perimeter 2702.

Channels 2706 each surround one of the tubes of the heat exchanger, such as tubes 2608 described above and shown in FIGS. 26A and 26B. In an embodiment, the channels are sized such that they contact the tubes 2608 and do not provide spaces allowing fluid flow between the exterior of the tubes 2608 and the heat exchanger baffle 2700. In an embodiment, the number of channels 2706 can be the number of tubes 2608 outside of the fluid passage 2704.

Notches 2708 are formed in continuous perimeter 2702 of heat exchanger baffle 2700 at positions corresponding to where any longitudinal baffles are located on an inner surface of the shell. The longitudinal baffles can be, for example, the longitudinal baffles 2620 described above and shown in FIGS. 26A and 26B. In an embodiment, the notches 2708 formed in the heat exchanger baffle 2700 can be configured to engage with corresponding notches formed in the longitudinal baffles.

Where multiple heat exchanger baffles 2700 are included in a suction line heat exchanger, the fluid passages 2704 of the heat exchanger baffles 2700 can be offset from one another such that the respective fluid passages 2704 are not aligned with one another. In an embodiment, the fluid passage 2704 of a heat exchanger baffle 2700 is aligned with a portion of the adjacent heat exchanger baffle that obstructs fluid flow. In an embodiment, the fluid passages 2704 are opposite one another, for example, having a fluid passage 2704 of a first baffle towards a bottom of the shell and a fluid passage 2704 of a second baffle towards the top of the shell.

Aspects:

Any of aspects 1-8 can be combined with any of aspects 9-13 and any of aspects 14 and 15, and any of aspects 9-13 may be combined with any of aspects 14 and 15. It is understood that any of aspects 1-15 can be combined with any other aspects recited herein.

Aspect 1. A refrigerant circuit, comprising:
a compressor;
a condenser;
an expander;
an evaporator; and
a suction line heat exchanger configured to exchange heat between a liquid side receiving a working fluid as a liquid leaving the condenser, prior to the expander and a gas side receiving the working fluid as a gas leaving the evaporator, prior to the compressor, wherein the liquid side includes a shell and the gas side includes a plurality of tubes extending through the shell, wherein the suction line heat exchanger is configured such that a discharge of the compressor has a discharge superheat of at or about 3.3° C. or more than 3.3° C.

Aspect 2. The refrigerant circuit according to aspect 1, further comprising a throttling valve between the plurality of tubes of the suction line heat exchanger and the compressor.

Aspect 3. The refrigerant circuit according to any of aspects 1-2, wherein:
the shell has a length of at or about one meter,
the shell has a diameter of between at or about 200 millimeters (mm) and at or about 220 mm,
the plurality of tubes includes between at or about 55 and at or about 65 tubes, and
each of the plurality of tubes has an interior diameter of between at or about 15 mm and at or about 18 mm.

Aspect 4. The refrigerant circuit according to any of aspects 1-3, wherein a pressure drop across the gas side of the suction line heat exchanger is 10 kPa or less for refrigerant R1234ze.

Aspect 5. The refrigerant circuit according to any of aspects 1-4, wherein a temperature of gas leaving the gas side of the suction line heat exchanger is greater than 1.5° C. or at or about 1.5° C. greater than a temperature of the gas entering the gas side of the suction line heat exchanger.

Aspect 6. The refrigerant circuit according to any of aspects 1-5, further comprising a plurality of baffles within the shell, wherein each of the baffles includes a continuous perimeter in contact with an entire inner diameter of the shell and an open area.

Aspect 7. The refrigerant circuit according aspect 6, wherein the open area comprises at or about 30% of the area defined by the continuous perimeter.

Aspect 8. The refrigerant circuit according to any of aspects 1-7, wherein the shell includes a plurality of longitudinal baffles each extending a length of the shell and extending from an inner surface of the shell to one of the plurality of tubes.

Aspect 9. A suction line heat exchanger comprising:
a liquid side including:
an inlet connected to a condenser of a refrigeration circuit;
an outlet connected to an expander of the refrigeration circuit; and
a shell defining an internal space; and
a gas side including:
an inlet connected to an evaporator of the refrigeration circuit;
an inlet header connecting the inlet to a plurality of tubes, the plurality of tubes extending through the internal space from one end of the shell to an opposing end of the shell;
an outlet header connecting the plurality of tubes to an outlet, wherein the suction line heat exchanger is configured to increase a discharge superheat of a compressor of the refrigeration circuit such that the discharge superheat is at or about 3.3° C. or more than 3.3° C.

Aspect 10. The suction line heat exchanger according to aspect 9, wherein a pressure drop across the gas side is 10 kPa or less for refrigerant R1234ze.

Aspect 11. The suction line heat exchanger according to any of aspects 9-10, wherein there is a chamfer where each of the tubes is connected to the inlet header, and a chamfer where each of the tubes is connected to the outlet header.

Aspect 12. The suction line heat exchanger according to any of aspects 9-11, further comprising a plurality of baffles within the shell, wherein each of the baffles includes a continuous perimeter in contact with an entire inner diameter of the shell and an open area, the open area comprises at or about 30% of the area defined by the continuous perimeter.

Aspect 13. The suction line heat exchanger according to any of aspects 9-12, wherein the shell includes a plurality of longitudinal baffles each extending a length of the shell and extending from an inner surface of the shell to one of the plurality of tubes.

Aspect 14. A method of increasing superheat of a refrigerant, comprising: directing relatively hot liquid refrigerant from a condenser to a suction line heat exchanger; directing relatively cool gaseous refrigerant from an evaporator to the suction line heat exchanger; performing heat exchange between the relatively hot liquid refrigerant and the relatively cool gaseous refrigerant using the suction line heat exchanger, to increase the heat of the relatively cool gaseous refrigerant to obtain a heated gaseous refrigerant; and directing the heated gaseous refrigerant to a suction port of the compressor, wherein the compressor heats and pressurizes the heated gaseous refrigerant to obtain a superheated gaseous refrigerant.

Aspect 15. The method of aspect 14, wherein the refrigerant is R1234ze.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A refrigerant circuit, comprising:
a compressor;
a condenser;
an expander;
an evaporator; and
a suction line heat exchanger configured to exchange heat between a liquid side receiving a working fluid as a liquid leaving the condenser, prior to the expander and a gas side receiving the working fluid as a gas leaving the evaporator, prior to the compressor, wherein the liquid side includes a shell and the gas side includes a plurality of tubes extending through the shell,
the suction line heat exchanger comprising a plurality of baffles within the shell, wherein each of the baffles includes a perimeter in contact with an inner circumference of the shell, a plurality of channels configured to allow at least some of the plurality of tubes to extend through said baffle, each of said channels contacting a corresponding one of the plurality of tubes, and a fluid passage, wherein the fluid passage comprises at or about 25% to at or about 35% of the area defined by the perimeter,
wherein the suction line heat exchanger is configured such that a discharge of the compressor has a discharge superheat of at or about 3.3° C. or more.

2. The refrigerant circuit of claim 1, further comprising a throttling valve between the plurality of tubes of the suction line heat exchanger and the compressor.

3. The refrigerant circuit of claim 1, wherein:
the shell has a length of at or about one meter,
the shell has a diameter of between at or about 200 millimeters (mm) and at or about 220 mm,
the plurality of tubes includes between at or about 55 and at or about 65 tubes, and
each of the plurality of tubes has an interior diameter of between at or about 15 mm and at or about 18 mm.

4. The refrigerant circuit of claim 1, wherein a pressure drop across the gas side of the suction line heat exchanger is 10 kPa or less for refrigerant R1234ze.

5. The refrigerant circuit of claim 1, wherein a temperature of gas leaving the gas side of the suction line heat exchanger is greater than at or about 1.5° C. greater than a temperature of the gas entering the gas side of the suction line heat exchanger.

6. The refrigerant circuit of claim 1, wherein the shell includes a plurality of longitudinal baffles each extending a length of the shell and extending from an inner surface of the shell to one of the plurality of tubes.

7. A suction line heat exchanger comprising:
a liquid side including:
- an inlet connected to a condenser of a refrigeration circuit;
- an outlet connected to an expander of the refrigeration circuit; and
- a shell defining an internal space; and a gas side including:
- an inlet connected to an evaporator of the refrigeration circuit;
- an inlet header connecting the inlet to a plurality of tubes, the plurality of tubes extending through the internal space from one end of the shell to an opposing end of the shell;
- a plurality of baffles within the shell, wherein each of the baffles includes a perimeter in contact with an inner circumference of the shell, a plurality of channels configured to allow at least some of the plurality of tubes to extend through said baffle, each of said channels contacting a corresponding one of the plurality of tubes, and a fluid passage, wherein the fluid passage comprises at or about 25% to at or about 35% of the area defined by the perimeter; and
- an outlet header connecting the plurality of tubes to an outlet, wherein the suction line heat exchanger is configured to increase a discharge superheat of a compressor of the refrigeration circuit such that the discharge superheat is at or about 3.3° C. or more.

8. The suction line heat exchanger of claim 7, wherein a pressure drop across the gas side is 10 kPa or less for refrigerant R1234ze.

9. The suction line heat exchanger of claim 7, wherein the shell includes a plurality of longitudinal baffles each extending a length of the shell and extending from an inner surface of the shell to one of the plurality of tubes.

10. A method of increasing superheat of a refrigerant, comprising:
- directing relatively hot liquid refrigerant from a condenser to a suction line heat exchanger;
- directing relatively cool gaseous refrigerant from an evaporator to the suction line heat exchanger;
- performing heat exchange between the relatively hot liquid refrigerant and the relatively cool gaseous refrigerant using the suction line heat exchanger, to increase the heat of the relatively cool gaseous refrigerant to obtain a heated gaseous refrigerant, wherein the relatively hot liquid refrigerant is directed through one or more baffles, wherein each of the baffles includes a perimeter in contact with an inner circumference of the shell, a plurality of channels configured to allow at least some of the plurality of tubes to extend through said baffle, each of said channels contacting a corresponding one of the plurality of tubes, and a fluid passage, wherein the fluid passage comprises at or about 25% to at or about 35% of the area defined by the perimeter; and
- directing the heated gaseous refrigerant to a suction port of the compressor, wherein the compressor heats and pressurizes the heated gaseous refrigerant to obtain a superheated gaseous refrigerant.

11. The method of claim 10, wherein the refrigerant is R1234ze.

* * * * *